United States Patent
Hévizi et al.

(10) Patent No.: US 12,452,851 B2
(45) Date of Patent: Oct. 21, 2025

(54) METHOD AND APPARATUS FOR MANAGING RADIO RESOURCES IN A COMMUNICATION NETWORK

(71) Applicant: Telefonaktiebolaget LM Ericsson (publ), Stockholm (SE)

(72) Inventors: László Hévizi, Piliscsaba (HU); Vijaya Parampalli Yajnanarayana, Bangalore (IN); Henrik Rydén, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 334 days.

(21) Appl. No.: 18/258,372

(22) PCT Filed: Dec. 22, 2020

(86) PCT No.: PCT/EP2020/087609
§ 371 (c)(1),
(2) Date: Jun. 20, 2023

(87) PCT Pub. No.: WO2022/135693
PCT Pub. Date: Jun. 30, 2022

(65) Prior Publication Data
US 2024/0049206 A1   Feb. 8, 2024

(51) Int. Cl.
*H04W 24/02* (2009.01)
*H04W 24/10* (2009.01)
(Continued)

(52) U.S. Cl.
CPC ......... *H04W 72/046* (2013.01); *H04W 24/02* (2013.01); *H04W 24/10* (2013.01); *H04W 36/322* (2023.05)

(58) Field of Classification Search
None
See application file for complete search history.

(56) References Cited

U.S. PATENT DOCUMENTS

2014/0038634 A1 * 2/2014 Eskicioglu ............ H04W 48/18
455/456.1
2015/0282246 A1 10/2015 Teyeb et al.
(Continued)

FOREIGN PATENT DOCUMENTS

EP    3681197 A1    7/2020
WO    2019158210 A1    8/2019

OTHER PUBLICATIONS

International Search Report and Written Opinion dated Oct. 6, 2021 for International Application No. PCT/EP2020/087609 filed Dec. 22, 2020 consisting of 14-pages.
(Continued)

*Primary Examiner* — Jenkey Van
(74) *Attorney, Agent, or Firm* — Weisberg I.P. Law, P.A.

(57) ABSTRACT

A computer implemented method for managing radio resources used by UEs in a cellular communication network. The communication network includes a plurality of radio resources, each radio resource defining a dimension of a multidimensional radio space over which the communication network extends. The method is performed by a management node and includes determining that a UE fulfils a location condition with respect to a region of the communication network, and providing to the UE a distributed resource management model for the region of the communication network, the distributed resource management model having a radio coverage model including defining radio characteristics of radio zones in the region. The distributed resource management model is operable for use, by the UE, to identify a radio resource action for execution by the UE. Also disclosed are a method performed by a UE, a management node, a UE and a computer readable storage medium.

20 Claims, 37 Drawing Sheets

(51) Int. Cl.
*H04W 36/32* (2009.01)
*H04W 72/044* (2023.01)

(56) References Cited

U.S. PATENT DOCUMENTS

| | | | | |
|---|---|---|---|---|
| 2018/0025500 | A1* | 1/2018 | Nielsen | G06V 20/52 |
| | | | | 382/103 |
| 2019/0020987 | A1 | 1/2019 | Khoryaev et al. | |
| 2020/0252838 | A1 | 8/2020 | Akdeniz et al. | |
| 2022/0312277 | A1* | 9/2022 | Akdeniz | H04W 72/569 |
| 2024/0373418 | A1* | 11/2024 | Badic | H04W 40/22 |

OTHER PUBLICATIONS

3GPP TS 36.133 V15.9.0; 3rd Generation Partnership Project; Technical Specification Group Radio Access Network; Evolved Universal Terrestrial Radio Access (E-UTRA); Requirements for support of radio resource management (Release 15); Dec. 2019, consisting of 3611-pages.

3GPP TS 32.511 V15.0.0; 3rd Generation Partnership Project; Technical Specification Group Services and System Aspects; Telecommunication management; Automatic Neighbour Relation (ANR) management; Concepts and requirements (Release 15); Jun. 2018, consisting of 13-pages.

3GPP TS 32.521 V11.1.0; 3rd Generation Partnership Project; Technical Specification Group Services and System Aspects; Telecommunication management; Self-Organizing Networks (SON) Policy Network Resource Model (NRM) Integration Reference Point (IRP); Requirements (Release 11); Dec. 2012, consisting of 26-pages.

3GPP TS 36.331 V15.8.0; 3rd Generation Partnership Project; Technical Specification Group Radio Access Network; Evolved Universal Terrestrial Radio Access (E-UTRA); Radio Resource Control (RRC); Protocol specification (Release 15); Dec. 2019, consisting of 964-pages.

3GPP TSG RAN WG1 Meeting AH 1901 R1-1901182; Title: DL positioning considerations: Pattern Learning, RSS fingerprinting and Beams; Agenda Item: 7.2.10.1.1; Source: Fraunhofer IIS, Franhofer HHI; Document for: Discussion & Agreement; Date and Location: Jan. 21-25, 2019, Taipei, Taiwan, consisting of 11-pages.

* cited by examiner

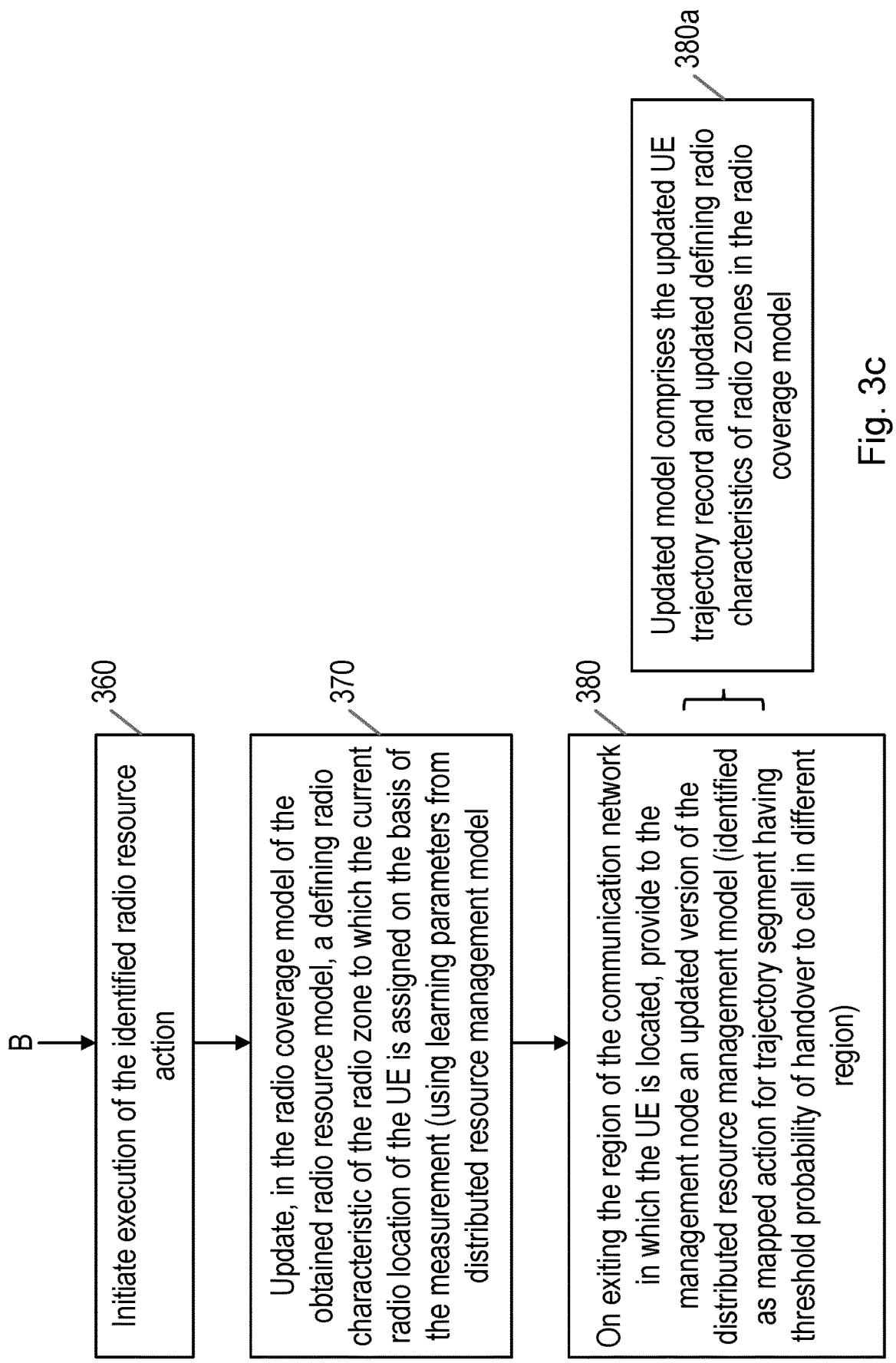

| Trajectory Segment | Speed | Action | Parameter |
|---|---|---|---|
| ... | | | |
| z3, z20, z9, z22, z21 | slow | HO: A3 | 3dB, 320ms |
| z3, z20, z9, z22, z21 | medium | HO: A3 | 2dB, 160ms |
| z3, z20, z9, z22, z22 | medium | HO: A3 | 1dB, 320ms |
| ... | | | |
| z20, z9, z22, z21, z14 | medium | HO: A3 | 2dB, 160ms |
| z20, z9, z22, z21, z14 | fast | HO: A3 | 3dB, 320ms |
| z20, z9, z22 , z21, z21 | medium | HO: A3 | 1dB, 320ms |
| ... | | | |

Fig. 11

| Trajectory Segment | Speed | Action | Parameter |
|---|---|---|---|
| ... | | | |
| z9, z22, z21 | medium | Meas Obj Add | Phycid 201 |
| z20, z9, z22 | fast | Meas Obj Add | Phycid 201 |
| ... | | | |

Fig. 12

| Trajectory segment | Speed | Action | Parameter |
|---|---|---|---|
| ... | | | |
| z21, z14, z13 | slow, medium, fast | Regional model exchange | Centralised and distributed resource management model |
| z21, z13 | fast | Regional model exchange | Centralised and distributed resource management model |
| ... | | | |

Fig. 13

METHOD AND APPARATUS FOR MANAGING RADIO RESOURCES IN A COMMUNICATION NETWORK

CROSS-REFERENCE TO RELATED APPLICATIONS

This application is a Submission Under 35 U.S.C. § 371 for U.S. National Stage Patent Application of International Application Number: PCT/EP2020/087609, filed Dec. 22, 2020 entitled "METHOD AND APPARATUS FOR MANAGING RADIO RESOURCES IN A COMMUNICATION NETWORK," the entirety of which is incorporated herein by reference.

TECHNICAL FIELD

The present disclosure relates to methods for managing radio resources used by a User Equipment (UE) in a cellular communication network. The present disclosure also relates to a UE, a management node, and to a computer program and a computer program product configured, when run on a computer to carry out methods for managing radio resources used by a User Equipment (UE) in a cellular communication network.

BACKGROUND

Mobile telecommunications systems continue to evolve, with the addition of new network layers (including small cells), new frequency carriers, and new radio access technologies (RATs). The new radio environments created by such additions, and the management tasks required to control User Equipments (UEs) moving within such environments, are more complex than traditional macro-cell deployments. Existing rule engine-based models are poorly adapted to handle UE management in such complex environments, as discussed below.

Current procedures for Radio Resource Control (RRC) in communication networks involve network management (NM) requesting UEs to measure and report the radio environment that they experience. On the basis of collected and evaluated measurement reports, a central NM entity sends RRC control messages to UEs in order to direct the UEs towards an optimal set of connections, for example to particular network cells, particular beams etc. A UE can report its radio measurements on demand, responding to requests from NM, or it can send reports periodically or on occurrence of trigger conditions, referred to as event-based reporting. In some examples, a combination of on demand, periodic, and event-based reporting is possible, although event-based reporting is the most widely used technique in current communication networks. In event-based reporting, NM configures a UE with various conditions, and the fulfilment of a condition triggers the UE to report its measurements. The parameters of reporting conditions, for example the handover margin and time-to-trigger timer, are network-wide or cell-wide settings, and typically do not correspond well to all UE mobility situations.

In a typical cellular system, the dynamics of a received signal depend on various characteristics of a UE including its velocity, corner-effects owing to UE mobility, etc. Typically, a handover process employs filtering to eliminate shadowing and fast fading effects on received measurements, and the choice of parameters to smooth the reported measurements at the base-station also depends on UE conditions. For example, a high-speed UE turning around a corner needs to have a small time-window for filtering to ensure a fast handoff, as opposed to a slow-moving UE in a straight-line trajectory. In particular, for new deployments on mmWave, and even higher frequencies discussed for sixth generation (6G) networks, shadowing and effects of turning around corners will cause higher signal quality degradation in comparison with deployments on lower frequencies. This is merely one example of the increasing complexity that RRC control procedures, including handover processes, are required to accommodate.

Existing rule-engine control of RRC messaging can no longer cope with the increasing variety and complexity of radio environments and UE mobility situations. In addition, the RRC message flow between NM and UEs has become a significant burden in heterogeneous, multi-carrier, multi-RAT mobile networks.

Various techniques have been proposed to address the signalling burden of RRC messaging, including for example that disclosed in US 2015 0282246, which proposes providing a UE with a series of RRC configurations corresponding to different communication network states. According to the technique of US 2015 0282246, only the network state is signalled to the UE, with the UE selecting the appropriate one of the previously provided RRC configurations for the signalled state, and applying the RRC parameters of the selected RRC configuration.

SUMMARY

It is an aim of the present disclosure to provide methods, a UE, a management node, and a computer readable medium which at least partially address one or more of the challenges discussed above. It is a further aim of the present disclosure to provide methods, a UE, a management node, and a computer readable medium which facilitate the management of radio resources used by a UE, reducing associated control signalling and offering a distributed and adaptable system of radio resource management.

According to a first aspect of the present disclosure, there is provided a computer implemented method for managing radio resources used by a User Equipment (UE) in a cellular communication network. The communication network comprises a plurality of radio resources, each radio resource defining a dimension of a multidimensional radio space over which the communication network extends. The method, performed by the UE, comprises obtaining, from a management node of the communication network, a distributed resource management model for a region of the communication network in which the UE is located. The distributed resource management model comprises a radio coverage model including defining radio characteristics of radio zones in the region. A radio zone comprises a portion of the multidimensional radio space over which the communication network extends that is defined by a particular combination of radio field characteristics, with each cell of the communication network comprising a plurality of radio zones. The method further comprises performing a measurement of communication network radio resources, assigning a current radio location of the UE to a radio zone of the communication network on the basis of the measurement, and updating a radio trajectory record of the UE's trajectory with the radio zone to which the current radio location of the UE is assigned. The method further comprises using the distributed resource management model and the updated trajectory record to identify a radio resource action for execution by the UE, and initiating execution of the identified radio resource action.

According to another aspect of the present disclosure, there is provided a computer implemented method for managing radio resources used by UEs, in a cellular communication network. The communication network comprises a plurality of radio resources, each radio resource defining a dimension of a multidimensional radio space over which the communication network extends. The method, performed by a management node of the communication network, comprises determining that a UE fulfils a location condition with respect to a region of the communication network, and providing to the UE a distributed resource management model for the region of the communication network. The distributed resource management model comprises a radio coverage model including defining radio characteristics of radio zones in the region. A radio zone comprises a portion of the multidimensional radio space over which the communication network extends that is defined by a particular combination of radio field characteristics, with each cell of the communication network comprising a plurality of radio zones. The distributed resource management model is operable for use, by the UE, to identify a radio resource action for execution by the UE.

According to another aspect of the present disclosure, there is provided a computer program product comprising a computer readable medium, the computer readable medium having computer readable code embodied therein, the computer readable code being configured such that, on execution by a suitable computer or processor, the computer or processor is caused to perform a method according to any one or more of aspects or examples of the present disclosure.

According to another aspect of the present disclosure, there is provided a User Equipment (UE) operable for managing radio resources used by the UE in a cellular communication network. The communication network comprises a plurality of radio resources, each radio resource defining a dimension of a multidimensional radio space over which the communication network extends. The UE comprises processing circuitry configured to obtain, from a management node of the communication network, a distributed resource management model for a region of the communication network in which the UE is located. The distributed resource management model comprises a radio coverage model including defining radio characteristics of radio zones in the region. A radio zone comprises a portion of the multidimensional radio space over which the communication network extends that is defined by a particular combination of radio field characteristics, with each cell of the communication network comprising a plurality of radio zones. The processing circuitry is further configured to perform a measurement of communication network radio resources, assign a current radio location of the UE to a radio zone of the communication network on the basis of the measurement, and update a radio trajectory record of the UE's trajectory with the radio zone to which the current radio location of the UE is assigned. The processing circuitry is further configured to use the distributed resource management model and the updated trajectory record to identify a radio resource action for execution by the UE, and initiate execution of the identified radio resource action.

According to another aspect of the present disclosure, there is provided a management node for managing radio resources used by UEs in a cellular communication network. The communication network comprises a plurality of radio resources, each radio resource defining a dimension of a multidimensional radio space over which the communication network extends. The management node comprises processing circuitry configured to determine that a UE fulfils a location condition with respect to a region of the communication network, and provide to the UE a distributed resource management model for the region of the communication network. The distributed resource management model comprises a radio coverage model including defining radio characteristics of radio zones in the region. A radio zone comprises a portion of the multidimensional radio space over which the communication network extends that is defined by a particular combination of radio field characteristics, with each cell of the communication network comprises a plurality of radio zones. The distributed resource management model is operable for use, by the UE, to identify a radio resource action for execution by the UE.

Examples of the present disclosure thus propose to replace aspects of the existing centralised management of radio resources with distributed control, which control may allow for both UE and mobility specific customisation. Examples of the present disclosure allow for a UE to establish its location in the radio space of a communication network with sub-cell spatial resolution, based on its own measurements of radio resources and a distributed resource management model. A management node supplies a UE with a distributed resource management model that is valid for the region of the communication network in which the UE is currently located. The UE can track its motion over the distributed resource management model, and use the model to identify radio resource actions for initiation without direct commands from network management. Such actions may for example include taking and reporting measurements on various carriers or RATs, or preparing for handover to specified cells, setting handover parameters, etc. Such actions may also include setting specific reporting and/or filtering parameters for measurements, such as an averaging-window in L1 filtering, and a weightage parameter, a, in L3-filtering. Examples of the present disclosure thus provide a flexible process for radio resource management that is adaptable to the complex heterogeneous radio environments of communication networks, and significantly reduces the signalling burden associated with existing RRC processes.

In some examples of the present disclosure, the management node and one or more UEs may work together to explore and learn the radio environment, for example employing processes relating to federated learning. In such examples, while a UE moves and traces its own trajectory over the distributed resource management model, it may also modify the model, updating the model according to its own experience. When the UE is about to leave its current region, it may return its updated model to the management node, and receive a model for the region it is about to enter. The management node may then incorporate the changes from the updated model received from the UE into a centralised version of the model, so incorporating the local learning from the UE into the centralised representation of the radio environment of the communication network.

BRIEF DESCRIPTION OF THE DRAWINGS

For a better understanding of the present disclosure, and to show more clearly how it may be carried into effect, reference will now be made, by way of example, to the following drawings in which:

FIGS. 3a to 3c show a flow chart illustrating process steps in another example of a computer implemented method performed by a UE for managing radio resources used by the UE in a cellular communication network;

FIG. 11 illustrates an example distributed radio action model;

FIG. 12 illustrates another example distributed radio action model;

FIG. 13 illustrates another example distributed radio action model;

DETAILED DESCRIPTION

As discussed above, current mobile telecommunications systems operating according to 3GPP standards apply mobility trigger events, or periodic event triggering, to collect information on how UEs move in the radio environment. This is discussed in Section 5.5.4 "Measurement report triggering" of 3GPP Technical Specification 36.133 V15.9.0.

Periodic reporting can be an overwhelming burden on network management, while event-based triggering of measurement reporting will often fail to provide sufficient detail of the radio environment that surrounds the UE. It is desirable to be able to provide adaptive time reporting, which adapts to the temporal and spatial variation of the radio environment that the UE experiences. The experienced variation in radio environment depends both on the mobility of the UE and on the type of radio network deployment. For example, the radio-field variation experienced by a vehicle-based UE moving quickly in an 800 MHz macro-cell deployment can be similar to that experienced by a pedestrian-based UE moving slowly in a 3.5 GHz micro-cell deployment. A resource management model can be used to enable a UE to identify suitable radio resource actions that optimise the spatial sampling of the radio environment.

In order to optimally distribute radio resources among UEs, it is helpful to know the instantaneous radio environment and traffic of each UE, as well as the instantaneous network side allocations of resources, including the load on cells, individual beams, frequency carriers and RATs. Further advantage in resource allocation decisions may be obtained if predictions, or just rough expectations, of these quantities are available. According to examples of the present disclosure, radio resource distribution decision making can be distributed to the regional scale, and shared between network management and individual UEs, via a management node that provides a resource management model and a UE that uses the model to identify radio resource actions for initiation. Further examples of the present disclosure enable the management node to learn the radio environment of a given region, including coverage details of the ensemble of radio cells in a region, through updates, provided by UEs, to the resource management model. The standard drive tests used to build a network view of radio coverage are frequently insufficient to provide a full picture of a complex radio environment. Examples of the present disclosure provide a gradual learning technique, which may involve many or all of the UEs in a given region, and can facilitate the development of a substantially complete knowledge of multi-layer mobile network coverage. The gradual learning technique proposed herein is based on concepts from federated learning, according to which a model may be trained across multiple decentralised devices, each having a local data set, without exchanging the local data sets or providing them to a centralised entity.

Figure 1:
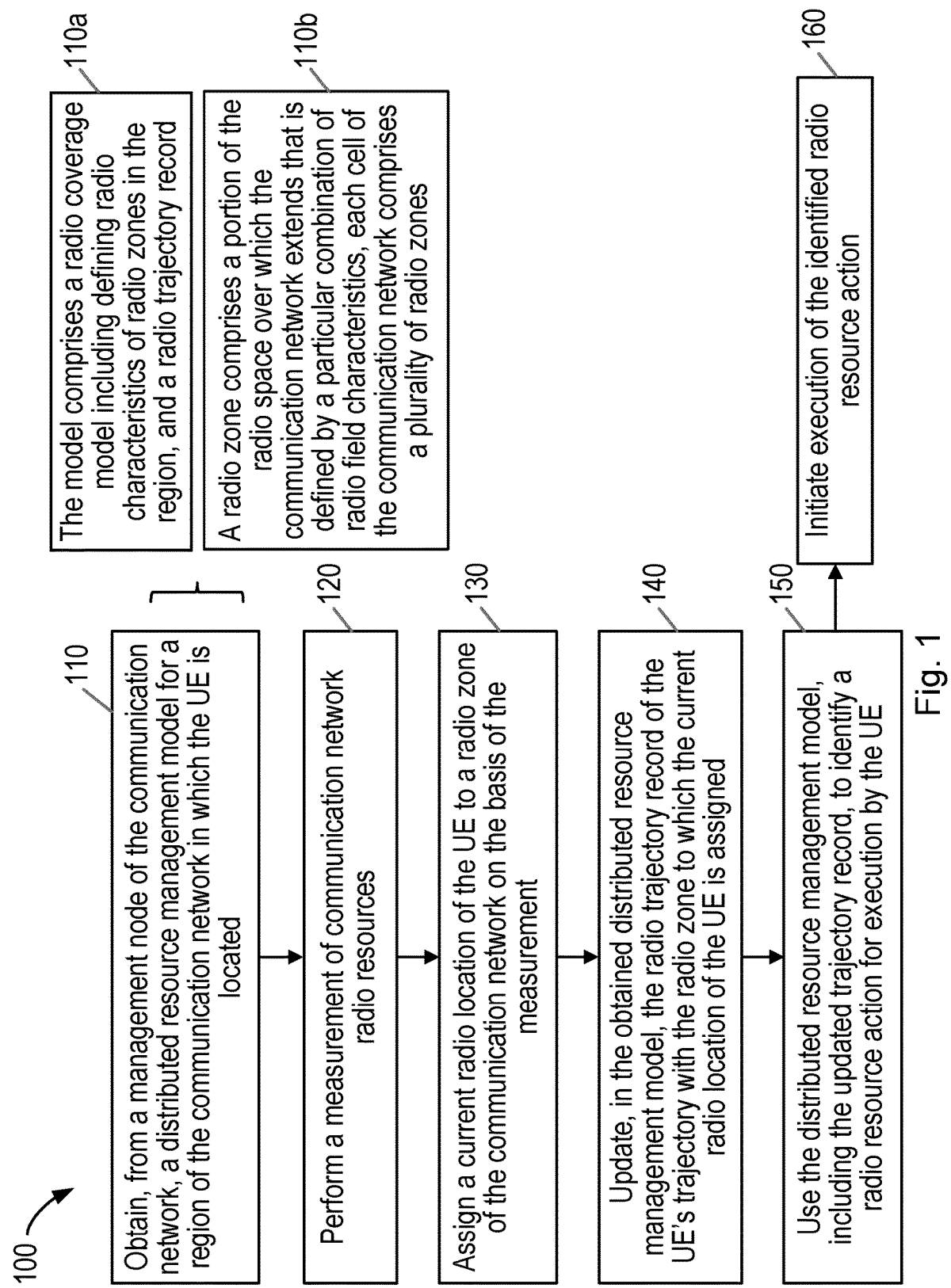
FIG. 1 is a flow chart illustrating process steps in a computer implemented method performed by a UE for managing radio resources used by the UE in a cellular communication network.

FIG. 1 is a flow chart illustrating process steps in a computer implemented method 100 for managing radio resources used by a User Equipment (UE) in a cellular communication network. As discussed above, the communication network comprises a plurality of radio resources, each radio resource defining a dimension of a multidimensional radio space over which the communication network extends. The concept of a multidimensional radio space is discussed in greater detail below with reference to FIG. 8. The method 100 is performed by the UE that is using radio resources in the communication network.

Referring to FIG. 1, the method 100 comprises, in a first step 110, obtaining, from a management node of the communication network, a distributed resource management model for a region of the communication network in which the UE is located. As illustrated at 110a, the distributed resource management model comprises a radio coverage model including defining radio characteristics of radio zones in the region. A region of the communication network, according to some examples of the present disclosure, may comprise a plurality of substantially contiguous communication network cells amongst which the Physical Cell Identifier of each cell is unique. As illustrated at 110b, a radio zone comprises a portion of the multidimensional radio space over which the communication network extends that is defined by a particular combination of radio field characteristics, and each cell of the communication network comprises a plurality of radio zones. Obtaining the distributed resource management model from the management node may in some examples comprise receiving the model when the UE enters the region, or is predicted to enter the region, the model for example being received either directly from the management node or via a Radio Access Network node such as a base station, which may be the current serving cell of the UE.

Referring still to FIG. 1, the method 100 further comprises performing a measurement of communication network radio resources in step 120, and assigning a current radio location of the UE to a radio zone of the communication network on the basis of the measurement in step 130. In step 140, the method 100 comprises updating a radio trajectory record of the UE's trajectory with the radio zone to which the current radio location of the UE is assigned. The method 100 further comprises using the distributed resource management model and the updated trajectory record to identify a radio resource action for execution by the UE in step 150, and initiating execution of the identified radio resource action in step 160.

It will be appreciated that the method 100 allows for a range of RRC signalling to be replaced through use of a distributed resource management model to guide a UE in identifying appropriate radio resource actions on the basis of its trajectory through the multidimensional radio space of a region of the communication network. The distributed resource management model may also be tailored to a specific UE, and may be updated to reflect evolving radio environment conditions in the particular region, as discussed in greater detail below. It will also be appreciated that by allowing a UE to monitor its own trajectory, a finer grade trajectory may be established than if the trajectory was monitored at a node of the communication network, such as a Radio Access network node.

According to existing 3GPP standards, a UE typically performs radio resource measurements more frequently than it reports those measurements to the network. The measurement results available at the UE thus allow for a higher degree of accuracy in the UE trajectory than if only reported measurements were available, and the use of such accurate trajectories in identifying radio resource actions for initiation may allow for improved performance of the radio resource management achieved by the method 100.

For the purposes of the present disclosure, the term User Equipment (UE) refers to any wireless device (WD) that is capable, configured, arranged and/or operable to communicate wirelessly with network nodes and/or other wireless devices. Communicating wirelessly may involve transmitting and/or receiving wireless signals using electromagnetic waves, radio waves, infrared waves, and/or other types of signals suitable for conveying information through air. In some embodiments, a UE may be configured to transmit and/or receive information without direct human interaction. For instance, a UE may be designed to transmit information to a network on a predetermined schedule, when triggered by an internal or external event, or in response to requests from the network. Examples of a UE include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A UE may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a UE may represent a machine or other device that performs monitoring and/or measurements, and transmits the results of such monitoring and/or measurements to another UE and/or a network node. The UE may in this case be a machine-to-machine (M2M) device, which may in a 3GPP context be referred to as an MTC device. As one particular example, the UE may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a UE may represent a vehicle or other equipment that is capable of monitoring and/or reporting on its operational status or other functions associated with its operation. A UE as described above may represent the endpoint of a wireless connection, in which case the device may be referred to as a wireless terminal. Furthermore, a UE as described above may be mobile, in which case it may also be referred to as a mobile device or a mobile terminal.

For the purposes of the present disclosure, a "cell" refers to the geographic coverage area served by a Radio Access node of a communication network, and may also be used interchangeably to refer to the Radio Access node that serves the coverage area. A Radio Access node may comprise a physical node and/or a virtualized network function operable to exchange wireless signals. In some examples, a Radio Access node may comprise a base station node such as a NodeB, eNodeB, gNodeB, or any future implementation of the above discussed functionality. Additional discussion of a wireless network, network nodes, UEs, etc. is provided at the end of the present description.

Figure 2:
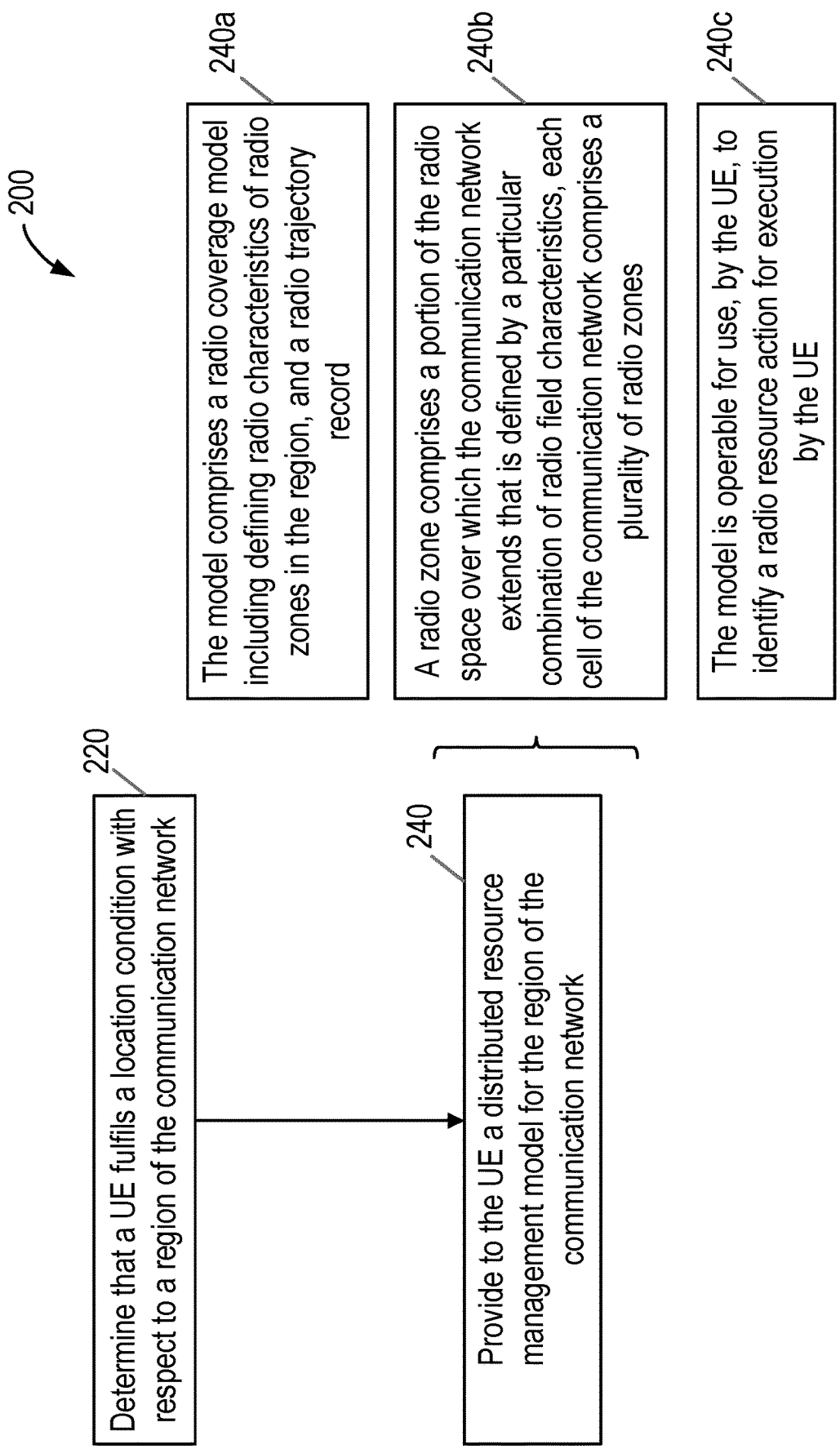
FIG. 2 is a flow chart illustrating process steps in a computer implemented method performed by a management node for managing radio resources used by UEs in a cellular communication network.

The method 100 of FIG. 1 may be complimented by a method 200 performed by a management node. FIG. 2 is a flow chart illustrating process steps in a computer implemented method 200 for managing radio resources used by UEs in a cellular communication network, wherein the communication network comprises a plurality of radio resources, each radio resource defining a dimension of a multidimensional radio space over which the communication network extends. As noted above, the concept of a multidimensional radio space is discussed in greater detail below with reference to FIG. 8.

The method 200 may for example be carried out by a management node, such as a Radio Resource Control (RRC) management node, which may comprise a Network Management entity. The management node may for example comprise or be instantiated in any part of a logical core network node, network management centre, network operations centre, Radio Access node etc. Any such communication network node may itself be divided between several logical and/or physical functions, and any one or more parts of the management node may be instantiated in one or more logical or physical functions of a communication network node. An example management node is discussed in further detail below with reference to FIGS. 23 and 24.

Referring to FIG. 2, the method 200 comprises determining that a UE fulfils a location condition with respect to a region of the communication network in step 220, and providing to the UE a distributed resource management model for the region of the communication network in step 240. As illustrated at 240a, the distributed resource management model comprises a radio coverage model including defining radio characteristics of radio zones in the region. As illustrated at 240b, a radio zone comprises a portion of the multidimensional radio space over which the communication network extends that is defined by a particular combination of radio field characteristics. Each cell of the communication network comprises a plurality of radio zones, where "cell" in this context refers to the geographic coverage area served by a Radio Access node of a communication network. As illustrated at 240c, the distributed resource management model is operable for use, by the UE, to identify a radio resource action for execution by the UE.

Figure 3A:
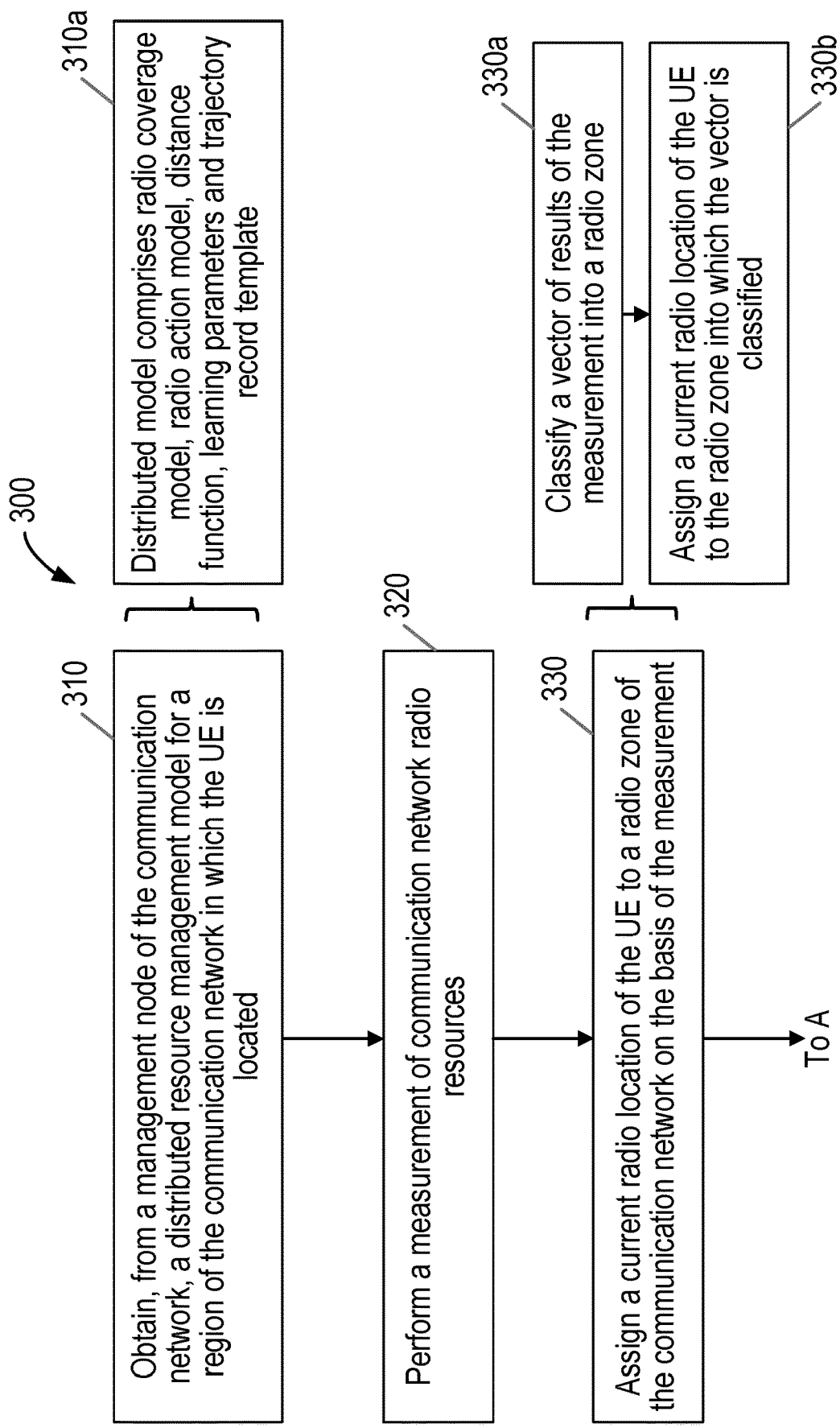
Figure 3B:
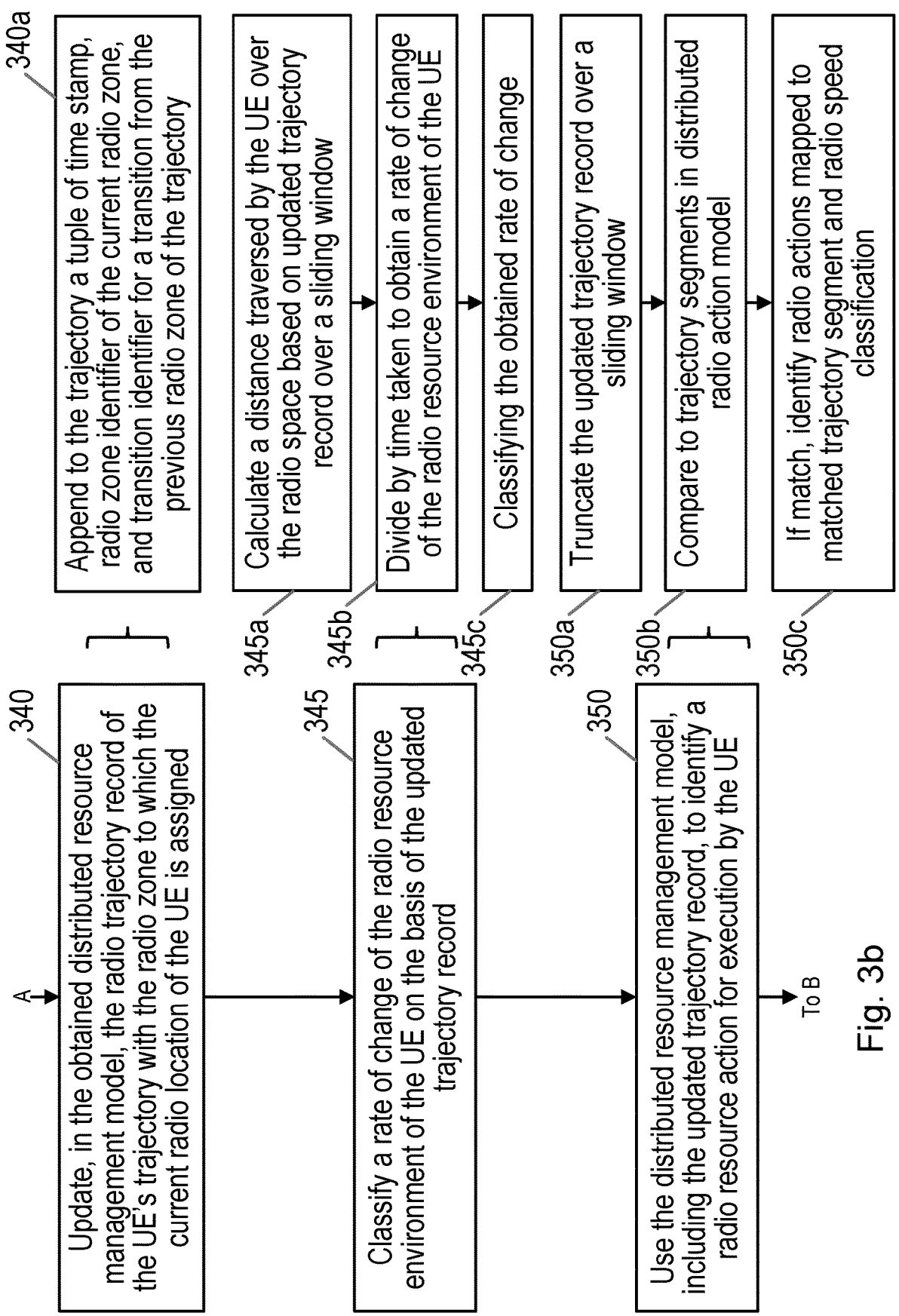

FIGS. 3a to 3c show a flow chart illustrating process steps in another example of computer implemented method 300 for managing radio resources used by a UE in a cellular communication network, wherein the communication network comprises a plurality of radio resources, each radio resource defining a dimension of a multidimensional radio space over which the communication network extends. The method 300 provides one example of how the steps of the method 100 may be implemented and supplemented to achieve the above discussed and additional functionality. As for the method 100 discussed above, the method 300 is carried out by the UE using the communication network resources. It will be appreciated that the UE carrying out the method 300 may be one of a plurality of UEs located in the region of the communication network, and any number of the other UEs located in the region may also be executing a method according to examples of the present disclosure.

Referring first to FIG. 3a, the UE carrying out the method 300 obtains, from a management node of the communication network, a distributed resource management model for a region of the communication network in which the UE is located. In the present example, a region of the communication network may be considered to comprise a plurality of substantially contiguous communication network cells amongst which the Physical Cell Identifier (PCI) of each cell is unique. It will be appreciated that PCIs are generally reused within a communication network, and a region of the communication network is thus distinguished by the fact that within the region, the PCI of each cell is unique.

As illustrated at 310a, the distributed resource management model comprises, according to the present example:
  a radio coverage model including defining radio characteristics of radio zones in the region,
  a radio action model including a mapping of radio trajectory segments to radio resource actions,
  a distance function for use in assigning a radio location of a UE to a radio zone using the distributed resource management model,
  a radio trajectory record for recording a UE's trajectory through the radio space of the communication network; and
  at least one learning parameter for use in updating, in the radio coverage model of the distributed resource management model, a defining radio characteristic of the radio zone to which a current radio location of the UE is assigned. Depending upon the type of learning to be implemented, the distributed resource management model may comprise a set of learning parameters.

As discussed above, a radio zone comprises a portion of the multidimensional radio space over which the communication network extends that is defined by a particular combination of radio field characteristics. Each cell of the communication network comprises a plurality of radio zones, meaning that radio zones can be used to represent a location of a UE within the multidimensional radio space of the communication network with sub-cell granularity.

Each feature of the distributed resource management model is discussed in greater detail below, with particular reference to FIGS. 6 and 7.

In step 320 of the method 300, the UE performs a measurement of communication network radio resources. Such measurements are regularly performed by the UE according to existing standardised procedures, and may involve measuring signal strength, interference and/or other characteristics of signals that can be detected by the UE. In step 330, the UE assigns a current radio location of the UE to a radio zone of the communication network on the basis of the measurement. As illustrated in FIG. 3a, this may comprise first classifying a vector of results of the measurement into a radio zone in step 330a, and then assigning a current radio location of the UE to the radio zone into which the vector is classified. Any suitable classification algorithm may be used to classify the vector of radio resource measurements to a radio zone. For example, a radio zone may be defined by a measurement envelope around a vector of measurements that represent the radio field environment which is characteristic of the radio zone. A classification algorithm may compare the vector of measurements to the characteristic vector of measurements and measurement envelopes for a plurality of radio zones, until the radio location of the UE is assigned to the radio zone to which the vector of measurements corresponds the most closely. Examples of suitable classification algorithms may include a Self-Organizing Map (SOM), K-Nearest Neighbours, Naïve Bayes, and Support Vector Machine. The distance function included in the distributed resource management model may be used to perform the classification of step 330b. In some examples, the step of classifying a vector of results of the measurement into a radio zone may at the same time update the characteristic measurement vector for the zone into which the measurement results are classified, so updating the radio coverage model in the distributed resource management model to reflect the UE's experienced radio environment. This updating step 370 is discussed in greater detail below with respect to FIG. 3c, but it will be appreciated that, depending upon the classification process used at step 330b, the updating and classification steps 330b and 370 may be performed at the same time, for example via a single process implementing a classification algorithm.

Referring now to FIG. 3b, in step 340, the UE updates a radio trajectory record of its trajectory with the radio zone to which the current radio location of the UE is assigned. This may comprise updating the radio trajectory record in the obtained distributed resource management model with the current radio zone of the UE. In one example, this may comprise, as illustrated at 340a, appending to the record of the UE's trajectory a tuple of time stamp, radio zone identifier of the radio zone to which the UE's location has been assigned, and transition identifier for a transition from the previous radio zone of the trajectory. The time stamp may be the time stamp associated with the performance of the measurement. The radio zone identifier may be any suitable identifier for distinguishing one radio zone from another. The transition identifier may distinguish different types of transition by which a UE may arrive at a radio zone during a trajectory, including:
- "no transition" if a UE is substantially stationary, and consequently does not change radio zones between measurements
- "normal—zone transition without RRC event" if a UE has changed radio zones since the last entry in the trajectory (which may correspond to the last measurement performed by the UE), but this change was not associated with Radio Link Failure, handover or any other Radio Resource Control event;
- "zone transition with intra frequency handover" if a UE has changed serving cell but remains on the same frequency;
- "zone transition with inter frequency handover" if the UE has changed serving cell and changed frequency;
- "zone transition with RAT change" if a UE has changed both serving cell and Radio Access Technology.

Other types of transition between radio zones may also be envisaged.

In step 345, the UE may classify a rate of change of the radio resource environment experienced by the UE on the basis of the updated trajectory record. It will be appreciated that, as discussed briefly above, the rate of change of the radio resource environment of the UE may be related to the physical speed at which the UE may be moving, but is not directly equivalent to the UE's physical speed. The extent to which the radio resource environment will change with physical distance travelled will vary according to the nature of the radio resource environment. In a densely populated urban area, with multiple heterogeneous base stations serving overlapping macro, micro, pico and femto cells, a small change in physical location may result in a significant change in radio resource environment. Conversely, in a highly rural area, many square kilometers may be served by a single macro cell, meaning that considerable physical distance would need to be travelled for a UE to experience any significant change in radio resource environment.

As illustrated in FIG. 3b, the step of classifying a rate of change of the radio resource environment of the UE on the basis of the updated trajectory may comprise, in step 345a, calculating a distance traversed by the UE over the multidimensional radio space on the basis of the updated trajectory record of the UE, that is of the radio zones present in the UE's updated trajectory, over a sliding window. It will be appreciated that the "distance" referred to in step 345a is the distance in the radio space, where each radio resource defines a dimension, and not the physical distance. In step 345b, classifying a rate of change may comprise dividing the calculated distance in the radio space by a time during which the calculated distance was traversed by the UE, in order to obtain a rate of change of the radio resource environment of the UE. Finally in step 345c, the obtained rate of change may classified into one of a plurality of classifications. The classifications may equate to relatively "fast" and "slow" rates of change, corresponding to rates above and below a threshold value, or a finer granularity may be employed, using a plurality of classes of rate of change.

In step 350, the UE uses the distributed resource management model and the updated trajectory record to identify a radio resource action for execution by the UE. This may comprise performing steps 350a, 350b and 350c as illustrated in FIG. 3b. In step 350a, the UE truncates the updated trajectory record over a sliding window. Truncating refers to shortening or limiting of the trajectory record by retaining only a certain number of entries from the UE trajectory record in the truncated trajectory record. Truncating over a sliding window refers to the retaining only of those trajectory record entries that correspond to a sliding window of time. The sliding window may for example describe a threshold number of seconds, milliseconds, etc. extending into the past from a current time instant. The window thus slides over time, always encompassing the same number of seconds, milliseconds or other time interval, but always extending into the past from the current instant, so that the truncated trajectory over the sliding window will encompass the most recent trajectory entries.

In step 350b, the UE compares the truncated trajectory record to each of a set of radio trajectory segments included in a radio action model comprised in the distributed resource management model. In step 350c, if the truncated trajectory record matches any of the radio trajectory segments included in the radio action model, the UE identifies for execution by the UE any radio resource action to which the matched radio trajectory segment is mapped in the radio action model. For the purposes of the present specification, the truncated trajectory record is considered to match a trajectory segment in the radio action model if the truncated trajectory record comprises the same sequence of radio zone identifiers as the trajectory segment, appearing in the same order. For the purpose of the comparison, only the radio zone identifiers of the truncated trajectory are considered, and not the time stamp or transition identifier. It will be appreciated that the sliding window over which the UE truncates its trajectory record may correspond to a number of trajectory entries that is the same as the number of entries in the trajectory segments in the radio action model.

As discussed above, the UE may have classified a rate of change of its experienced radio resource environment in step 345. In some examples, the radio action model may include both trajectory segments and radio speed classifications in its mapping to radio resource actions. For example, the same trajectory segment may be mapped to different radio resource actions when combined with different rates of change of radio environment. This may reflect the differing needs of UEs experiencing rapidly and slowly changing radio resource environment. The inclusion of radio speed classifications in the mapping of the radio action model may therefore assist in tailoring the configuration of UEs to their individual mobility situation. The step 350c of identifying mapped radio resource actions may therefore comprise identifying for execution by the UE any radio resource action to which both the matched radio trajectory segment, and the classified rate of change of the radio resource environment of the UE, are mapped in the radio action model.

In step 360, the UE initiates execution of the identified radio resource action. A radio resource action may for example comprise any action relating to a Radio Resource Control (RRC) reconfiguration procedure as defined in 3GPP. A radio resource action may for example comprise a configuration action for at least one of:

RRC connection mobility control
Intra-RAT mobility
Inter-RAT mobility
Measurement configuration
Measurement report triggering
Measurement reporting
Measurement related actions
IDLE Mode Measurements
UE Information
Logged Measurement Configuration
Release of Logged Measurement Configuration
Mobility history information
Application layer measurement reporting
RAN-assisted WLAN interworking
LTE-WLAN Aggregation
WLAN connection management
RAN controlled LTE-WLAN interworking
LTE-WLAN aggregation with I Psec tunnel
New Radio Beam Failure Recovery Process in NR.

In step 370, the UE updates, in the radio coverage model of the obtained distributed resource management model, a defining radio characteristic of the radio zone to which the current radio location of the UE is assigned on the basis of the measurement. As discussed above, the distributed resource management model may comprise one or more learning parameters for use in such updating, and the UE may use this one or more learning parameters in updating the defining radio characteristic of the radio zone to which the current radio location of the UE is assigned. Also as discussed above, this updating step may be performed concurrently with the classification of a vector of measurement results into a particular radio zone, through the action of a suitable classification process. Classification and updating of radio zones are discussed in greater detail below with respect to example implementations of the methods described herein.

In step 380, on exiting the region of the communication network in which the UE is located, the UE provides to the management node an updated version of the distributed resource management model. As illustrated at step 380, the UE may identify provision of an updated version of the distributed resource management model to the management node as an action for execution by the UE. For example, the radio action model may include a mapping of radio trajectory segments corresponding to at least a threshold probability of handover to a cell in a different region of the communication network to a radio resource action comprising provision of an updated version of the distributed resource management model to the management node. As illustrated at 380a, the updated version of the distributed resource management model comprises the updated trajectory record of the UE through the radio environment of the region, and updated defining radio characteristics of one or more radio zones to which a radio location of the UE has been assigned while located in the region.

FIGS. 4a to 4e show a flow chart illustrating process steps in another example of computer implemented method 400 for managing radio resources used by UEs in a cellular communication network, wherein the communication network comprises a plurality of radio resources, each radio resource defining a dimension of a multidimensional radio space over which the communication network extends. The method 400 provides one example of how the steps of the method 200 may be implemented and supplemented to achieve the above discussed and additional functionality. As for the method 200 discussed above, the method 400 is carried out by a management node, such as a Radio Resource Control (RRC) management node, which may comprise a NM entity. The management node may for example comprise or be instantiated in any part of a logical core network node, network management centre, network operations centre, Radio Access node etc. Any such communication network node may itself be divided between several logical and/or physical functions, and any one or more parts of the management node may be instantiated in one or more logical or physical functions of a communication network node. An example management node is discussed in further detail below with reference to FIGS. 23 and 24.

Figure 4A:
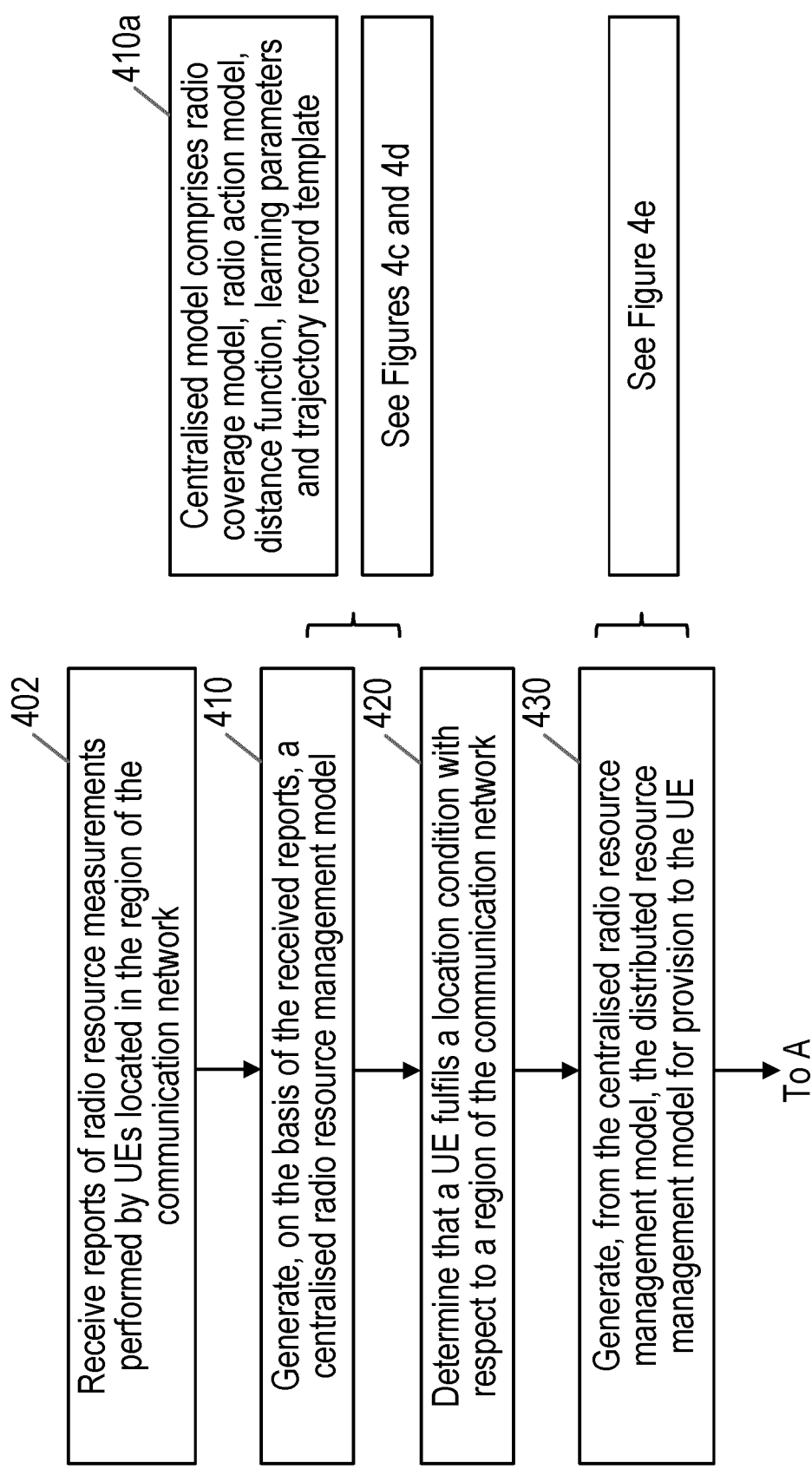
FIGS. 4a to 4e show a flow chart illustrating process steps in another example of a computer implemented method performed by a management node for managing radio resources used by UEs in a cellular communication network.

Referring first to FIG. 4a, the management node receives reports of radio resource measurements performed by UEs located in one or more regions of the communication network. In step 410, the management node generates, on the basis of the received reports, a centralised resource management model for at least one region of the communication network, and may create a centralised resource management model for a plurality of regions of the commination network. The following discussion refers to a single region, but it will be appreciated that equivalent steps and features may apply to centralised resource management models for a plurality of different regions of the commutation network.

As illustrated at 410a, the centralised resource management model comprises:
a centralised radio coverage model including defining radio characteristics of radio zones in the region;
a centralised radio action model including a mapping of radio trajectory segments to radio resource actions;
a distance function used in generating the centralised radio coverage model,
a radio trajectory record for recording UE trajectories through the radio environment of the region of the communication network; and
at least one learning parameter for updating the centralised resource management model on the basis of updated versions of distributed resource management models received from UEs. Depending upon the type of learning to be implemented, the centralised resource management model may comprise a set of learning parameters.

Processes that may be carried out in the step 410 of generating the centralised resource management model are discussed in greater detail below with reference to FIGS. 4c and 4d.

Steps 402 and 410 may be considered as an initial learning phase, in which the management node receives information to enable it to generate the centralised resource management model. The management node may assemble a database of the received information, on the basis of which the centralised resource management model is generated. This model may then be updated as part of an operational phase which incorporates online learning, as the centralised resource management model is updated on the basis of information received from UEs in the form of updated distributed resource management models. The online learning phase thus resembles a federated learning system, in which distributed UEs update a local version of a model and provide the updated local versions of the model to the central management entity.

Referring still to FIG. 4a, in step 420, the management node determines that a UE fulfils a location condition with respect to a region of the communication network. The management node may for example determine that a UE had connected to the communication network from within the region, or is about to enter the region, is entering the region or has just entered the region. In some examples the management node may determine that the UE fulfils the location condition by receiving form the UE an updated distributed resource model for an adjacent region, as the UE prepares to leave the adjacent region. In step 430, the management node then generates, from the centralised resource management model, a distributed resource management model for provision to the UE. The process of generating the distributed resource management model is described in greater detail below with reference to FIG. 4e.

Figure 4B:
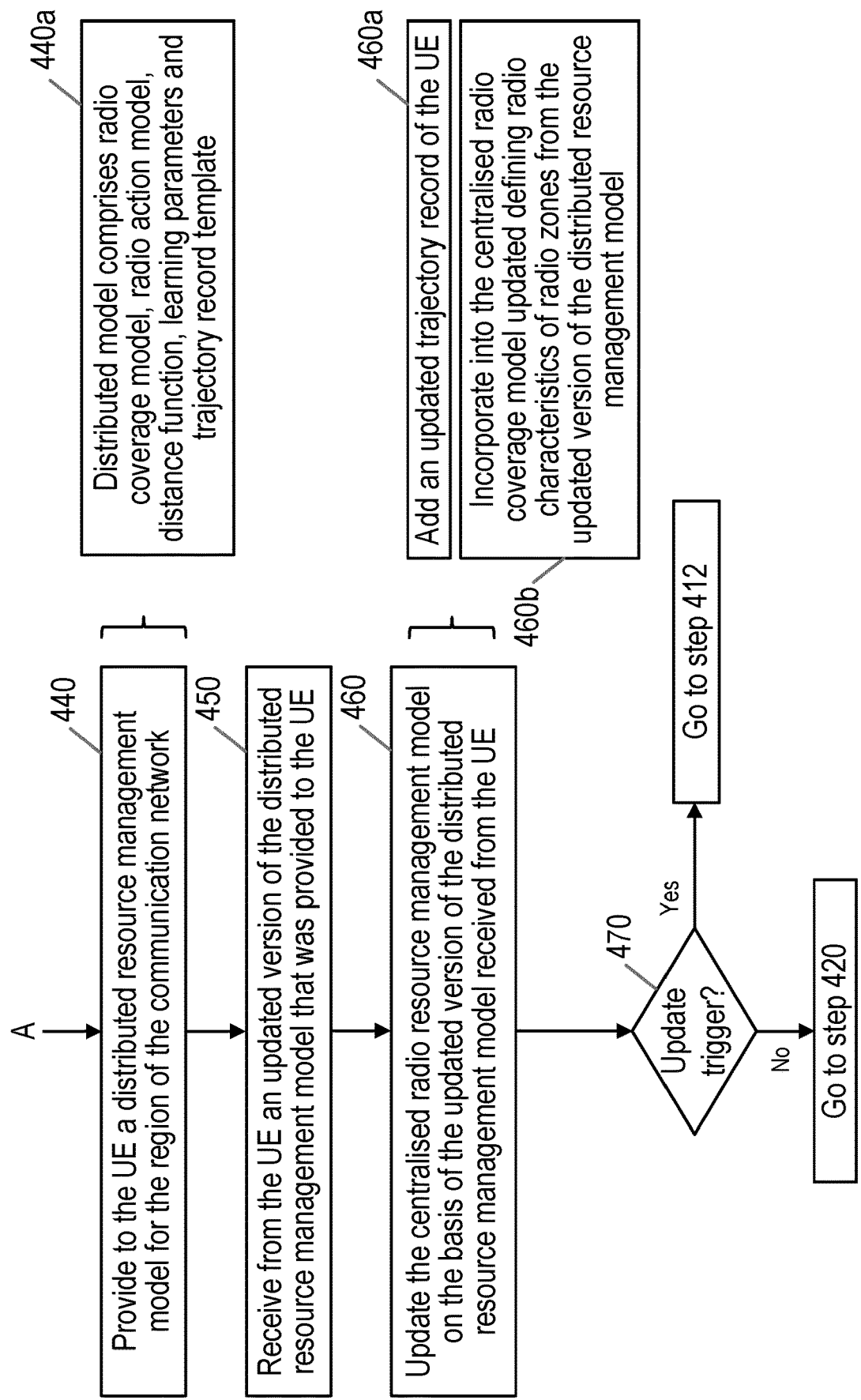

Referring now to FIG. 4b, in step 440, the management node provides to the UE a distributed resource management model for the region of the communication network. The distributed resource management model is operable for use, by the UE, to identify a radio resource action for execution by the UE. As illustrated at 440a, the distributed resource management model comprises:
  a radio coverage model including defining radio characteristics of radio zones in the region (as discussed below, this may be the same radio coverage model as is included in the centralised resource management model);
  a radio action model including a mapping of radio trajectory segments to radio resource actions;
  a distance function for use in assigning a radio location of a UE to a radio zone using the resource management model (as discussed below, this may be the same distance function as is included in the centralised resource management model)
  learning parameters for use by the UE in updating the distributed resource management model; and
  a radio trajectory record for recording a UE's trajectory through the radio space of the communication network.

In step 450, the management node receives from the UE an updated version of the distributed resource management model that was provided to the UE. It will be appreciated that the updated version of the distributed resource management model may be received from the UE when the UE is exiting, will shortly exit, or has recently exited the region of the commination network. A period of time may therefore elapse between the performance of steps 440 and 450, which period of time may correspond to the length of time the UE spends in the region of the communication network. This length of time may vary widely from UE to UE and region to region, depending on the size of the region, the mobility pattern of the UE etc.

In step 460, the management node updates the centralised resource management model on the basis of the updated version of the distributed resource management model received from the UE. As illustrated a 460a, this may comprise adding to the centralised resource management model an updated trajectory record of the UE from the received updated distributed resource management model. Updating the centralised resource management model may further comprise, at 460b, incorporating into the centralised radio coverage model of the centralised resource management model updated defining radio characteristics of radio zones from the updated version of the distributed resource management model. The learning parameters included in the centralised resource management model may be used by the management node in incorporating the updates to the radio coverage model. This process is discussed in greater detail below with reference to example implementations of the methods 200, 400.

In step 470, the management node checks for occurrence of an action update trigger condition. The action update trigger condition may be a time-based condition or an event-based condition. The event may for example be related to a performance-based threshold, network changes, online learning events etc. It will be appreciated that as the radio environment of the communication network evolves, for example with the addition of new cells or other changes, the mapping in the centralised radio action model may become out of date, with for example no actions mapped to trajectories including radio zones in newly added cells. Further, as the defining characteristics of radio zones in the centralised radio coverage model are progressively updated, the actions mapped to trajectories involving such radio zones may become inappropriate, or less than optimal, and this may adversely impact the radio resource management of UEs using the model. In a further example, continual online learning may determine that the optimal mapping between actions and trajectory segments has evolved for any number of reasons relating to network conditions or other factors. Updating the centralised radio action model when negative performance impacts begin to be detected, when changes are made to the network, when online learning suggests that an update is appropriate, and/or on a periodic or scheduled basis, can ensure that the radio resource management offered by the methods discussed herein remains as close as possible to an optimal scenario.

If occurrence of the action update trigger condition is detected, the management node updates the centralised radio action model, by proceeding to step 412 as discussed below with reference to FIGS. 4c and 4d. If occurrence of the action update trigger condition is not detected, the management node returns to step 420, determining that a UE fulfils a location condition with respect to a region of the communication network. It will be appreciated that the steps 420 to 470 of the method may be conducted concurrently and/or repeated for a plurality of UEs in the communication network, which plurality may for example include pluralities of UEs in each of multiple different regions of the communication network.

As discussed above, FIG. 4c illustrates processes that may be carried out by the management node in the step 410 of generating the centralised resource management model.

Figure 4C:
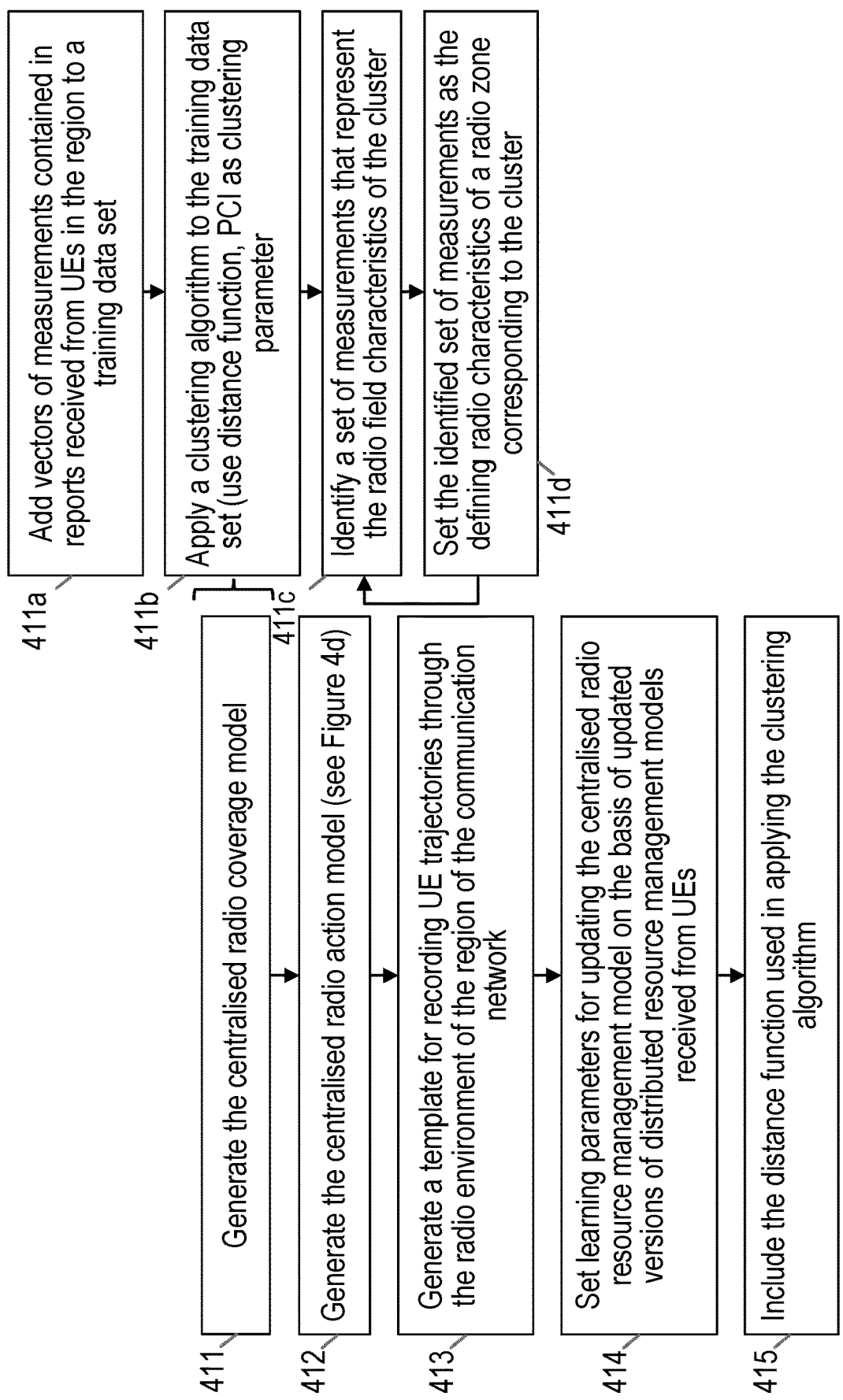
Figure 4D:
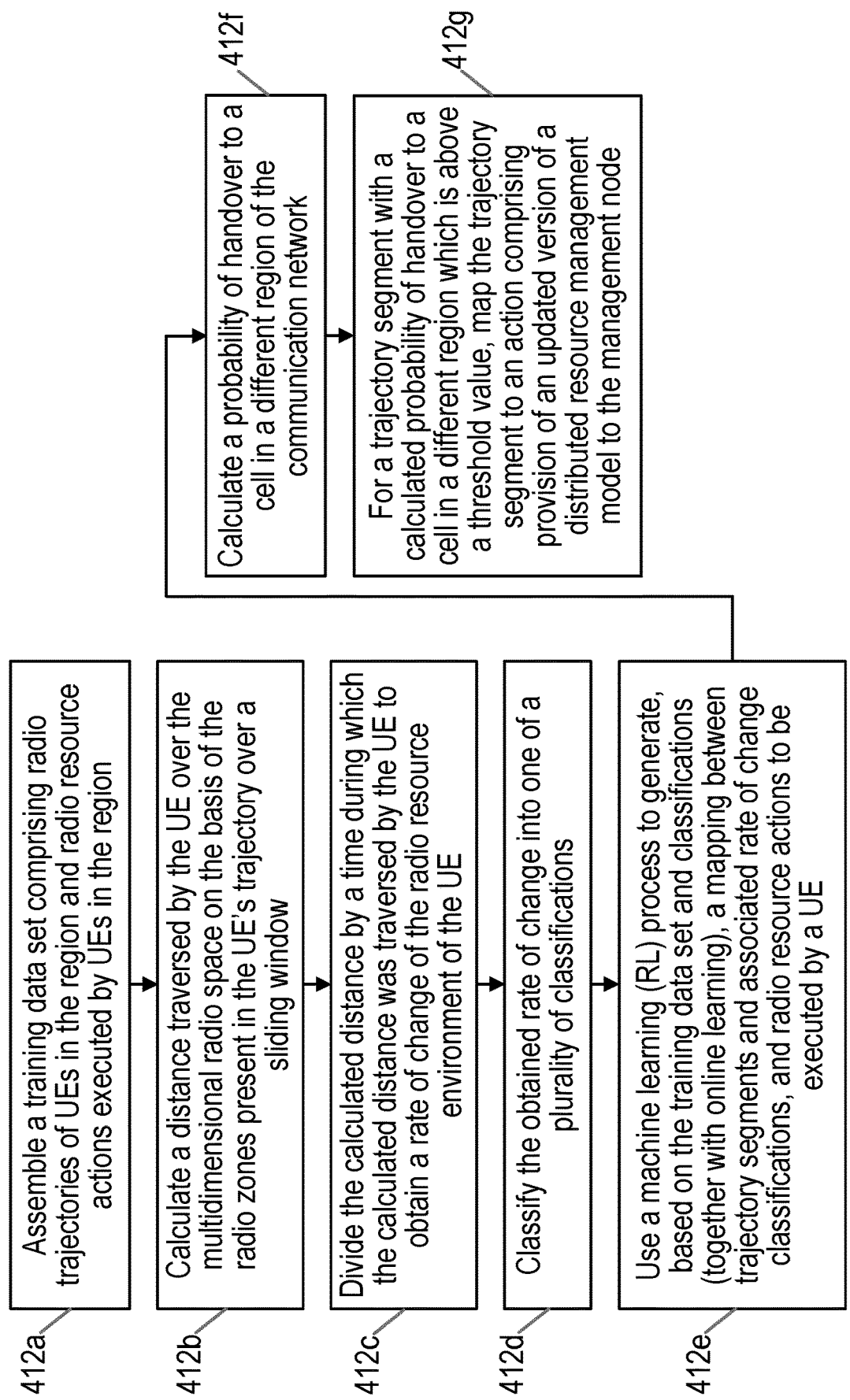

Referring now to FIG. 4c, when generating the centralised resource management model, the management node may first generate the centralised radio coverage model in step 411. This may comprise, in step 411a, adding vectors of measurements contained in reports received from UEs in the relevant region of the communication network to a training data set. In step 411b, the management node may apply a clustering algorithm to the training data set using a distance function, which function may be included in the centralised resource management model in a later step. In some examples, Physical Cell Identity (PCI) may be set as a clustering parameter, such that a probability that a Handover between cells is accompanied by a transition between radio zones is increased. Following step 411b, for clusters identified by the clustering algorithm, the management node identifies a set of measurements that represent the radio field characteristics of the cluster in step 411c, and sets the identified set of measurements as the defining radio characteristics of a radio zone corresponding to the cluster in step 411d. Further detail of example clustering processes is discussed below.

Referring still to FIG. 4c, following generation of the centralised radio coverage model in step 411, the management node generates the centralised radio action model, which includes a mapping of radio trajectory segments, and associated rate of change of radio environment classifications, to radio resource actions. The processes that may be involved in generating the centralised radio action model are illustrated in FIG. 4d, as discussed below.

In step 413, the management node generates a radio trajectory record for recording UE trajectories through the radio environment of the region of the communication network.

In step 414, the management node sets learning parameters for updating the centralised resource management model on the basis of updated versions of distributed resource management models received from UEs. The parameters may for example control the weight given to individual updates from UEs compared to that given to the existing version centralised model.

Finally, in step 415, the management node includes in the centralised resource management model the distance function used in applying the clustering algorithm in step 411b.

As discussed above, FIG. 4d illustrates process steps that may be carried out in the generation of the centralised radio action model at step 412 of FIG. 4c. Referring to FIG. 4d, generating the centralised radio action model may comprises, in a first step 412a, assembling a training data set comprising radio trajectories of UEs in the relevant region of the communication network and radio resource actions executed by UEs in the region. The training data set may be assembled in the form of a database of UE trajectories, for example including trajectory counts of frequently occurring trajectories, and associated transition types and radio resource actions executed. The management node may then, for UE trajectories in the assembled training data set, classify a rate of change of the radio environment during the trajectory. This may comprise, in step 412b, calculating a distance traversed by a UE over the multidimensional radio space on the basis of the radio zones present in the UE's trajectory over a sliding window. In step 412c, classifying comprises dividing the calculated radio distance by a time during which the calculated radio distance was traversed by the UE to obtain a rate of change of the radio resource environment of the UE. Finally, in 412d, classifying comprises classifying the obtained rate of change into one of a plurality of classifications. As noted above, the steps 412b, 412c and 412d may be completed for multiple trajectories in the training data set.

In step 412e, the management node uses a machine learning process to generate, based on the training data set and classifications, a mapping between trajectory segments and associated rate of change classifications, and radio resource actions to be executed by a UE. In some examples, the mapping may only be between trajectory segments and radio resource actions, but it will be appreciated that including the radio environment rate of change classifications in the mapping will allow for a finer control and tailoring of actions to UE mobility behaviour. The machine learning process may comprise a Markov chain based prediction process, and/or may comprise a Reinforcement Learning process. In some examples, the machine learning process may be used in a live learning phase to continue to update the centralised radio action model during live operation.

As discussed above, in some examples of the present disclosure, the centralised radio action model may include a mapping of radio trajectory segments corresponding to at least a threshold probability of handover to a cell in a different region of the communication network to a radio resource action comprising provision of an updated version of a distributed resource management model to the management node. In such examples, generating the centralised radio action model may further comprise, in step 412f, for UE trajectory segments in the assembled training data set, calculating a probability of handover to a cell in a different region of the communication network, and, in step 412g, for trajectory segments with a calculated probability of handover to a cell in a different region of the communication network which is above a threshold value, mapping the trajectory segments to an action comprising provision of an updated version of a distributed resource management model to the management node.

As discussed above, a radio resource action may for example comprise any action relating to a Radio Resource Control (RRC) reconfiguration procedure as defined in 3GPP. Examples of possible radio resource actions are provided above with reference to FIG. 3c.

Figure 4E:
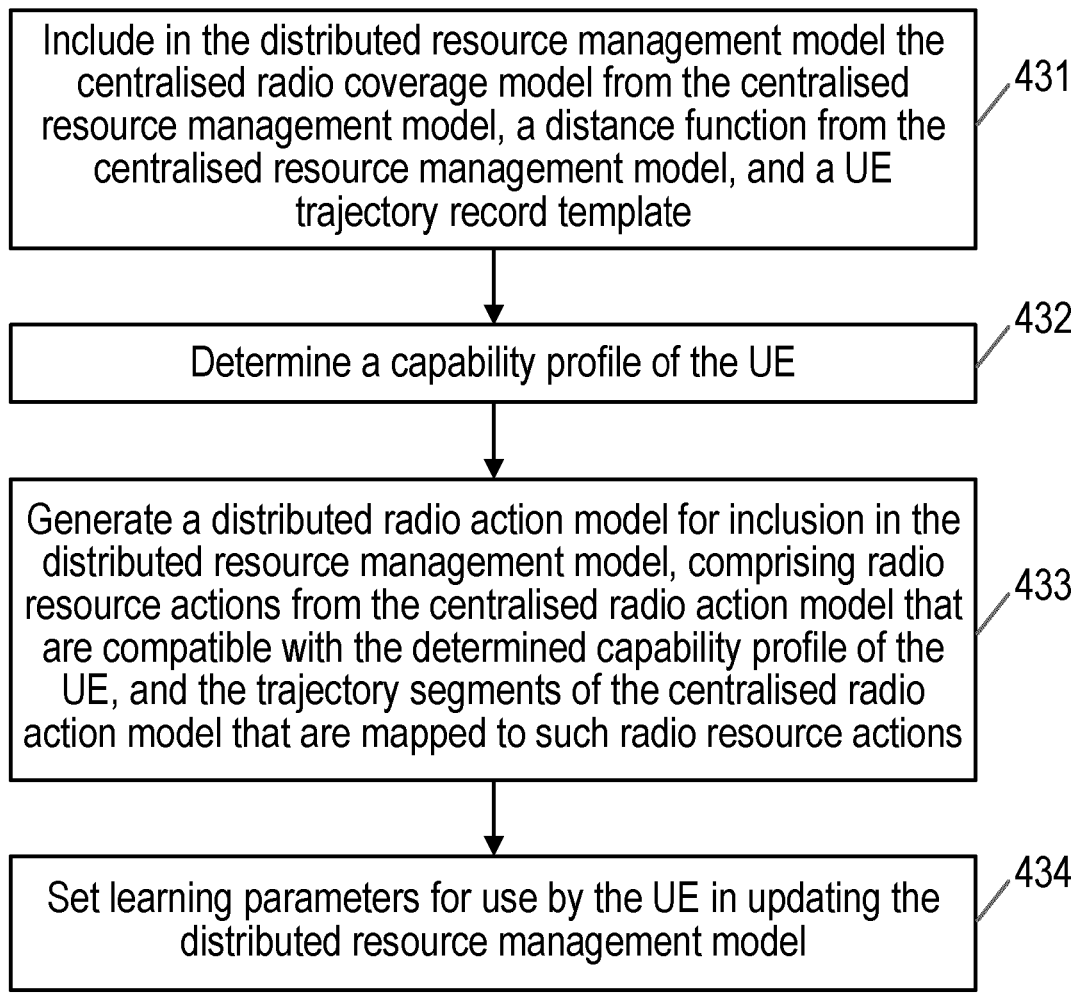

FIG. 4e illustrates process steps that may be carried out in the step 430 (discussed above) of generating, from the centralised resource management model, the distributed resource management model for provision to the UE. With reference to FIG. 4e, generating the distributed resource management model may comprise, in step 431, including in the distributed resource management model the centralised radio coverage model from the centralised resource management model, a distance function from the centralised resource management model, and the radio trajectory record from the centralised resource management model for recording the UE's trajectory through the radio space of the communication network. It will be appreciated that the distance function in the distributed version of the resource management model, to be used by a UE in assigning its current radio location to a radio zone, is therefore the same as that which was used by the management node for generating the radio coverage model that includes the defining characteristics of the radio zones and is provided to the UE.

Generating the distributed resource management model may further comprise, in step 432, determining a capability profile of the UE, and, in step 433, generating a distributed radio action model for inclusion in the distributed resource management model from the centralised radio action model, wherein the distributed radio action model comprises radio resource actions from the centralised radio action model that are compatible with the determined capability profile of the UE, and the trajectory segments of the centralised radio action model that are mapped to such radio resource actions. It will be appreciated that the centralised radio action model, being generated from a training data set comprising radio trajectories of multiple UEs and radio resource actions executed by those UEs, may include actions of which not all UEs are capable. For example, a UE comprising a Machine Type Communication (MTC) device may not have the same functionality as a UE comprising a smartphone. Retaining in the distributed radio action model only those actions (and mapped trajectories and classifications), that are compatible with the capabilities of the UE to which the distributed radio action model is to be provided ensures that the radio action model is tailored to the particular UE. The capability profile may be requested directly from the UE or may be obtained indirectly, for example by retrieving a capability profile associated with a device type of the UE, which may be provided by the UE as part of other signalling or retrieved from subscriber information.

Finally, in step 434, generating the distributed resource management model may comprise setting learning parameters for use by the UE in updating the distributed resource management model. Such parameters may differ from those of the centralised resource management model, which are for use by the management node in incorporating updates from UEs into the centralised resource management model. In addition, the learning parameters may also be tailored to the capabilities of the UE, as discussed above with reference to the radio action model. In this manner, the learning parameters may be set so as to be appropriate for the learning capabilities of the UE.

FIGS. 3a to 4e discussed above provide an overview of methods which may be performed according to different examples of the present disclosure. The methods involve the tracking by a UE of its trajectory through the multidimensional radio space over which a region of a communication network extends. The tracked trajectory is used by the UE, together with a distributed resource management model, to identify radio resource actions for initiation by the UE, so replacing much of the existing RRC signalling which places such a significant burden on communication network capacity. There now follows a detailed discussion of how different process steps illustrated in FIGS. 1, 2 and 3a to 4e, and discussed above may be implemented, using example message flows according to the present disclosure and referring to FIGS. 5 to 20.

Figure 5:
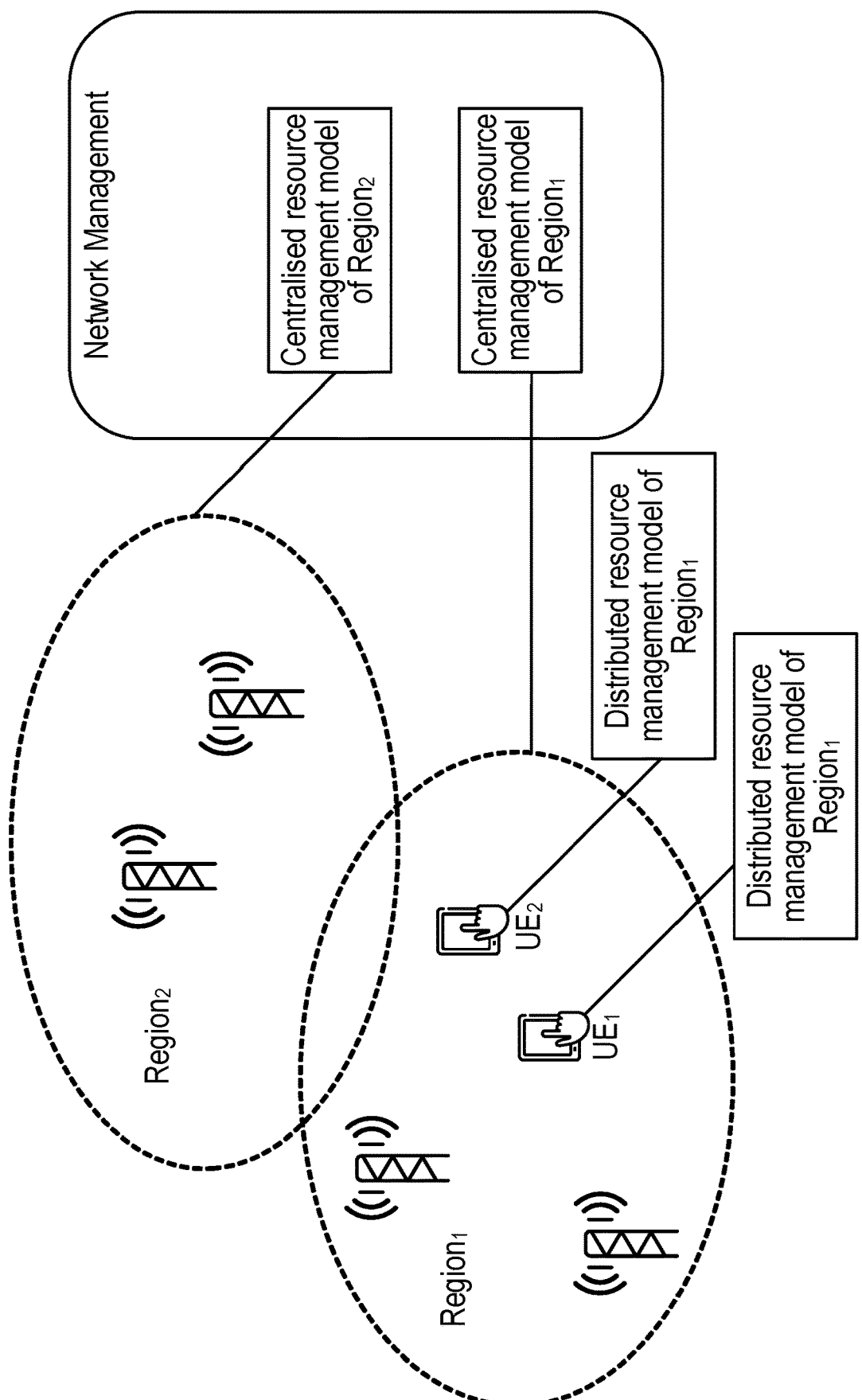
FIG. 5 illustrates an overview of an automatic RRC configuration system.

FIG. 5 illustrates an overview of an automatic RRC configuration system 500, elements of which may implement the methods disclosed herein. FIG. 5 illustrates the centralised resource management model, held by a management node. As discussed above, the management node may be considered as an entity forming part of the overall Network Management (NM), and in the following discussion of example implementation detail, the terms Network Management (NM) and management node may be used substantially interchangeably. It will be appreciated that where reference is made to NM in the context of examples of the present disclosure, the reference refers to functions that may be carried out be examples of a management node as disclosed herein. FIG. also illustrates the distributed versions of the resource management model held at different UEs. When a UE moves from one region to another, it returns an updated version of the relevant model to NM and it receives an appropriate distributed version of the resource management model for the region that it is entering. In order to ensure a smooth transition, the regions may overlap to some extent, and the handover over regions can be made soft. When NM receives an updated distributed resource management model of a region returned by a UE, it enriches the centralised model for that region on the basis of the updates contained in the version returned by the UE.

As discussed above, the coverage area of a mobile network may, according to examples of the present disclosure, be divided up into regions, such that the physical cell IDs (PCI) of cells can be considered unique within each region. This has the effect of ensuring that within a given region, a PCI detected by any of the UEs in the region unambiguously belongs to the same cell. Typically, the coverage area of 70 cells of a frequency carrier can be set as a region, and regions may overlap. The centralised resource management model is a model for such a region. When a UE is about to enter a region, NM provides the UE with a distributed resource management model for the region it is about to enter. NM may additionally provide distributed resource management models for a small number of overlapping or neighbouring regions, such as for example two neighbouring regions to the region the UE is about to enter. The distributed resource management model is based on the centralised resource management model for the relevant region, and may be tailored to the particular UE, as discussed above.

Also as discussed above, every region is further divided into non-overlapping radio zones. There are a finite number of radio zones within a region, typically between 8 and 10 zones per cell, resulting in about 560-700 radio zones per region. If the non-overlapping radio zone division of a region is correct, then the radio environment, that is the field strength measurable from the surrounding cells, within a zone is similar for all UEs. This has the effect of ensuring that a zone can be characterized by a set of field strength values and their associated PCIs. These are the field strength values and associated PCIs of signals from cells that are detectable within the radio zone.

Figure 6:
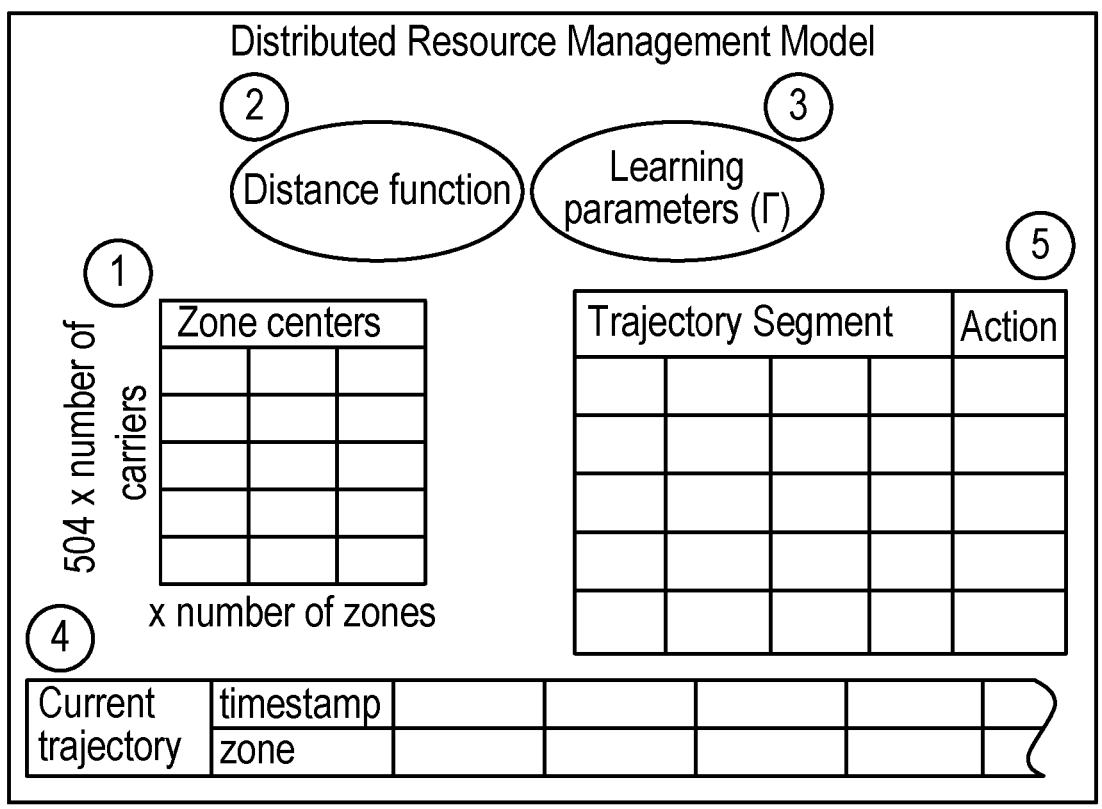
FIG. 6 is a representation of an example distributed resource management model.
Figure 20:
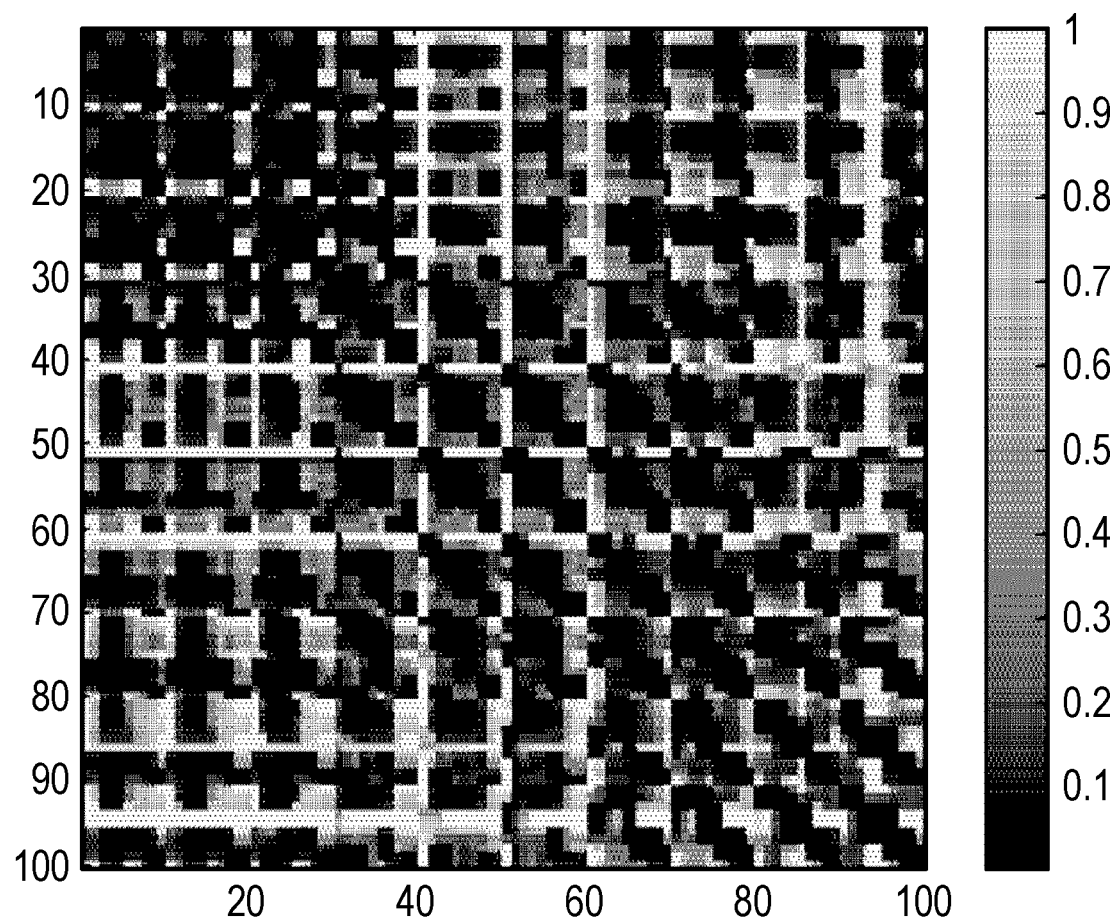
FIG. 20 illustrates "radio distances" between radio zones of the SOM of FIG. 17.

FIG. 6 is a representation of an example distributed resource management model, provided to a UE by a management node. As illustrated in FIG. 6, the components of the distributed resource management model are:

1. Distributed Multi-Layer Radio Coverage Model
    This is a table having dimensions of the number of radio zones in the region x number of possible PCIs. As an example, in an LTE network, 504 PCIs exist per frequency carrier, and so the number of possible PCIs is the number of frequency carriers multiplied by 504. A radio zone is characterized by the vector of field strength values placed in a column of the table. If a cell is not visible within the zone, then that cell has a zero value or remains empty depending how the field strength values are represented. Typically, only a very small fraction cells will be visible in any one radio zone, meaning the characteristic vector for a radio zone is likely to be highly sparse.
2. Distance Function
    This is a metric describing how close two vectors in the radio space are to each other, and consequently may be applied to columns in Table 1 of FIG. 6, to describe how close zone centres are to each other. The function may return a value in the range [0, 1], as in the present example implementation, when applied to any two vectors possibly occurring in the space spanned by the physical cell ids. FIG. 20, discussed below, shows an example for the inter-zone distances in a region comprising one hundred radio zones.
3. Set of Learning Parameters
    As discussed above, the UEs themselves can improve the resource management model through updating of the radio coverage model. Such learning is typically controlled by some parameters, which can be customised to the UE by NM.
4. UE Trajectory Record
    The UE's trajectory can be described by a sequence of tuples, each tuple comprising, for example, a time stamp of entering a radio zone, the radio zone id, and the type of transition by which the UE entered the zone. The type is typically "normal", i.e. no RRC event can be connected to it. However, in some cases, including for example a radio zone transition that is accompanied by a cell handover, the transition type may be distinguished by the nature of the accompanying RRC event. An active UE gradually builds up this trajectory record in time, and whenever a region change occurs, it returns the trajectory record to NM together with the coverage model that the UE has updated including its experiences over the trajectory in the region.

5. Distributed Radio Action Model

This is a distributed version of the complete radio action model held by NM as part of the centralised resource management model. The radio action model is a lookup table, in which the search field of records corresponds to a fixed-length trajectory segment, and the indexed item is an RRC-related action that the UE should perform when passing through the trajectory segment (this is discussed in greater detail below). Although not illustrated in FIG. 6, the radio action model may also include a rate of change of radio environment classification in the search fields, such that a combination of rate change classification and trajectory segment are mapped to specific RRC related actions.

Figure 7:
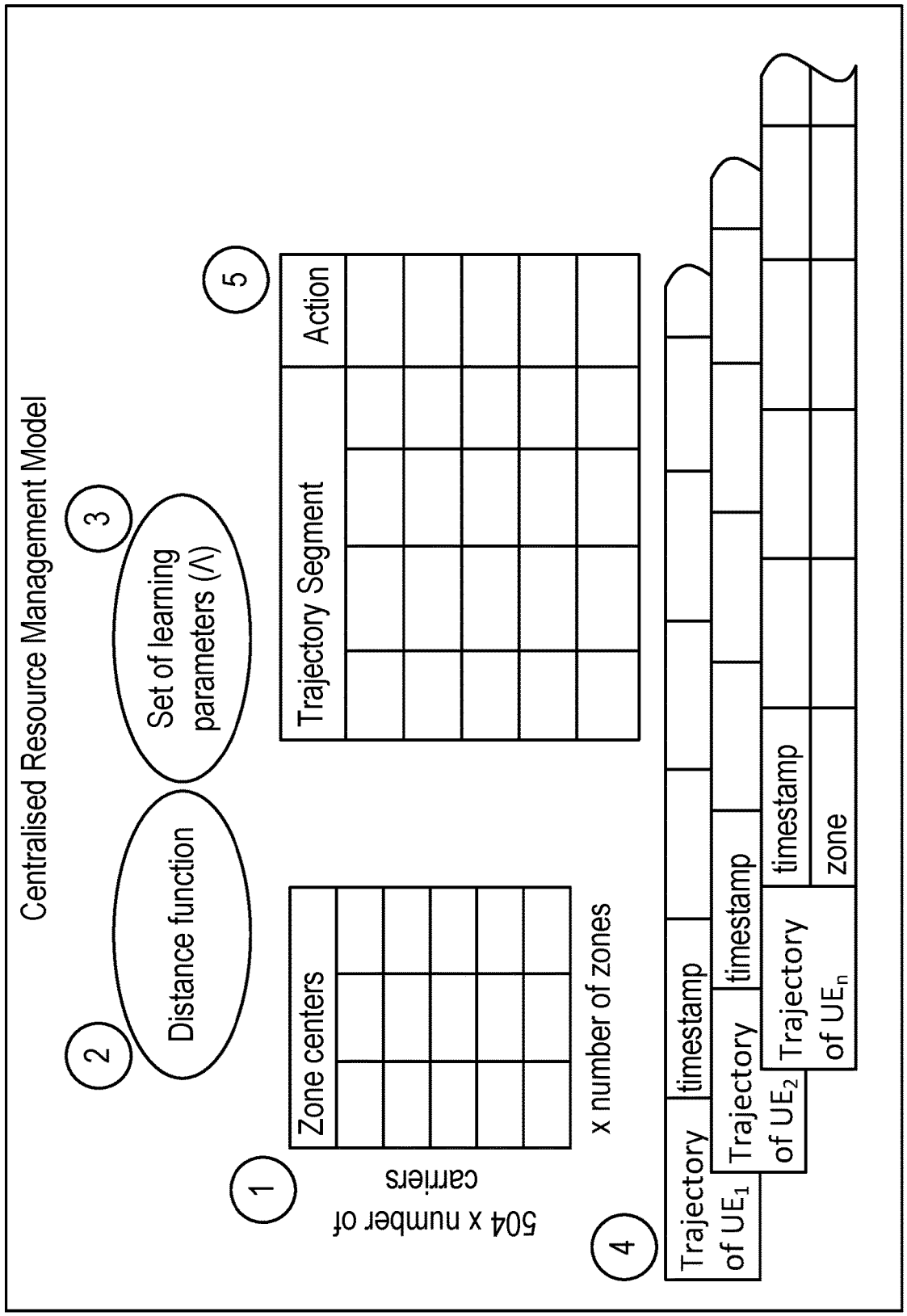
FIG. 7 is a representation of an example centralised resource management model.

FIG. 7 is a representation of an example centralised resource management model, generated and maintained by a management node. As illustrated in FIG. 7, the components of the centralised resource management model are:

1. Centralised Multi-Layer Aggregated Coverage Model

This is the central version of the table described above with reference to FIG. 6. The centralised version of the table is provided to the UE as part of the distributed resource management model. The table is then updated by the UE while in the region, and returned to NM so that the updates can be incorporated into the centralised version when the UE exits the region.

2. Distance Function

This is the same distance function as in the distributed resource management model.

3. Set of Learning Parameters

This set of parameters control how a UE's version of the model is incorporated into the centralised version of the model when the UE leaves the region and returns its updated version. This learning parameter set, as well as the learning technique, can be different to the parameters and technique used by the UEs and included in the distributed resource management model.

4. UE Trajectories

This component of the centralised model is a database holding the trajectories of many UEs. NM (the management node) may generate and update the centralised radio action model based on this database.

5. Centralised Radio Action Model

This is the superset of the distributed versions of the radio action model provided to UEs, and contains actions for UEs with many different capabilities. When a UE enters the region, NM sends to the UE only the part of the table that matches the UE's capabilities.

The following sections of the description cover in greater detail the definition of a radio environment, comprising a multidimensional radio space of field strength values, with dimensions corresponding to radio resources such as neighbour cells and beams using various Radio Access Technologies (RATs) and carriers. Also discussed are the division of the radio environment into radio zones, description of the motion of UEs along these zones, radio speed classification, mapping of trajectories to radio resource actions, and updating of distributed and centralised resource management models.

UE Localisation in Radio Space

The following discussion covers implementation detail relating to different aspects of UE localisation with reference to the methods of the present disclosure. This includes the multidimensional radio space of the communication network, division of the radio space into radio zones by the management node, and assigning by the UE of its current radio location to a radio zone. The following discussion thus relates in particular to step 330 of the method 300 and steps 402, 410 and 411 of the method 400.

Step 330 of the method 300 involves assigning a current location of a UE to a radio zone on the basis of a measurement. As mentioned earlier, the coverage area of the communication network is divided into regions, such that a physical cell id within a region unambiguously identifies one of the cells. The regions are further divided into non-overlapping radio zones. The number of zones can depend on the deployment; a network with dense deployment and multiple frequencies can have more distinguished radio zones and thus enable a better separation than a sparse deployment.

As discussed above, in an LTE network, 504 PCIs per carrier exist, and this defines the maximum number of cells detectable in a region. A vector space may be defined that is spanned by the detectable cells in a region. The maximum dimensionality of the vector space is the number of carriers multiplied by 504. On the axes of this multidimensional radio space, field strength of signals detected by a UE can be indicated, showing how strongly a UE can receive signals from the cells it is able to detect. Active UEs regularly takes measurements on intra- and inter-frequency carriers, and detects neighbour cells by their PCIs. If the measurements at different carriers or RATs are close in time, then the unified set of measurements describe a point in the above defined vector space.

Figure 8:
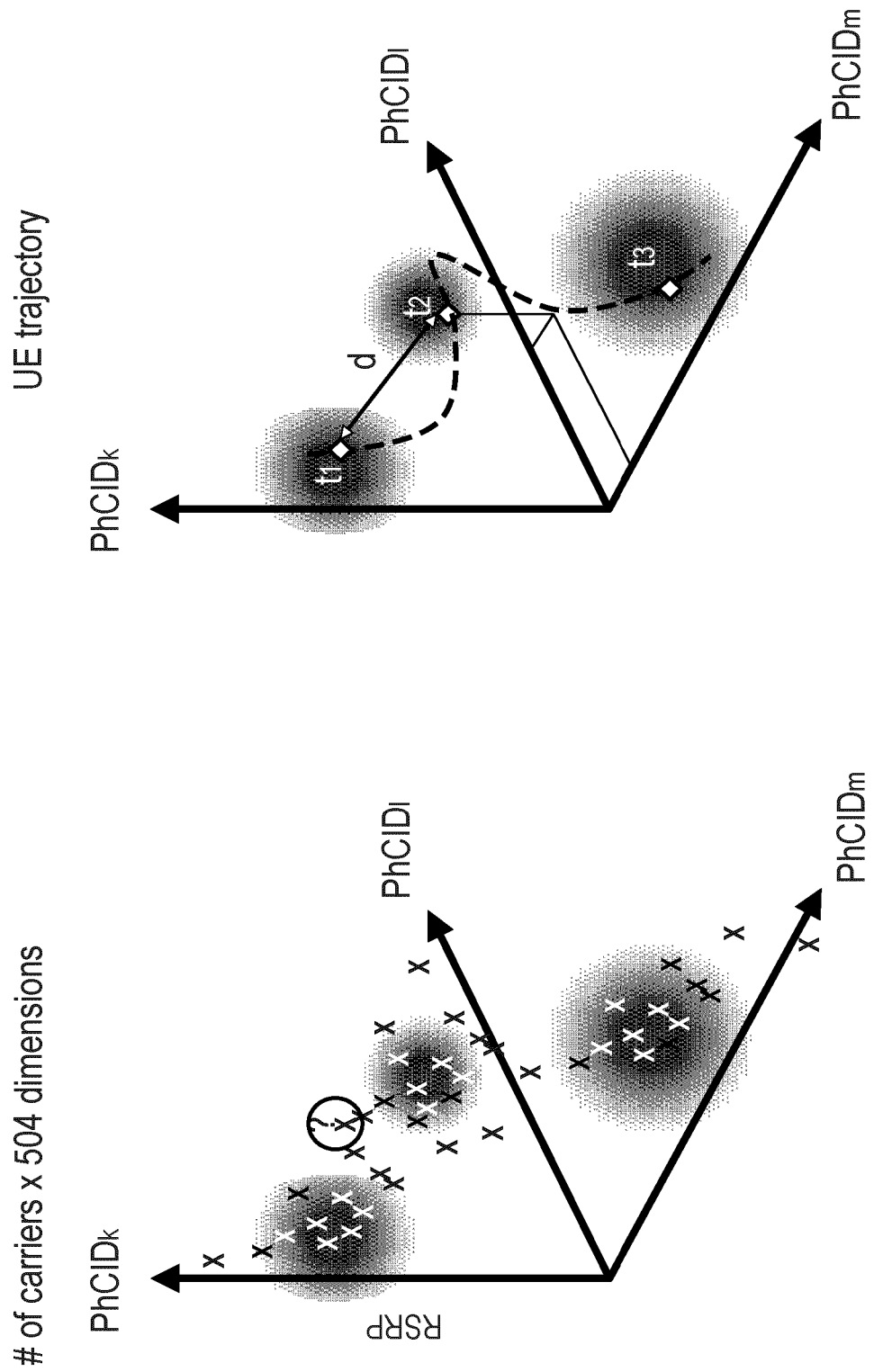
FIG. 8 illustrates a vector space of neighbour-cell field strength (RSRP) measurements.

FIG. 8 illustrates the vector space of neighbour-cell field strength Reference Signal Received Power (RSRP) measurements. UEs detect and evaluate reference symbol measurements from the surrounding cells and obtain measurement values including RSRP and Reference Signal Received Quality RSRQ. UEs can then report these values to NM in a periodic or event-triggered manner. RSRP is typically used to characterize the field strength in an LTE network, so these are the values plotted in the vector space in FIG. 8. This vector space is very sparse as only a limited subset of cells can be seen by a UE at any given location, so the measurement points are mostly along a single axis or on hypersurfaces spanned by only a few axes.

By collecting a great number of measurements from a large set of UEs over a long observation period, during which the network configuration is not changed, it is possible to generate a data set for use in the initial learning of coverage (see for example steps 402, 410, 411 above). The learning technique for generating the radio coverage model can be clustering, which divides the vector space into non-overlapping zones, as illustrated on the left of FIG. 8. Example implementations may seek to obtain approximately one order of magnitude more zones than cells in the region. A clustering technique suitable for the present disclosure returns a vector for each radio zone. This vector is the radio zone (cluster) centre, which may be considered as the representation of the typical radio environment in that zone. Once the zones have been established, every neighbour-cell measurement can be classified into one of the zones on the basis of its similarity to the characteristic vectors of the zone centres (see for example step 330 above).

The settings of the distance function, discussed below, may allow for the radio zones to be more granular at cell borders, where the radio environment varies more rapidly to moving UEs. The UE trajectory is the timestamped sequence of radio zones (zone ids) to which the neighbour-cell UE measurements are classified. The right side of FIG. 8 illustrates a UE trajectory over three radio zones, with measurements at times t1, t2 and t3 being classified into each of three different radio zones.

Both the clustering process for defining radio zones, and the classifying process for assigning a measurement set to a radio zone, use a distance/similarity metric, which is applicable to neighbour-cell measurement sets. These sets comprise tuples of PCI and RSRP, such that the comparable sets have both common and different cell ids in the set. Some customary distance functions, like Euclidean distance, are not appropriate for clustering and classifying of the present disclosure. In contrast, a distance function which compares RSRP values on the cells that are common to both sets would be appropriate. A suitable distance metric is proposed in WO2019/158210. An example distance metric suitable for the clustering and classification may consider (1) the number of cells that are visible in both of the neighbour-cell measurement sets that are being compared, and (2) how close the measurable field strength values are for the cells visible in both neighbour-cell measurement sets. Different weighting of the various comparison factors in the similarity metric has a strong influence on clustering, and hence on the zoning layout of a region.

A candidate distance function should reflect that similar RSRP measurements on a given cell in the compared two sets bring the measurement sets closer. In addition, similarity on cells with higher RSRP values should be weighted more highly when compared to cells with less reliable, weaker signals. According to 3GPP TS 36.331 V15.8.0, UEs compute their RSRP measurements in dBm, and they offset the values by 140 dBm before they report those to NM. The reported values fall in the range of [0; 97] dB for the visible cells, and the value comparisons are performed on these values at logarithmic scale. The visibility of neighbour cells is also an indication of location, and so the greater the number of common cells in the compared sets, the greater similarity between them. The following metric reflects the above objectives in defining a radio fingerprinting distance function. Let S be set of cell ids of cells which are visible to a UE, so that the UE takes RSRP measurements on these cells at a given place and time. The set includes at least the serving cell id and not more than 8 neighbour cell ids in case of LTE. Let T be another set of cell ids of cells which are visible to another UE at another place and time. Let $MS$ and $M_T$ be the corresponding RSRP measurement values for the cells in S and T, respectively. Let $C = S \cap T$ be the set of ids of cells which are visible to both UEs. If $i \in C$, then the cell with id i is visible to both UEs. Let $m_S^i \in M_S$ and $m_T^i \in M_T$ be the RSRP measurements on this cell by the two UEs. A distance metric along the RSRP measurements on the cells visible to both UEs can be defined as follows:

$$D_{S,T} = \left(1 + k \cdot \sum_{i \in C} \frac{m_S^i + m_T^i}{2m_0 \cdot |m_S^i - m_T^i|}\right)^{-1} \in (0, 1]$$

The parameter $m_0$ in the numerator above is a parameter acting as a normalizing RSRP value. In one example, the parameter $m_0$ can be the maximum RSRP value 97, then the term $m_S^i + m_T^i / 2m_0$ in the sum is a weighting factor for the value similarity expressed by the inverse of the RSRP difference $|m_S^i - m_T^i|^{-1}$, so the sum becomes larger when comparing stronger signals and with smaller differences between the measured RSRP values. At the same time, with increasing number of cells visible to both UEs the similarity increases and the distance Ds, T decreases. The positive multiplier k is an experimental parameter, which tunes the weight of multiple cell visibility in the distance function. k<1 strengthens the factor of multiple cell visibility, while k>1 strengthens measurement value similarity.

The distance function discussed above may be suitable for both the clustering process of generating radio zones and for the assigning of a current radio location of a UE to a radio zone through classification of the measurement set for the current location.

UE Trajectory Building

The following description relates in particular to step 340 of the method 300. The trajectory of an individual UE may be represented as a graph comprising a sequence of radio zone IDs and the timestamps of visits, that is the timestamps of the relevant measurements that were classified into the visited radio zone. The transitions of a trajectory graph can be categorized into a particular type according to associated RRC event. For example, a transition from one radio zone to another can involve a handover or can be interrupted by radio link failure. Transitions along a UE trajectory can be marked with RRC events that occur, so that these events become part of the timeline.

Figure 9:
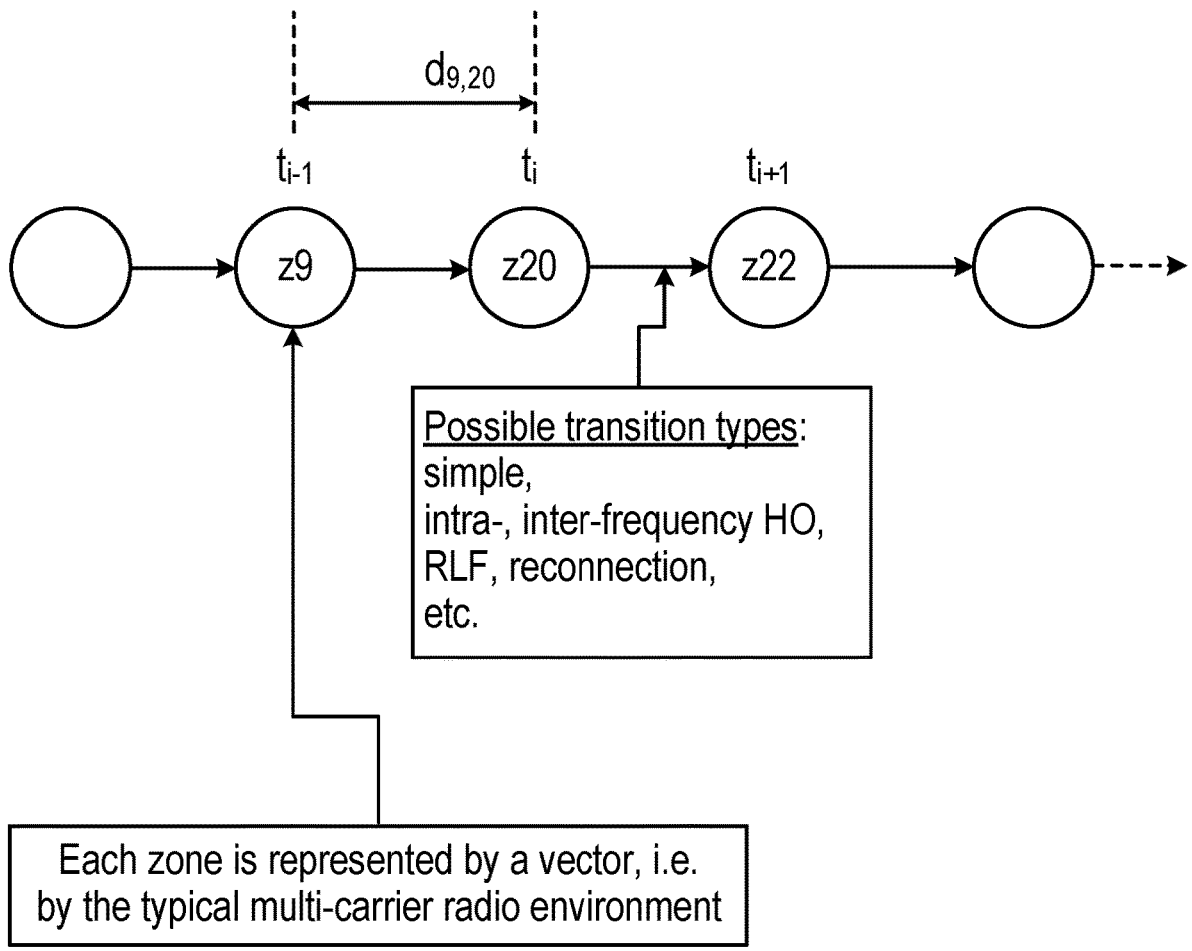
FIG. 9 illustrates a UE motion trajectory.

FIG. 9 illustrates the compact description of a UE motion trajectory over the radio zones in a multi-dimensional radio space. FIG. 9 shows a sequence of nodes, in which each node represents a radio zone to which the UE location was assigned on the basis of a neighbor-cell RSRP measurement. The edges of the graph of FIG. 9 correspond to transitions between radio zones corresponding to two consecutive measurement reports over time. Radio zone repetition, for example when a UE is stationary and so remains in a particular zone for a several measurements, are maintained in the trajectory, such that each entry in a trajectory corresponds to a consistent time step.

With reference to FIG. 9, the transition between radio zones is called normal when there is no coincident RRC event in relation to the UE during the transition. Most transitions are normal, but some transitions coincide with certain radio link events, including handover between cells, transition between carriers or potentially radio link failure. Such transitions are marked and can be used in computation of statistics as well as for the generation, by NM (the management node) of the radio action model.

When a UE leaves a region, it sends its updated distributed resource management model, including its record of the trajectory it has followed while in the region, to NM. As discussed below, the rate of change of the radio environment, or "radio speed" of the UE is implicitly encoded into the trajectory timeline thanks to the time stamps and radio zone ids, and may be used by NM in the generation of the radio action model, so as to map the combination of trajectory segments and radio speed classifications to specific radio resource actions.

Speed Classification of UE Motion

A UE may classify its own "radio speed" or rate of change of radio environment, in step 345 of the method 300. The management node may also classify UE radio speed based on trajectory information in order to generate the radio action model.

As discussed above, a clustering technique suitable for the present disclosure returns a vector for each radio zone. This vector is the radio zone (cluster) centre, which may be considered as the representation of the typical radio environment in that zone. If the distance function used to generate the clusters that comprise the radio zones is applied to a pair of radio zone centres, then a metric of the change of radio environment with transition from one zone to another is obtained. This metric may be considered as a measure of the "radio distance" that a UE travels through the multidimensional radio space between one radio zone and another. The rate of change of the radio environment can thus be calculated by dividing this metric, or "radio distance" by the time between measurement sets classified to the two radio zones.

As discussed above, the rate of change of the radio environment, also referred to as the "radio speed" of the UE, may be related to the physical speed of the UE, that is the rate of change of its physical environment, but the two concepts are not equivalent. UEs that experience a rapidly changing radio environment may be moving quickly through the physical environment, and/or may be moving through a dense radio environment that changes significantly with physical displacement. Frequent and drastic changes in the radio environment appear as a large radio distance covered by UEs in the radio space, which may correlate more or less closely with a physical distance covered, depending on the nature of the radio environment. For example, in a micro-cell environment, where the carrier frequency is in the 2.5-5 GHz domain, a UE moving at a speed of 6 km/h can experience a rate of change of its radio environment that is the same as if the UE moved at a speed of 120 km/h in a macro cell environment operating below 2 GHz.

The Radio Action Model

A centralised radio action model is generated by the management node in step 412 of the method 400, and a distributed radio action model is generated from the centralised radio action model in step 433. The distributed radio action model is used by a UE in step 350 of the method 300 to map trajectory segments and radio speed classifications to radio actions for initiation.

When generating the centralised radio action model, the management node may include in the model the commonly occurring UE motion patterns of a region. Such information can be extracted from the many trajectories that UEs traverse and report to NM in the region. When a sufficient number of trajectories have been assembled, mobility prediction can be achieved. Several prediction techniques can be considered. In the present discussion, Markovian chain prediction is illustrated as an example, in which probabilities of the possible trajectory continuations are approximated with Bayesian relative occurrence ratios. The relative occurrences are based on the historical UE runs counted over a preceding period while the network configuration can be considered as unchanged.

Figure 10:
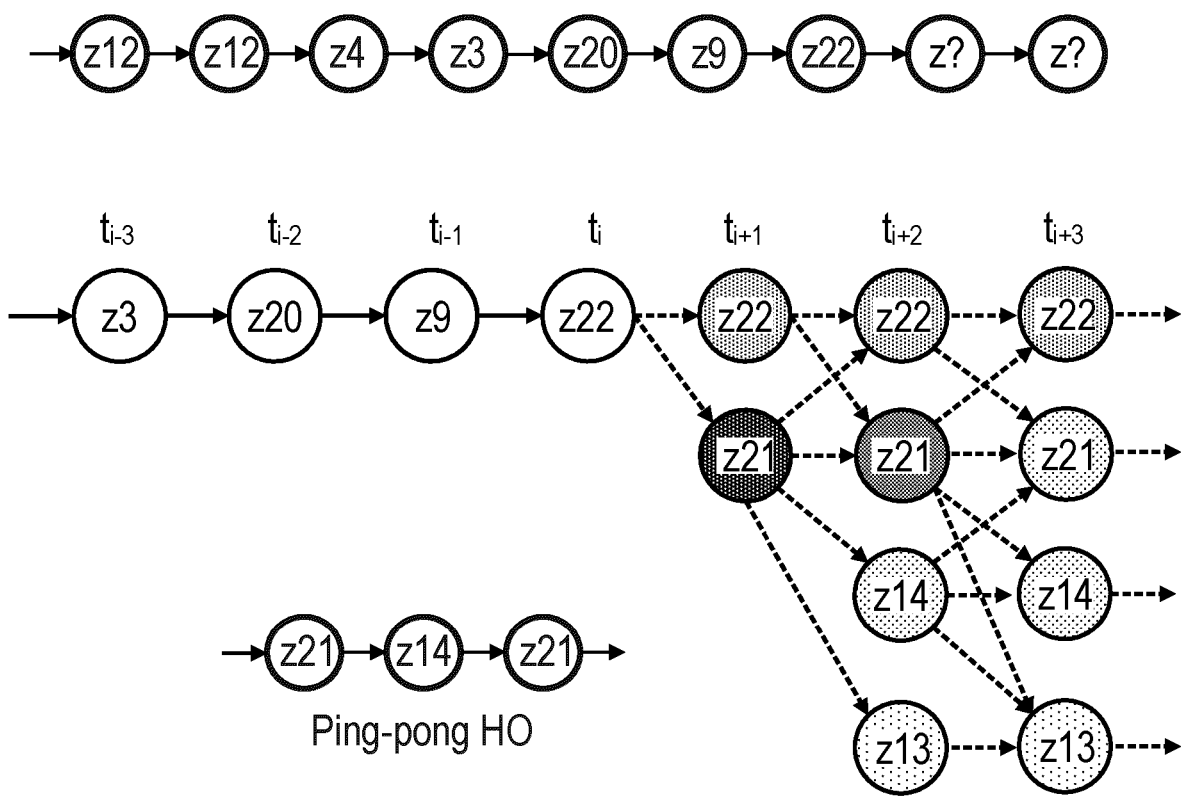
FIG. 10 illustrates mobility prediction based on relative occurrences of trajectory segments.

FIG. 10 illustrates mobility prediction based on relative occurrences of trajectory segments. Referring to FIG. 10, a prediction scenario is presented relating to the evolving UE trajectory shown at the top of the Figure. The last measurement performed by the UE is classified to Zone 22.

In order to assess the probability of transition to Zone 21 in the next time interval, trajectory segment statistics can be used to estimate the conditional probability of the next transition using the ratio of counts of the number of times trajectories corresponding to the trajectory at the top of FIG. 10 have entered Zone 21 as a next step. Similarly, a probability estimate for the UE remaining in Zone 22 for the next measurement reporting period can be estimated using a trajectory segment that corresponds to the trajectory at the top of FIG. 10 but then remains in Zone 22. Another option is to look ahead for the next 2 transitions and estimate the probability of, for example, (z21, z14) as next steps in the trajectory. In the example of FIG. 10, the darker grey shading corresponds to a higher probability of entering the Zone in the next step. The edges of the graph may also be characterized by parameters, for example by a value indicating the probability of having a handover with that zone transition.

In one example, the management node may identify a risk of ping-pong handover following entry into Zone 21, as illustrated on the left of FIG. 10. In order to reduce the possibility of ping-pong handover, the radio action model generated by the management node may set a particular radio resource action for the trajectory illustrated at the top of FIG. 10 and comprising z21 as the next step. In one example, the action may only be mapped to the trajectory if the UE motion has also been classified to a relatively high rate of change of radio environment. The radio resource action may for example comprise setting handover parameters, such as a handover margin and Time To Trigger, so as to reduce the probability of ping-pong handover. In addition to RRC events, the edges of the trajectory graph may carry information about alternative carriers, and parameter settings for inter frequency handover events.

When a UE is expected to move from one region to another, the management node reconfigures the UE with a new distributed resource management model, which includes the radio action model. FIGS. 11 and 12 illustrate an example format for a radio action model. The UE is tracking its own trajectory and speed in the radio vector space, and it continually compares its latest trajectory segment to records in the table of spatial model of RRC actions. For example, the UE continually truncates its trajectory record over a sliding window, to retain only a threshold number of the most recent entries, the threshold number corresponding to the maximum number of entries in the trajectory segments of the radio action model. UE trajectories may be sliced or truncated in real-time as the trajectories are evolving, using the sliding time window. The width of the window may for example be measured in milliseconds, seconds, or minutes, and may be approximately 1 minute, which is sufficient to capture the mobility behaviour of most UEs. When a match is found, the UE initiates performance of the action mapped to the matching record. A match may be considered as the UE's trajectory containing the same zone identities in the same order as a trajectory segment in the radio action model. If radio speed classifications are also included in the radio action model, then a match would also require that the UE classify its rate of change of radio environment into the same classification as that entered in the relevant row of the radio action model. It will be appreciated that matching trajectory segments do not have to be full length, and radio resource actions can be mapped in the radio action model to trajectory segments that comprise only one or two radio zone identifiers. For example, an RRC action to start taking measurements on a secondary carrier can be mapped to a trajectory segment comprising a single radio zone, so that if UE is in that zone, it will start taking measurements on the identified secondary carrier regardless of its previous trajectory to that point.

FIG. 11 illustrates an example distributed radio action model in which handover parameters are automatically customised to the individual mobility situation of a UE. The example of FIG. 11 contains conditional settings for the A3 event that triggers the UE to report measurements to NM. Based on a large population of UE trajectories, NM builds a radio action model per region, and sends relevant parts of it to UEs. The relevant part of the model is that part that contains actions compatible with the capabilities of the UE. In the example of FIG. 11, only the RRC event trigger A3 is shown, but the centralised radio action model may also contain configurations for handover and measurement control. The NM can use reinforcement learning techniques to learn the best action for a certain UE trajectory.

In addition to custom tailoring of RRC configuration to individual UEs, examples of the present disclosure allow for the elimination of some RRC communications between UEs and the network. In the following discussion, the UE mobility situation from FIG. 10 is considered, to demonstrate how RRC reconfigurations on the UE measurements can be coded into the radio action model. It is assumed that the management node knows from the historical collection of trajectory segments that the serving cell in Zones z3, z20, z9, z21, z22 is the same, and that this cell has physical cell id (Phycid) 1, whereas the serving cell in z13 and z14 is different, and has Phycid 201. Also from the trajectory database, the management node may know that the trajectory segment (z9, z22, z21) is travelled by both pedestrian and vehicle based UEs, and while the pedestrians typically tend to stay in their serving cell (Phycid=1), the vehicle UEs are likely to switch to a new serving cell (Phycid=201) soon. Consequently, fast moving UEs (in the radio space) may start to measure Phycid 201 when reaching z22, while UEs with moderate radio speed should start to measure Phycid 201 when reaching z21. The encoding of the appropriate RRC actions for the trajectory segment and radio speed is illustrated in FIG. 12. This encoding replaces the RRC configuration procedure "Measurement object addition/modification" described in Section 5.5.2.5 of 3GPP TS 36.331 V15.8.0.

As described above, the UE updates its trajectory and speed over the radio zones, and every time it enters a new zone, it checks the radio action model for a matching record (trajectory segment and radio speed). If finds a matching record, then the UE performs the specified RRC action without contacting NM. In the example of FIG. 12, the action is to add a new measurement object, which is the addition of a new cell to a list of cells to monitor. Alternatively, a record may instruct the UE to replace its current list of measurement objects with an entirely new one given in the corresponding record of the table.

Below is a list of various RRC procedures from the RRC protocol specification of 3GPP TS 36.331V15.8.0, which procedures can be configured by the radio action model. The zone or trajectory relevance of these procedures mean they are good candidates for inclusion in the radio action model, either as event trigger or parameter configuration update. The inclusion of such procedures in the radio action model can be gradual. For example, the radio action model and methods described herein might first take over the control of the handover related RRC reconfigurations, then they may replace standardised RRC messaging procedures one by one, or the methods of the present disclosure can operate in parallel with existing RRC signalling, without interfering with the existing signalling procedures.

RRC procedures in TS 36.331, in which zone or trajectory-based reconfigurations according to the methods proposed herein may be considered include (references in parentheses indicate the relevant section of TS 36.331):

Inter-RAT mobility Sec. 5.4
Measurement configuration Sec. 5.5.2
Measurement report triggering Sec. 5.5.4
Measurement reporting Sec. 5.5.5
Measurement related actions Sec. 5.5.6
IDLE Mode Measurements Sec. 5.6.20

In a learning phase, when a network needs extra information at certain locations, for example to support self-organizing networks (SON) methods, the following procedures may also be considered for trajectory-based reconfigurations as described herein:

UE Information Sec. 5.6.5
Logged Measurement Configuration Sec. 5.6.6
Release of Logged Measurement Configuration Sec. 5.6.7
Mobility history information Sec. 5.6.11
Application layer measurement reporting Sec. 5.6.19

In order to support interworking with WLAN, the following procedures may also be considered for trajectory-based reconfigurations as described herein:

RAN-assisted WLAN interworking Sec. 5.6.12
LTE-WLAN Aggregation Sec. 5.6.14
WLAN connection management Sec. 5.6.15
RAN controlled LTE-WLAN interworking Sec. 5.6.16
LTE-WLAN aggregation with I Psec tunnel Sec. 5.6.17

The Beam Failure Recovery Process in New Radio ($5^{th}$ Generation communication networks) could also be considered for trajectory-based reconfigurations as described herein. In addition, as discussed above, the returning of an updated distributed resource management model, and receipt of a new distributed resource management model for a new region, may also be triggered using the radio action model, as illustrated in FIG. 13.

Newly Introduced RRC Procedures and Message Flows

The following discussion provides additional detail of signalling and message flows that may be introduced in order to implement examples of the present disclosure.

Figure 14:
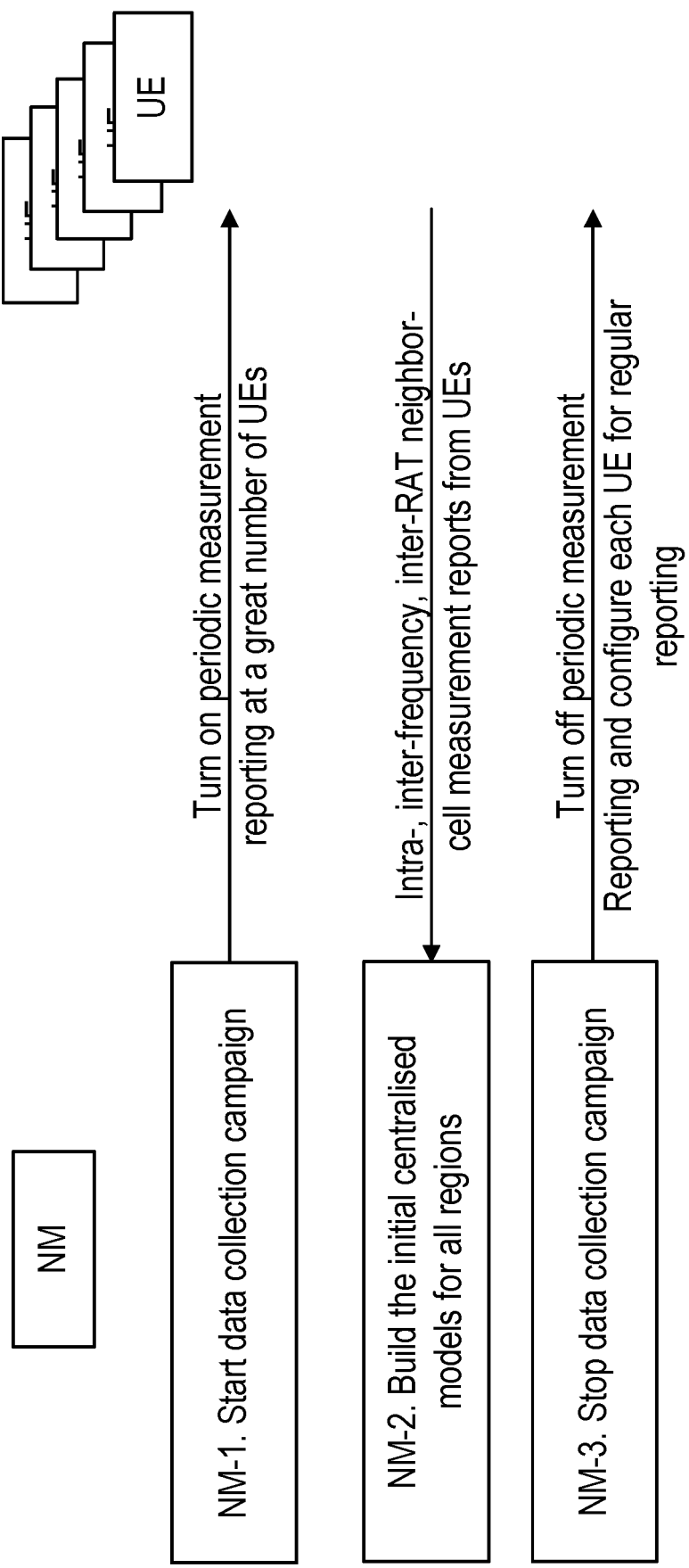
FIG. 14 illustrates message flow in an implementation of a learning phase.

Before operation in a continuous learning mode, an initial learning of the multilayer radio coverage model may be performed, as illustrated in FIG. 14. Referring to FIG. 14, NM initially configures a number of UEs to periodically report their intra-, inter-frequency and inter-RAT measurements (RSRP, RSRQ, Received Signal Strength Indication (RSSI), Signal to Interference plus Noise Ratio (SINR)) (step 402 of method 400). The goal is to have a sufficiently dense spatial sampling of the regions so that the samples represent the UE distribution and motion patterns. NM then builds the initial centralised radio coverage models per region and determines the UE trajectories over the coverage zones. NM may also build a trajectory segment database as described above and for example in non-published internal reference implementations. From the database, NM selects trajectory segments which are frequently traversed by UEs and have associated RRC actions. These trajectory segments will serve as the first version of the radio action model. After completing the initial learning phase, the data collection campaign ends, the UE measurement reporting goes back to normal and the online learning, incorporating federated learning principals as described herein, begins.

Figure 15:
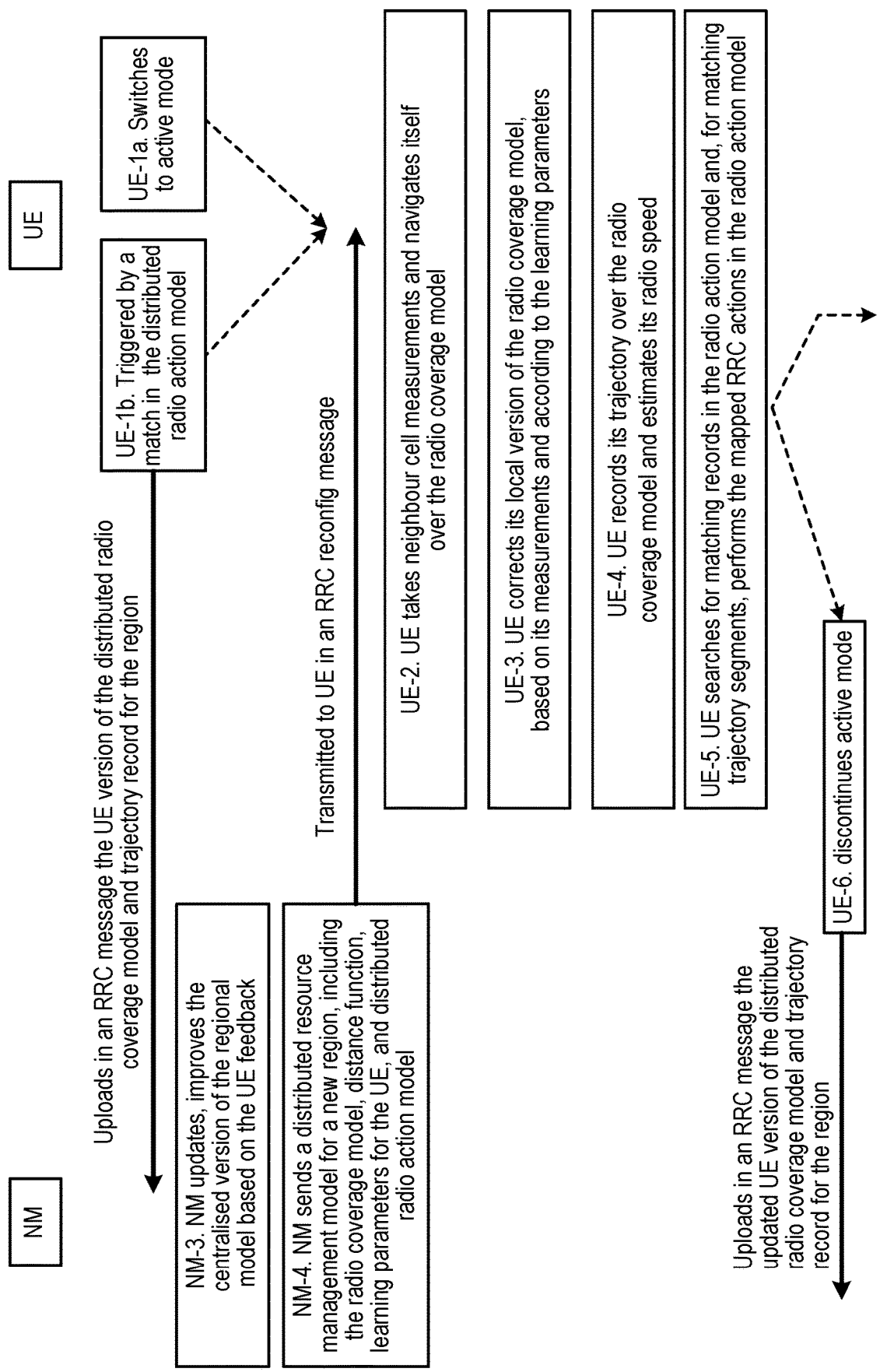
FIG. 15 is a time sequence diagram of RRC message flow and procedures.

FIG. 15 is a time sequence diagram of RRC message flow and procedures at the NM and UE sides.

Referring to FIG. 15, a learning cycle in the live operation mode either starts when a UE switches to active mode (1a) or when a UE enters a new region (1b), for example as triggered by a matching record in the radio action model of the old region. NM sends a distributed resource management model for the new region, including the radio coverage model, distance function, learning parameters for the UE, the trajectory record for the UE to update its trajectory through the radio zones of the new region, and a distributed radio action model, comprising actions compatible with the UE capabilities.

The UE measures neighbour cells at the serving carriers and, more rarely, at other carriers and other RATs (2). Based on these measurements, the UE finds its sub-cell radio zone by classifying its latest measurements based on the radio coverage model and distance function received from NM. The classification can be performed for example by Self Organising Maps (SOM) or K Nearest Neighbours (KNN) processes. While classifying its location to a radio zone, the UE also makes minor adjustments to the radio coverage model, based on its measurements, as controlled by the learning parameter(s) set provided by NM (3).

The UE appends its evolving trajectory with the latest radio zone identifier, and by using the distance function, computes its speed in the radio space (4). Then the UE checks if its recent trajectory segment and speed matches to any record in the radio action model. If there is a matching record, then it performs the RRC action specified in the record (5). The UE continues to perform steps 2 to 5 while in the current region. The trigger to switch to a new region may be provided by a matching record in the spatial model of RRC actions. Exiting a region involves sending a feedback message from the UE to NM, the message containing the updated radio coverage model and the trajectory traversed by the UE in the region. As discussed above, the trajectory may have time stamped RRC events locally experienced by the UE but otherwise not visible to NM.

Upon receiving the updated models from the UE when UE leaves the region or discontinues its active mode, NM incorporates the UE version of the radio coverage model into its centralised version of the model, and also modifies the centralised radio action model if appropriate. A learning parameter or parameter set at the NM side controls the weight of individual UE experience compared to the corporate centralised knowledge accumulated already at the network side. This learning step concludes a learning cycle in the online learning phase.

All the above procedures involve the exchange of new RRC information elements on the radio interface, but they do not have any impact on or interfere in any way with existing RRC communication. The proposed learning scheme incorporating federated learning principles can coexist and work together with current RRC procedures, for example gradually taking over the control of more and more existing RRC procedures.

EXAMPLE IMPLEMENTATION

FIGS. 16 to 20 illustrate an example implementation of methods according to the present disclosure using the Self Organising Map (SOM) clustering algorithm.

The SOM clusterer:
generates a fixed, desired number of clusters,
provides a centre for each cluster, so the cluster can be represented by a vector of real values,
employs gradual learning, which can be controlled by a limited number of parameters,
can operate as a classifier, and
both as clusterer and as classifier can work with streamed data in real-time mode, balancing between continuous learning and execution.

The above features are advantageous for implementation of methods according to the present disclosure, as the learning part at the UE and network sides happens in the same manner, but with different learning parameters. Other techniques including affinity propagation, K medoid, generative topographic maps, elastic maps, or oriented and scalable maps may also be considered.

Referring to the present example implementation, the UE initially receives a copy of the distributed resource management model for its current region, including the distributed radio coverage model, from the network. The UE improves its local copy of the radio coverage model using SOM learning according to a UE customized learning parameter set, $\Gamma$ in FIG. 6, before returning its updated radio coverage model and trajectory to the network on exiting the region. NM then aggregates updated distributed radio coverage models into the centralised radio coverage model, also with SOM learning, but with a different learning parameter set, $\hat{\ }$ in FIG. 7. The common module of SOM at both NM and UE sides is the distance function, which may be a distance function as discussed above, or as described in WO2019/158210.

Figure 16:
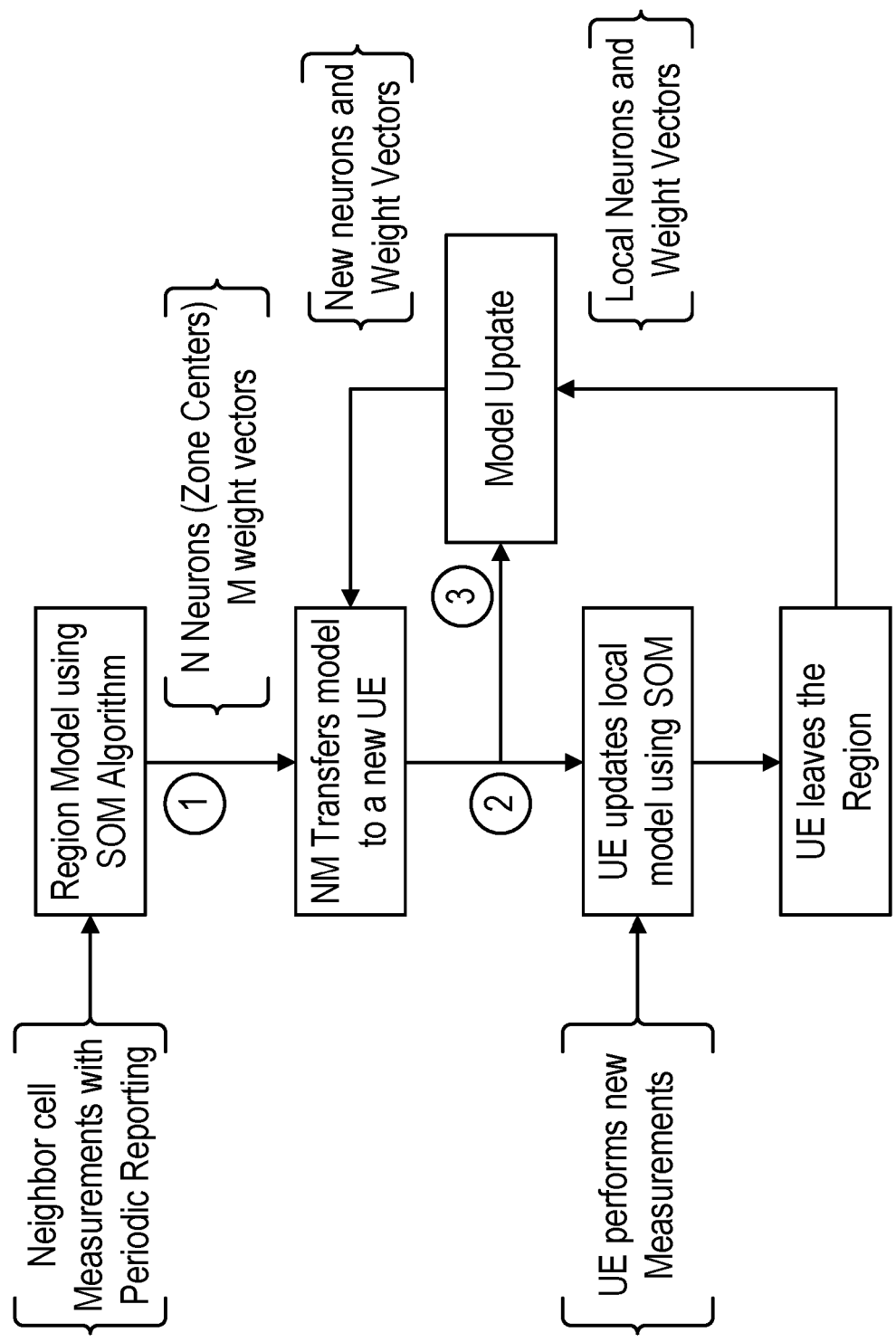
FIG. 16 is a flow chart illustrating federated learning of a centralised resource management model according to an example implementation.

FIG. 16 is a flow chart illustrating federated learning of the centralised resource management model according to the example implementation of the methods disclosed herein. The initial learning is at the NM side, with a number of neighbour-cell measurements collected from UEs. This can involve configuring UEs for periodic measurement reporting, and this data collection and learning can be completed when the coverage area is sampled with sufficient spatial density, meaning enough samples are obtained from the zones where UEs generally reside or move.

The example implementation then enters the phase of continuous leaning and execution according to the federated learning scheme. SOM terminology refers to neurons, which represent the clusters (radio zones) and to neuron weight vectors (the radio zone centres). The initial learning is the training phase of the SOM neural network and the classification process is called mapping. SOM has a learning parameter that monotonically decreases as new input samples are used for training. Each new input sample is mapped to the closest neuron, but it also "pulls" the neuron slightly, so that the cluster centre is modified. The strength of the pull is progressively reduced by the decreasing learning parameter as more samples are used in training. The other training operation of SOM is that the "pull" is also applied to other neurons, i.e. to neurons in a gradually shrinking neighbourhood of the closest neuron. The other SOM parameter is therefore the neighbourhood function, and this is applied at the NM side during the initial training.

The UE receives a trained SOM in the form of the distributed radio coverage model, so it is expected to modify this model only a small amount, applying a slight pull on zone centres in its local SOM model each time it classifies a new neighbour-cell measurement into a zone.

When NM receives the UE's modified copy of the SOM model, it finds that weight vectors (zone centres) representing zones along the UE trajectory in the region are modified in the UE's local model. NM integrates the UE's copy of the SOM model (radio coverage model) within the centralised copy with a linear combination of the two, and the individual UE's experience will be relatively slightly weighted. This weight can be uniform or customized to UEs and can decrease in time. If the network is reconfigured in some way, for example a cell is switched off or an antenna tilt is changed, then the change will be reflected in the model with a speed and impact that depend on the learning parameter. NM may be aware of such impacts on the model. It will be appreciated that UE trajectories may only validly be interpreted together with the SOM model that is valid at time of recording the trajectory. Trajectories that are separated far in time may not be comparable to each other. However, a large amount of data is used in building SOM models, involving practically all active UEs in a network, and thus the models may be expected to converge within hours. As discussed above, the example implementation can operate in parallel with regular RRC communications between UEs and NM. Should the model fail in automating certain RRC situations, the regular RRC procedures remain in effect and the only impact on operation is that some opportunities for more efficient RRC communication may be missed.

Figure 17:
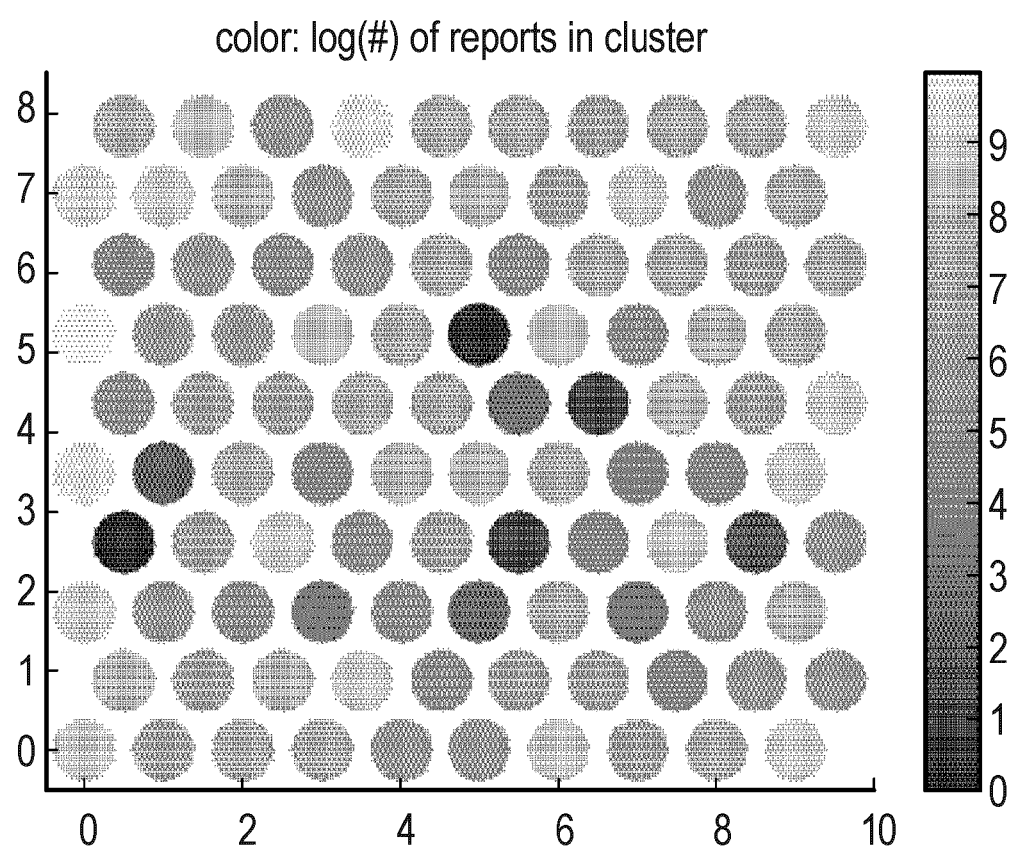
FIG. 17 illustrates an example SOM.

FIG. 17 shows a 10×10 example SOM built on real network data and arranged in a hexagonal grid. The SOM serves as the multi-layer spatial coverage model in the proposed system, with each circle representing a sub-cell resolution radio zone in a region, and the shading indicating how many neighbour cell measurements were associated with (classified into) the radio zones. During the training phase, each time a new measurement is classified, the measurement also modifies, or "pulls" the representation vectors (see below) of the associated zone and of neighbouring zones according to the SOM neighbourhood function.

Figure 18:
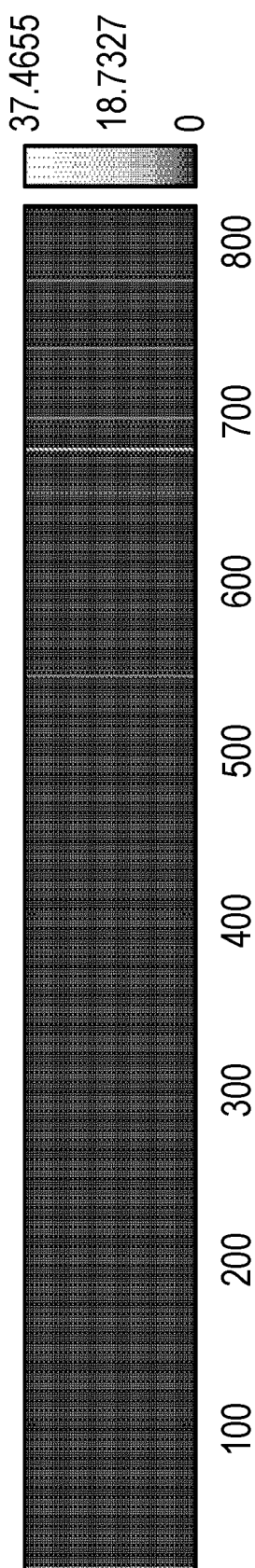
FIG. 18 illustrates an example weight vector for one of the SOM neurons shown in FIG. 17.

FIG. 18 illustrates an example weight vector for one of the SOM neurons shown in FIG. 17. Each neuron weight vector is a representation of the typical radio environment of the corresponding radio zone. For the illustrated radio zone, approximately 850 physical cell ids at two frequency carriers were detected in the region, and the colour of the "spectral" lines shows the field strength (RSRP+140 dBm) of the cells that have been seen in the zone.

Figure 19:
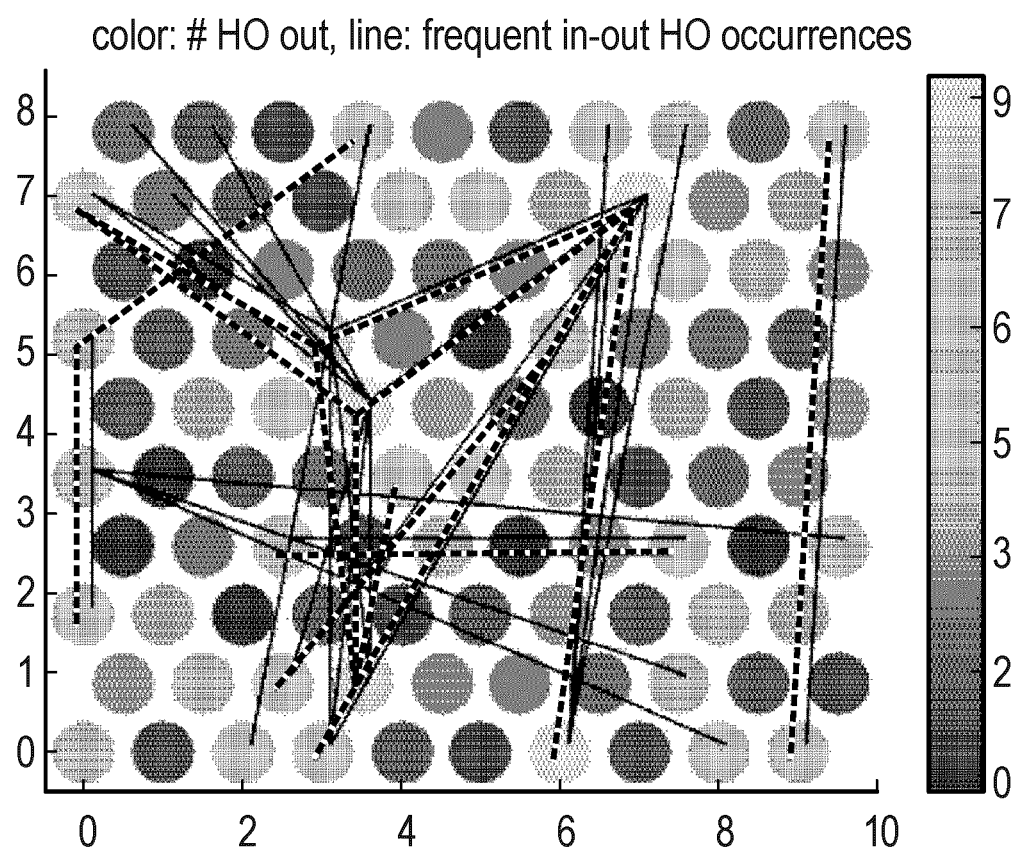
FIG. 19 illustrates handover occurrences in the SOM of FIG. 17.

FIG. 19 illustrates handover occurrences in the SOM. Certain zone transitions coincide with a high probability of handovers. This coincidence can be strengthened if the distance function used in clustering orients away from radio zones spanning multiple radio cells, bringing closer two neighbour cell measurements if the serving cells are the same in the two measurements. FIG. 19 shades the radio zones (circles) so that lighter shaded zones have high handover out counts, which means that these zones are at cell borders.

The lines mark the zone transitions with the most frequently occurring in and out handovers. When only one line, either black or dashed, connects 2 zones, then the handover between the zones typically happens in one direction.

FIG. 20 illustrates "radio distances" between radio zones, quantifying how much the radio environment differs between two zones. The distance function in this example maps into [0, 1], closest and farthest, respectively in the radio space. The cyclic pattern in the image is due to the rectangular shape of the SOM, as radio zones that are close to each other in the radio environment are typically mapped to SOM neurons that are also close to each other in the grid.

As discussed above, the methods 100 and 300 are implemented by a UE, and the present disclosure provides a UE that is adapted to perform any or all of the steps of the above discussed methods.

Figure 21:
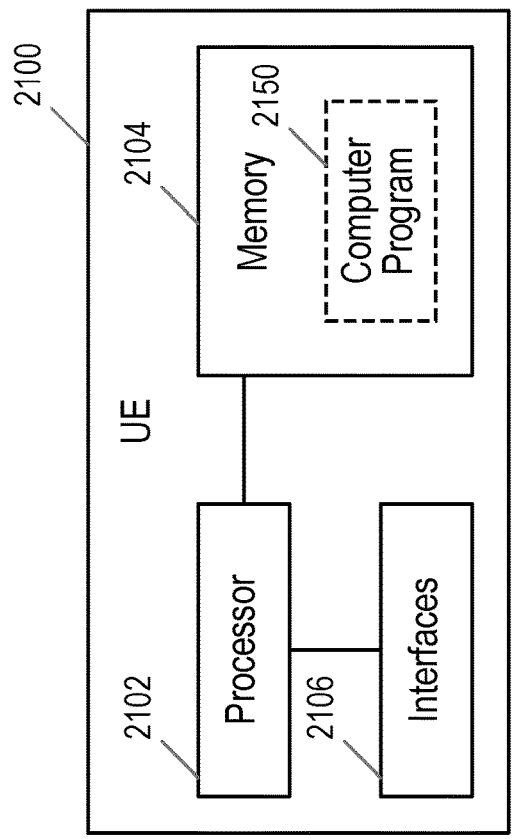
FIG. 21 is a block diagram illustrating functional modules in an example UE.

FIG. 21 is a block diagram illustrating an example UE 2100 which may implement the method 100 and/or 300, as elaborated in FIGS. 1, 3a to 3c, and 5 to 20, according to examples of the present disclosure, for example on receipt of suitable instructions from a computer program 2150. Referring to FIG. 21, the UE 2100 comprises a processor or processing circuitry 2102, and may comprise a memory 2104 and interfaces 2106. The processing circuitry 2102 is operable to perform some or all of the steps of the method 100 and/or 300 as discussed above with reference to FIGS. 1, 3a to 3c, and 5 to 20. The memory 2104 may contain instructions executable by the processing circuitry 2102 such that the UE 2100 is operable to perform some or all of the steps of the method 100 and/or 300, as elaborated in FIGS. 1, 3a to 3c, and 5 to 20. The instructions may also include instructions for executing one or more telecommunications and/or data communications protocols. The instructions may be stored in the form of the computer program 2150. In some examples, the processor or processing circuitry 2102 may include one or more microprocessors or microcontrollers, as well as other digital hardware, which may include digital signal processors (DSPs), special-purpose digital logic, etc. The processor or processing circuitry 2102 may be implemented by any type of integrated circuit, such as an Application Specific Integrated Circuit (ASIC), Field Programmable Gate Array (FPGA) etc. The memory 2104 may include one or several types of memory suitable for the processor, such as read-only memory (ROM), random-access memory, cache memory, flash memory devices, optical storage devices, solid state disk, hard disk drive etc.

Figure 22:
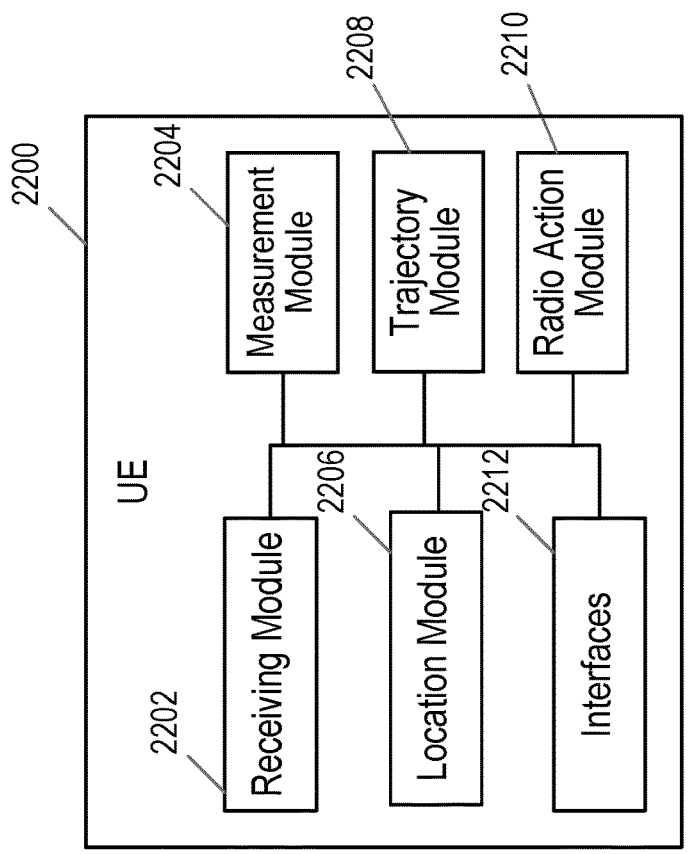
FIG. 22 is a block diagram illustrating functional modules in another example UE.

FIG. 22 illustrates functional modules in another example of UE 2400 which may execute examples of the methods 100 and/or 300 of the present disclosure, for example according to computer readable instructions received from a computer program. It will be understood that the modules illustrated in FIG. 22 are functional modules, and may be realised in any appropriate combination of hardware and/or software. The modules may comprise one or more processors and may be integrated to any degree.

Referring to FIG. 22, the UE 2200 is for managing radio resources used by the UE in a cellular communication network, wherein the communication network comprises a plurality of radio resources, each radio resource defining a dimension of a multidimensional radio space over which the communication network extends. The UE comprises a receiving module 2202 for obtaining, from a management node of the communication network, a distributed resource management model for a region of the communication network in which the UE is located, the distributed resource management model comprising a radio coverage model including defining radio characteristics of radio zones in the region. A radio zone comprises a portion of the multidimensional radio space over which the communication network extends that is defined by a particular combination of radio field characteristics, each cell of the communication network comprising a plurality of radio zones. The UE further comprises a measurement module 2204 for performing a measurement of communication network radio resources, and a location module 2206 for assigning a current radio location of the UE to a radio zone of the communication network on the basis of the measurement. The UE further comprises a trajectory module 2208 for updating, in the obtained distributed resource management model, the a radio trajectory record of the UE's trajectory with the radio zone to which the current radio location of the UE is assigned. The UE further comprises a radio action module 2210 for using the distributed resource management model, and the updated trajectory record, to identify a radio resource action for execution by the UE, and for initiating execution of the identified radio resource action. The UE 2200 may further comprise interfaces 2212 which may be operable to facilitate communication with a serving cell of the UE, a management node, and/or with neighbour cells over suitable communication channels.

As discussed above, the methods 200 and 400 may be performed by a management node, and the present disclosure provides a management node that is adapted to perform any or all of the steps of the above discussed methods. The management node may be a physical or virtual node, and may for example comprise a virtualised function that is running in a cloud, edge cloud or fog deployment. In some examples, instantiating the management node in an edge cloud can ensure that the majority of data used in carrying out the methods does not have to travel to the core network, and so does not increase load on the backhaul network. The management node may for example comprise or be instantiated in any part of a logical core network node, network management centre, network operations centre, Radio Access node etc. Any such communication network node may itself be divided between several logical and/or physical functions, and any one or more parts of the management node may be instantiated in one or more logical or physical functions of a communication network node.

Figure 23:
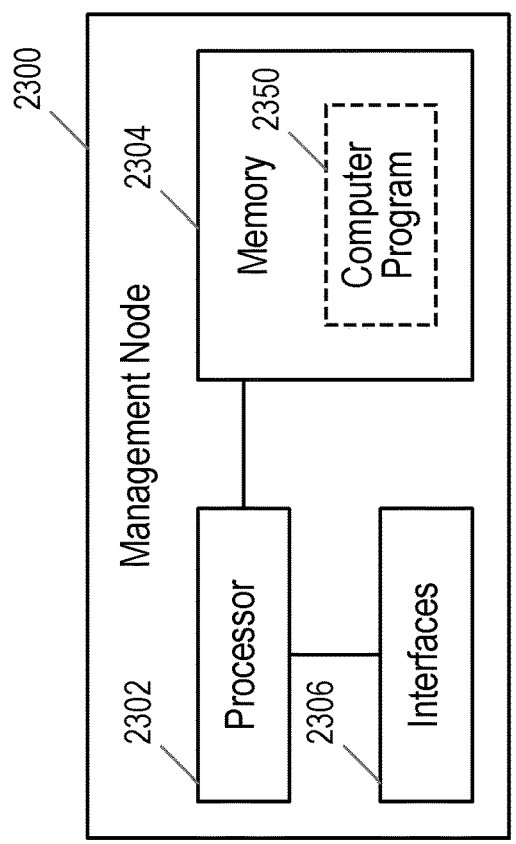
FIG. 23 is a block diagram illustrating functional modules in an example management node.

FIG. 23 is a block diagram illustrating an example management node 1300 which may implement the method 200 and/or 400, as elaborated in FIGS. 2 and 4a to 20, according to examples of the present disclosure, for example on receipt of suitable instructions from a computer program 2350. Referring to FIG. 23, the management node 2300 comprises a processor or processing circuitry 2302, and may comprise a memory 2304 and interfaces 2306. The processing circuitry 2302 is operable to perform some or all of the steps of the method 200 and/or 400 as discussed above with reference to FIGS. 2 and 4a to 20. The memory 2304 may contain instructions executable by the processing circuitry 2302 such that the management node 2300 is operable to perform some or all of the steps of the method 200 and/or 400, as elaborated in FIGS. 2 and 4a to 20. The instructions may also include instructions for executing one or more telecommunications and/or data communications protocols. The instructions may be stored in the form of the computer program 2350. In some examples, the processor or processing circuitry 2302 may include one or more microprocessors or microcontrollers, as well as other digital hardware, which may include digital signal processors (DSPs), special-purpose digital logic, etc. The processor or processing circuitry 2302 may be implemented by any type of integrated circuit, such as an Application Specific Integrated Circuit (ASIC), Field Programmable Gate Array (FPGA) etc. The memory 2304 may include one or several types of memory suitable for the processor, such as read-only memory (ROM), random-access memory, cache memory, flash memory devices, optical storage devices, solid state disk, hard disk drive etc.

Figure 24:
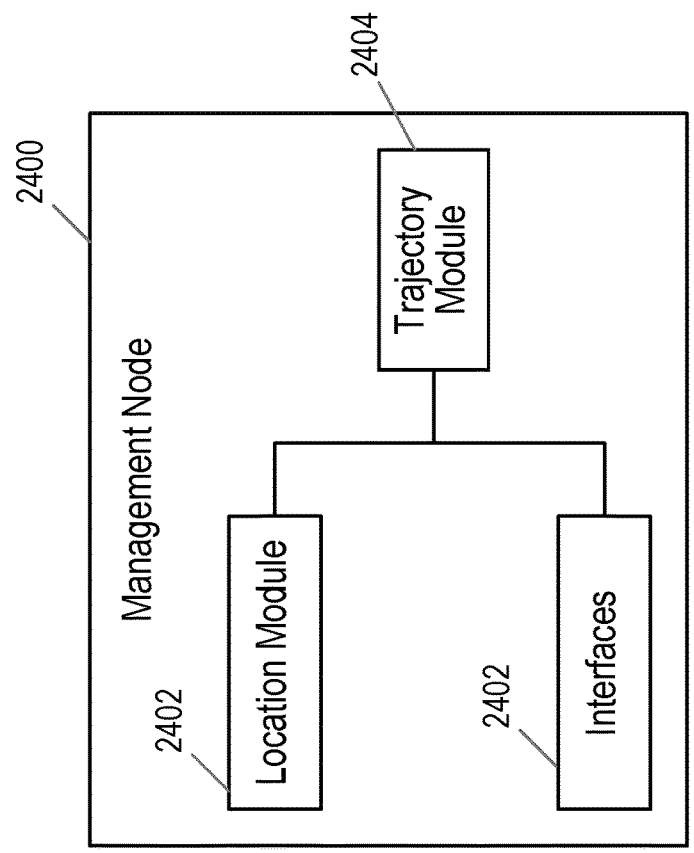
FIG. 24 is a block diagram illustrating functional modules in another example management node.

FIG. 24 illustrates functional modules in another example of management node 2400 which may execute examples of the methods 200 and/or 400 of the present disclosure, for example according to computer readable instructions received from a computer program. It will be understood that the modules illustrated in FIG. 24 are functional modules, and may be realised in any appropriate combination of hardware and/or software. The modules may comprise one or more processors and may be integrated to any degree.

Referring to FIG. 24, the management node 2400 is for managing radio resources used by UEs in a cellular communication network, wherein the communication network comprises a plurality of radio resources, each radio resource defining a dimension of a multidimensional radio space over which the communication network extends. The management node comprises a location module 2402 for determining that a UE fulfils a location condition with respect to a region of the communication network. The management node further comprises a transmission module 2404 for providing to the UE a distributed resource management model for the region of the communication network, the distributed resource management model comprising a radio coverage model including defining radio characteristics of radio zones in the region. A radio zone comprises a portion of the multidimensional radio space over which the communication network extends that is defined by a particular combination of radio field characteristics, each cell of the communication network comprising a plurality of radio zones. The distributed resource management model is operable for use, by the UE, to identify a radio resource action for execution by the UE. The management node 2400 may further comprise interfaces 2406 which may be operable to facilitate communication with a serving cell of the UE, the UE and/or with neighbour cells over suitable communication channels.

As discussed above, examples of the management node may be implemented in a cloud deployment, and owing to the regional nature of much of the data, implementation of the management node, including data exchange with the UEs and generation of the centralised and distributed resource management models, may advantageously be implemented in the edge cloud. Access to network related global information may also imply a certain level of central functionality.

Examples of the present disclosure thus disclose methods, a UE and management node that facilitate a mechanism for RRC, which mechanism can coexist with existing RRC communications while gradually replacing the UE mobility-related functions of current RRC signalling. Examples of the present disclosure may comprise an AI module in the form of a resource management model, which is downloaded to a UE and improved by the UE before being returned to NM, which then incorporates locally learnt knowledge about network coverage to a network-wide centralised model. The resource management model includes a multi-layer radio coverage model of a region in which the UE resides, and a radio action model including UE-customised instructions for RRC-related activities that the UE may perform.

The UE records its motion over the spatial coverage model based on its own neighbour-cell field-strength measurements, and the UE then finds the appropriate RRC instructions in the radio action model based on its speed and trajectory.

The RRC actions and instructions in the model extend to how UEs should take and report RRC measurements, as well as how to set mobility related parameters. The RRC actions to be controlled according to examples of the present disclosure can be prioritized based on practical usefulness and potential risks as follows:

1. Instructing UEs where, (i.e. in which radio zones) to measure and where not to measure on certain carriers, RATs.
2. Instructing how often UEs should report their neighbour cell measurements in certain zones and at certain speeds.
3. Instructing how to set the parameters of measurement triggering events and handovers along certain trajectory segments and at certain speeds—these settings impact the robustness of connections, so may be associated with the highest risks.

Examples of the present disclosure may replace a large part of the RRC messages that are currently transferred over the air, so greatly reducing signalling load. Such messages may include instructions that NM sends to UE on adding and removing certain cells to/from the list of monitored cells. Examples of the present disclosure enable the automation of such RRC configurations, as well as customizing the configurations for individual UE capabilities, location and mobility situation. With the deployment of more frequencies and densification of cells, a capacity for adaptation to different and evolving radio environments is important for future network management, and examples of the present disclosure contribute to achieving this. The automation of RRC configuration offered by examples of the present disclosure allows for overall more efficient signalling and improved radio coverage experience for the UE.

Figure 25:
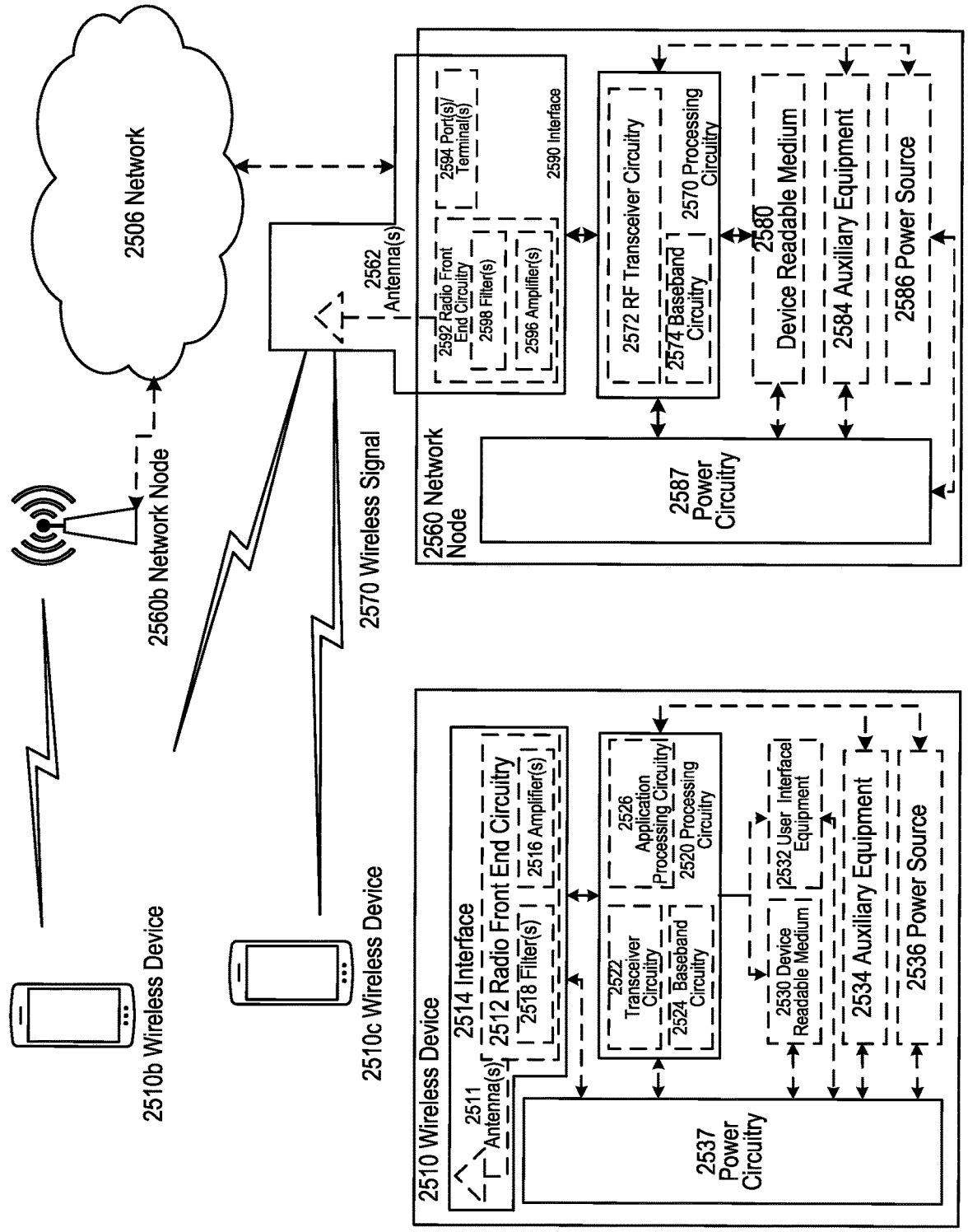
FIG. 25 illustrates a wireless network in accordance with some examples.

Although the subject matter described herein may be implemented in any appropriate type of system using any suitable components, the embodiments disclosed herein are described in relation to a wireless network, such as the example wireless network illustrated in FIG. 25. For simplicity, the wireless network of FIG. 25 only depicts network 2506, network nodes 2560 and 2560*b*, and WDs 2510, 2510*b*, and 2510*c*. In practice, a wireless network may further include any additional elements suitable to support communication between wireless devices or between a wireless device and another communication device, such as a landline telephone, a service provider, or any other network node or end device. Of the illustrated components, network node 2560 and wireless device (WD) 2510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2560 and WD 2510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SM LCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 25, network node 2560 includes processing circuitry 2570, device readable medium 2580, interface 2590, auxiliary equipment 2584, power source 2586, power circuitry 2587, and antenna 2562. Although network node 2560 illustrated in the example wireless network of FIG. 25 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2560 are depicted as single boxes located within a larger box, or nested within multiple boxes, in practice, a network node may comprise multiple different physical components that make up a single illustrated component (e.g., device readable medium 2580 may comprise multiple separate hard drives as well as multiple RAM modules).

Similarly, network node 2560 may be composed of multiple physically separate components (e.g., a NodeB component and a RNC component, or a BTS component and a BSC component, etc.), which may each have their own respective components. In certain scenarios in which network node 2560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2560 may be configured to support multiple radio access technologies (RATs). In such embodiments, some components may be duplicated (e.g., separate device readable medium 2580 for the different RATs) and some components may be reused (e.g., the same antenna 2562 may be shared by the RATs). Network node 2560 may also include multiple sets of the various illustrated components for different wireless technologies integrated into network node 2560, such as, for example, GSM, WCDMA, LTE, NR, WiFi, or Bluetooth wireless technologies. These wireless technologies may be integrated into the same or different chip or set of chips and other components within network node 2560.

Processing circuitry 2570 is configured to perform any determining, calculating, or similar operations (e.g., certain obtaining operations) described herein as being provided by a network node. These operations performed by processing circuitry 2570 may include processing information obtained by processing circuitry 2570 by, for example, converting the obtained information into other information, comparing the obtained information or converted information to information stored in the network node, and/or performing one or more operations based on the obtained information or converted information, and as a result of said processing making a determination.

Processing circuitry 2570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2560 components, such as device readable medium 2580, network node 2560 functionality. For example, processing circuitry 2570 may execute instructions stored in device readable medium 2580 or in memory within processing circuitry 2570. Such functionality may include providing any of the various wireless features, functions, or benefits discussed herein. In some embodiments, processing circuitry 2570 may include a system on a chip (SOC).

In some embodiments, processing circuitry 2570 may include one or more of radio frequency (RF) transceiver circuitry 2572 and baseband processing circuitry 2574. In some embodiments, radio frequency (RF) transceiver circuitry 2572 and baseband processing circuitry 2574 may be on separate chips (or sets of chips), boards, or units, such as radio units and digital units. In alternative embodiments, part or all of RF transceiver circuitry 2572 and baseband processing circuitry 2574 may be on the same chip or set of chips, boards, or units.

In certain embodiments, some or all of the functionality described herein as being provided by a network node, base station, eNB or other such network device may be performed by processing circuitry 2570 executing instructions stored on device readable medium 2580 or memory within processing circuitry 2570. In alternative embodiments, some or all of the functionality may be provided by processing circuitry 2570 without executing instructions stored on a separate or discrete device readable medium, such as in a hard-wired manner. In any of those embodiments, whether executing instructions stored on a device readable storage medium or not, processing circuitry 2570 can be configured to perform the described functionality. The benefits provided by such functionality are not limited to processing circuitry 2570 alone or to other components of network node 2560, but are enjoyed by network node 2560 as a whole, and/or by end users and the wireless network generally.

Device readable medium 2580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2570. Device readable medium 2580 may store any suitable instructions, data or information, including a computer program, software, an application including one or more of logic, rules, code, tables, etc. and/or other instructions capable of being executed by processing circuitry 2570 and, utilized by network node 2560. Device readable medium 2580 may be used to store any calculations made by processing circuitry 2570 and/or any data received via interface 2590. In some embodiments, processing circuitry 2570 and device readable medium 2580 may be considered to be integrated.

Interface 2590 is used in the wired or wireless communication of signalling and/or data between network node 2560, network 2506, and/or WDs 2510. As illustrated, interface 2590 comprises port(s)/terminal(s) 2594 to send and receive data, for example to and from network 2506 over a wired connection. Interface 2590 also includes radio front end circuitry 2592 that may be coupled to, or in certain embodiments a part of, antenna 2562. Radio front end circuitry 2592 comprises filters 2598 and amplifiers 2596. Radio front end circuitry 2592 may be connected to antenna 2562 and processing circuitry 2570. Radio front end circuitry may be configured to condition signals communicated between antenna 2562 and processing circuitry 2570. Radio front end circuitry 2592 may receive digital data that is to be sent out to other network nodes or WDs via a wireless connection. Radio front end circuitry 2592 may convert the digital data into a radio signal having the appropriate channel and bandwidth parameters using a combination of filters 2598 and/or amplifiers 2596. The radio signal may then be transmitted via antenna 2562. Similarly, when receiving data, antenna 2562 may collect radio signals which are then converted into digital data by radio front end circuitry 2592. The digital data may be passed to processing circuitry 2570. In other embodiments, the interface may comprise different components and/or different combinations of components.

In certain alternative embodiments, network node 2560 may not include separate radio front end circuitry 2592, instead, processing circuitry 2570 may comprise radio front end circuitry and may be connected to antenna 2562 without separate radio front end circuitry 2592. Similarly, in some embodiments, all or some of RF transceiver circuitry 2572 may be considered a part of interface 2590. In still other embodiments, interface 2590 may include one or more ports or terminals 2594, radio front end circuitry 2592, and RF transceiver circuitry 2572, as part of a radio unit (not shown), and interface 2590 may communicate with baseband processing circuitry 2574, which is part of a digital unit (not shown).

Antenna 2562 may include one or more antennas, or antenna arrays, configured to send and/or receive wireless signals. Antenna 2562 may be coupled to radio front end circuitry 2590 and may be any type of antenna capable of transmitting and receiving data and/or signals wirelessly. In some embodiments, antenna 2562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2562 may be separate from network node 2560 and may be connectable to network node 2560 through an interface or port.

Antenna 2562, interface 2590, and/or processing circuitry 2570 may be configured to perform any receiving operations and/or certain obtaining operations described herein as being performed by a network node. Any information, data and/or signals may be received from a wireless device, another network node and/or any other network equipment. Similarly, antenna 2562, interface 2590, and/or processing circuitry 2570 may be configured to perform any transmitting operations described herein as being performed by a network node. Any information, data and/or signals may be transmitted to a wireless device, another network node and/or any other network equipment.

Power circuitry 2587 may comprise, or be coupled to, power management circuitry and is configured to supply the components of network node 2560 with power for performing the functionality described herein. Power circuitry 2587 may receive power from power source 2586. Power source 2586 and/or power circuitry 2587 may be configured to provide power to the various components of network node 2560 in a form suitable for the respective components (e.g., at a voltage and current level needed for each respective component). Power source 2586 may either be included in, or external to, power circuitry 2587 and/or network node 2560. For example, network node 2560 may be connectable to an external power source (e.g., an electricity outlet) via an input circuitry or interface such as an electrical cable, whereby the external power source supplies power to power circuitry 2587. As a further example, power source 2586 may comprise a source of power in the form of a battery or battery pack which is connected to, or integrated in, power circuitry 2587. The battery may provide backup power should the external power source fail. Other types of power sources, such as photovoltaic devices, may also be used.

Alternative embodiments of network node 2560 may include additional components beyond those shown in FIG. 25 that may be responsible for providing certain aspects of the network node's functionality, including any of the functionality described herein and/or any functionality necessary to support the subject matter described herein. For example, network node 2560 may include user interface equipment to allow input of information into network node 2560 and to allow output of information from network node 2560. This may allow a user to perform diagnostic, maintenance, repair, and other administrative functions for network node 2560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2510 includes antenna 2511, interface 2514, processing circuitry 2520, device readable medium 2530, user interface equipment 2532, auxiliary equipment 2534, power source 2536 and power circuitry 2537. WD 2510 may include multiple sets of one or more of the illustrated components for different wireless technologies supported by WD 2510, such as, for example, GSM, WCDMA, LTE, NR, WiFi, WiMAX, or Bluetooth wireless technologies, just to mention a few. These wireless technologies may be integrated into the same or different chips or set of chips as other components within WD 2510.

Antenna 2511 may include one or more antennas or antenna arrays, configured to send and/or receive wireless signals, and is connected to interface 2514. In certain alternative embodiments, antenna 2511 may be separate from WD 2510 and be connectable to WD 2510 through an interface or port. Antenna 2511, interface 2514, and/or processing circuitry 2520 may be configured to perform any receiving or transmitting operations described herein as being performed by a WD. Any information, data and/or signals may be received from a network node and/or another WD. In some embodiments, radio front end circuitry and/or antenna 2511 may be considered an interface.

As illustrated, interface 2514 comprises radio front end circuitry 2512 and antenna 2511. Radio front end circuitry 2512 comprise one or more filters 2518 and amplifiers 2516. Radio front end circuitry 2514 is connected to antenna 2511 and processing circuitry 2520, and is configured to condition signals communicated between antenna 2511 and processing circuitry 2520. Radio front end circuitry 2512 may be coupled to or a part of antenna 2511. In some embodiments, WD 2510 may not include separate radio front end circuitry 2512; rather, processing circuitry 2520 may comprise radio front end circuitry and may be connected to antenna 2511. Similarly, in some embodiments, some or all of RF transceiver circuitry 2522 may be considered a part of interface 2514. Radio front end circuitry 2512 may receive digital data that is to be sent out to other network nodes or WDs via a wireless connection. Radio front end circuitry 2512 may convert the digital data into a radio signal having the appropriate channel and bandwidth parameters using a combination of filters 2518 and/or amplifiers 2516. The radio signal may then be transmitted via antenna 2511. Similarly, when receiving data, antenna 2511 may collect radio signals which are then converted into digital data by radio front end circuitry 2512. The digital data may be passed to processing circuitry 2520. In other embodiments, the interface may comprise different components and/or different combinations of components.

Processing circuitry 2520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2510 components, such as device readable medium 2530, WD 2510 functionality. Such functionality may include providing any of the various wireless features or benefits discussed herein. For example, processing circuitry 2520 may execute instructions stored in device readable medium 2530 or in memory within processing circuitry 2520 to provide the functionality disclosed herein.

As illustrated, processing circuitry 2520 includes one or more of RF transceiver circuitry 2522, baseband processing circuitry 2524, and application processing circuitry 2526. In other embodiments, the processing circuitry may comprise different components and/or different combinations of components. In certain embodiments processing circuitry 2520 of WD 2510 may comprise a SOC. In some embodiments, RF transceiver circuitry 2522, baseband processing circuitry 2524, and application processing circuitry 2526 may be on separate chips or sets of chips. In alternative embodiments, part or all of baseband processing circuitry 2524 and application processing circuitry 2526 may be combined into one chip or set of chips, and RF transceiver circuitry 2522 may be on a separate chip or set of chips. In still alternative embodiments, part or all of RF transceiver circuitry 2522 and baseband processing circuitry 2524 may be on the same chip or set of chips, and application processing circuitry 2526 may be on a separate chip or set of chips. In yet other alternative embodiments, part or all of RF transceiver circuitry 2522, baseband processing circuitry 2524, and application processing circuitry 2526 may be combined in the same chip or set of chips. In some embodiments, RF transceiver circuitry 2522 may be a part of interface 2514. RF transceiver circuitry 2522 may condition RF signals for processing circuitry 2520.

In certain embodiments, some or all of the functionality described herein as being performed by a WD may be provided by processing circuitry 2520 executing instructions stored on device readable medium 2530, which in certain embodiments may be a computer-readable storage medium. In alternative embodiments, some or all of the functionality may be provided by processing circuitry 2520 without executing instructions stored on a separate or discrete device readable storage medium, such as in a hard-wired manner. In any of those particular embodiments, whether executing instructions stored on a device readable storage medium or not, processing circuitry 2520 can be configured to perform the described functionality. The benefits provided by such functionality are not limited to processing circuitry 2520 alone or to other components of WD 2510, but are enjoyed by WD 2510 as a whole, and/or by end users and the wireless network generally.

Processing circuitry 2520 may be configured to perform any determining, calculating, or similar operations (e.g., certain obtaining operations) described herein as being performed by a WD. These operations, as performed by processing circuitry 2520, may include processing information obtained by processing circuitry 2520 by, for example, converting the obtained information into other information, comparing the obtained information or converted information to information stored by WD 2510, and/or performing one or more operations based on the obtained information or converted information, and as a result of said processing making a determination.

Device readable medium 2530 may be operable to store a computer program, software, an application including one or more of logic, rules, code, tables, etc. and/or other instructions capable of being executed by processing circuitry 2520. Device readable medium 2530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2520. In some embodiments, processing circuitry 2520 and device readable medium 2530 may be considered to be integrated.

User interface equipment 2532 may provide components that allow for a human user to interact with WD 2510. Such interaction may be of many forms, such as visual, audial, tactile, etc. User interface equipment 2532 may be operable to produce output to the user and to allow the user to provide input to WD 2510. The type of interaction may vary depending on the type of user interface equipment 2532 installed in WD 2510. For example, if WD 2510 is a smart phone, the interaction may be via a touch screen; if WD 2510 is a smart meter, the interaction may be through a screen that provides usage (e.g., the number of gallons used) or a speaker that provides an audible alert (e.g., if smoke is detected). User interface equipment 2532 may include input interfaces, devices and circuits, and output interfaces, devices and circuits. User interface equipment 2532 is configured to allow input of information into WD 2510, and is connected to processing circuitry 2520 to allow processing circuitry 2520 to process the input information. User interface equipment 2532 may include, for example, a microphone, a proximity or other sensor, keys/buttons, a touch display, one or more cameras, a USB port, or other input circuitry. User interface equipment 2532 is also configured to allow output of information from WD 2510, and to allow processing circuitry 2520 to output information from WD 2510. User interface equipment 2532 may include, for example, a speaker, a display, vibrating circuitry, a USB port, a headphone interface, or other output circuitry. Using one or more input and output interfaces, devices, and circuits, of user interface equipment 2532, WD 2510 may communicate with end users and/or the wireless network, and allow them to benefit from the functionality described herein.

Auxiliary equipment 2534 is operable to provide more specific functionality which may not be generally performed by WDs. This may comprise specialized sensors for doing measurements for various purposes, interfaces for additional types of communication such as wired communications etc. The inclusion and type of components of auxiliary equipment 2534 may vary depending on the embodiment and/or scenario.

Power source 2536 may, in some embodiments, be in the form of a battery or battery pack. Other types of power sources, such as an external power source (e.g., an electricity outlet), photovoltaic devices or power cells, may also be used. WD 2510 may further comprise power circuitry 2537 for delivering power from power source 2536 to the various parts of WD 2510 which need power from power source 2536 to carry out any functionality described or indicated herein. Power circuitry 2537 may in certain embodiments comprise power management circuitry. Power circuitry 2537 may additionally or alternatively be operable to receive power from an external power source; in which case WD 2510 may be connectable to the external power source (such as an electricity outlet) via input circuitry or an interface such as an electrical power cable. Power circuitry 2537 may also in certain embodiments be operable to deliver power from an external power source to power source 2536. This may be, for example, for the charging of power source 2536. Power circuitry 2537 may perform any formatting, converting, or other modification to the power from power source 2536 to make the power suitable for the respective components of WD 2510 to which power is supplied.

Figure 26:
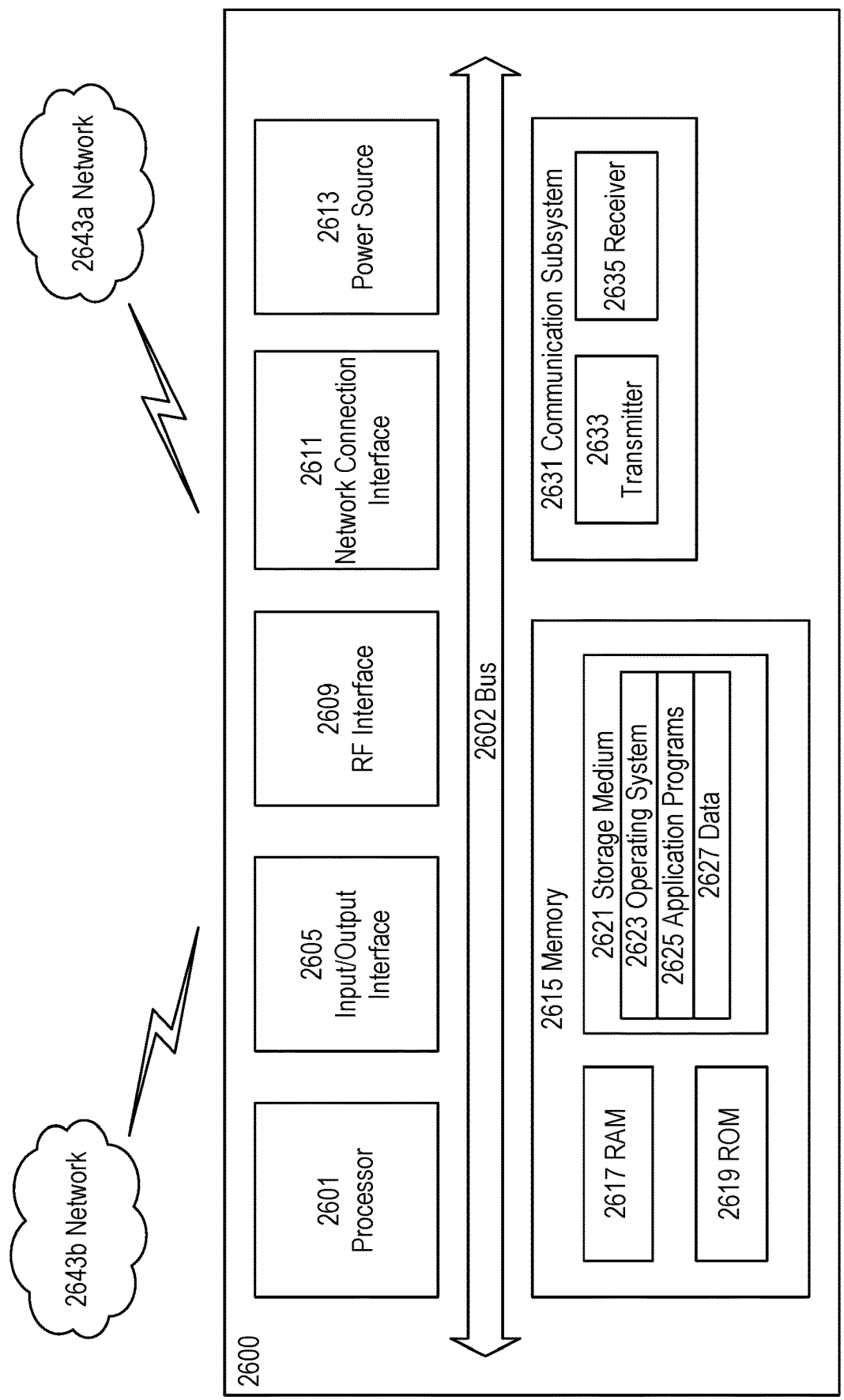
FIG. 26 illustrates a User Equipment in accordance with some examples.

FIG. 26 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2600 may be any UE identified by the 3rd Generation Partnership Project (3GPP), including a NB-IoT UE, a machine type communication (MTC) UE, and/or an enhanced MTC (eMTC) UE. UE 2600, as illustrated in FIG. 26, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 26 is a UE, the components discussed herein are equally applicable to a WD, and vice-versa.

In FIG. 26, UE 2600 includes processing circuitry 2601 that is operatively coupled to input/output interface 2605, radio frequency (RF) interface 2609, network connection interface 2611, memory 2615 including random access memory (RAM) 2617, read-only memory (ROM) 2619, and storage medium 2621 or the like, communication subsystem 2631, power source 2633, and/or any other component, or any combination thereof. Storage medium 2621 includes operating system 2623, application program 2625, and data 2627. In other embodiments, storage medium 2621 may include other similar types of information. Certain UEs may utilize all of the components shown in FIG. 26, or only a subset of the components. The level of integration between the components may vary from one UE to another UE. Further, certain UEs may contain multiple instances of a component, such as multiple processors, memories, transceivers, transmitters, receivers, etc.

In FIG. 26, processing circuitry 2601 may be configured to process computer instructions and data. Processing circuitry 2601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2601 may include two central processing units (CPUs). Data may be information in a form suitable for use by a computer.

In the depicted embodiment, input/output interface 2605 may be configured to provide a communication interface to an input device, output device, or input and output device. UE 2600 may be configured to use an output device via input/output interface 2605. An output device may use the same type of interface port as an input device. For example, a USB port may be used to provide input to and output from UE 2600. The output device may be a speaker, a sound card, a video card, a display, a monitor, a printer, an actuator, an emitter, a smartcard, another output device, or any combination thereof. UE 2600 may be configured to use an input device via input/output interface 2605 to allow a user to capture information into UE 2600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 26, RF interface 2609 may be configured to provide a communication interface to RF components such as a transmitter, a receiver, and an antenna. Network connection interface 2611 may be configured to provide a communication interface to network 2643a. Network 2643a may encompass wired and/or wireless networks such as a local-area network (LAN), a wide-area network (WAN), a computer network, a wireless network, a telecommunications network, another like network or any combination thereof. For example, network 2643a may comprise a Wi-Fi network. Network connection interface 2611 may be configured to include a receiver and a transmitter interface used to communicate with one or more other devices over a communication network according to one or more communication protocols, such as Ethernet, TCP/IP, SONET, ATM, or the like. Network connection interface 2611 may implement receiver and transmitter functionality appropriate to the communication network links (e.g., optical, electrical, and the like). The transmitter and receiver functions may share circuit components, software or firmware, or alternatively may be implemented separately.

RAM 2617 may be configured to interface via bus 2602 to processing circuitry 2601 to provide storage or caching of data or computer instructions during the execution of software programs such as the operating system, application programs, and device drivers. ROM 2619 may be configured to provide computer instructions or data to processing circuitry 2601. For example, ROM 2619 may be configured to store invariant low-level system code or data for basic system functions such as basic input and output (I/O), startup, or reception of keystrokes from a keyboard that are stored in a non-volatile memory. Storage medium 2621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2621 may be configured to include operating system 2623, application program 2625 such as a web browser application, a widget or gadget engine or another application, and data file 2627. Storage medium 2621 may store, for use by UE 2600, any of a variety of various operating systems or combinations of operating systems.

Storage medium 2621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2621 may allow UE 2600 to access computer-executable instructions, application programs or the like, stored on transitory or non-transitory memory media, to off-load data, or to upload data. An article of manufacture, such as one utilizing a communication system may be tangibly embodied in storage medium 2621, which may comprise a device readable medium.

In FIG. 26, processing circuitry 2601 may be configured to communicate with network 2643*b* using communication subsystem 2631. Network 2643*a* and network 2643*b* may be the same network or networks or different network or networks. Communication subsystem 2631 may be configured to include one or more transceivers used to communicate with network 2643*b*. For example, communication subsystem 2631 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 2633 and/or receiver 2635 to implement transmitter or receiver functionality, respectively, appropriate to the RAN links (e.g., frequency allocations and the like). Further, transmitter 2633 and receiver 2635 of each transceiver may share circuit components, software or firmware, or alternatively may be implemented separately.

In the illustrated embodiment, the communication functions of communication subsystem 2631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2631 may include cellular communication, Wi-Fi communication, Bluetooth communication, and GPS communication. Network 2643*b* may encompass wired and/or wireless networks such as a local-area network (LAN), a wide-area network (WAN), a computer network, a wireless network, a telecommunications network, another like network or any combination thereof. For example, network 2643*b* may be a cellular network, a VVi-Fi network, and/or a near-field network. Power source 2613 may be configured to provide alternating current (AC) or direct current (DC) power to components of UE 2600.

The features, benefits and/or functions described herein may be implemented in one of the components of UE 2600 or partitioned across multiple components of UE 2600. Further, the features, benefits, and/or functions described herein may be implemented in any combination of hardware, software or firmware. In one example, communication subsystem 2631 may be configured to include any of the components described herein. Further, processing circuitry 2601 may be configured to communicate with any of such components over bus 2602. In another example, any of such components may be represented by program instructions stored in memory that when executed by processing circuitry 2601 perform the corresponding functions described herein. In another example, the functionality of any of such components may be partitioned between processing circuitry 2601 and communication subsystem 2631. In another example, the non-computationally intensive functions of any of such components may be implemented in software or firmware and the computationally intensive functions may be implemented in hardware.

Figure 27:
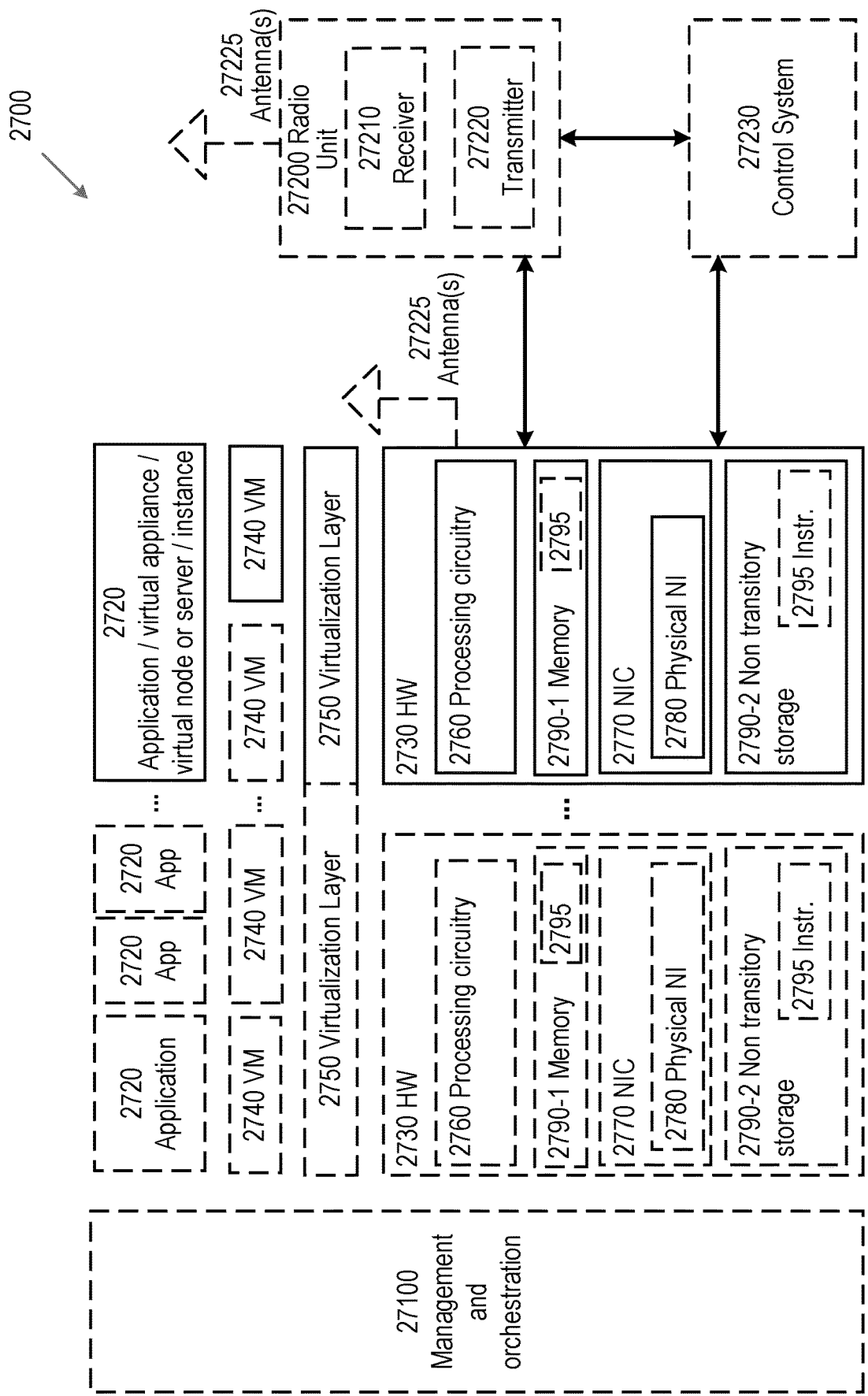
FIG. 27 illustrates a virtualization environment in accordance with some examples.

FIG. 27 is a schematic block diagram illustrating a virtualization environment 2700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2700 hosted by one or more of hardware nodes 2730. Further, in embodiments in which the virtual node is not a radio access node or does not require radio connectivity (e.g., a core network node), then the network node may be entirely virtualized.

The functions may be implemented by one or more applications 2720 (which may alternatively be called software instances, virtual appliances, network functions, virtual nodes, virtual network functions, etc.) operative to implement some of the features, functions, and/or benefits of some of the embodiments disclosed herein. Applications 2720 are run in virtualization environment 2700 which provides hardware 2730 comprising processing circuitry 2760 and memory 2790. Memory 2790 contains instructions 2795 executable by processing circuitry 2760 whereby application 2720 is operative to provide one or more of the features, benefits, and/or functions disclosed herein.

Virtualization environment 2700, comprises general-purpose or special-purpose network hardware devices 2730 comprising a set of one or more processors or processing circuitry 2760, which may be commercial off-the-shelf (COTS) processors, dedicated Application Specific Integrated Circuits (ASICs), or any other type of processing circuitry including digital or analog hardware components or special purpose processors. Each hardware device may comprise memory 2790-1 which may be non-persistent memory for temporarily storing instructions 2795 or software executed by processing circuitry 2760. Each hardware device may comprise one or more network interface controllers (NICs) 2770, also known as network interface cards, which include physical network interface 2780. Each hardware device may also include non-transitory, persistent, machine-readable storage media 2790-2 having stored therein software 2795 and/or instructions executable by processing circuitry 2760. Software 2795 may include any type of software including software for instantiating one or more virtualization layers 2750 (also referred to as hypervisors), software to execute virtual machines 2740 as well as software allowing it to execute functions, features and/or benefits described in relation with some embodiments described herein.

Virtual machines 2740, comprise virtual processing, virtual memory, virtual networking or interface and virtual storage, and may be run by a corresponding virtualization layer 2750 or hypervisor. Different embodiments of the instance of virtual appliance 2720 may be implemented on one or more of virtual machines 2740, and the implementations may be made in different ways.

During operation, processing circuitry 2760 executes software 2795 to instantiate the hypervisor or virtualization layer 2750, which may sometimes be referred to as a virtual machine monitor (VMM). Virtualization layer 2750 may present a virtual operating platform that appears like networking hardware to virtual machine 2740.

As shown in FIG. 27, hardware 2730 may be a standalone network node with generic or specific components. Hardware 2730 may comprise antenna 27225 and may implement some functions via virtualization. Alternatively, hardware 2730 may be part of a larger cluster of hardware (e.g. such as in a data center or customer premise equipment (CPE)) where many hardware nodes work together and are managed via management and orchestration (MANO) 27100, which, among others, oversees lifecycle management of applications 2720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2740 may be a software implementation of a physical machine that runs programs as if they were executing on a physical, non-virtualized machine. Each of virtual machines 2740, and that part of hardware 2730 that executes that virtual machine, be it hardware dedicated to that virtual machine and/or hardware shared by that virtual machine with others of the virtual machines 2740, forms a separate virtual network elements (VNE).

Still in the context of NFV, Virtual Network Function (VNF) is responsible for handling specific network functions that run in one or more virtual machines 2740 on top of hardware networking infrastructure 2730 and corresponds to application 2720 in FIG. 27.

In some embodiments, one or more radio units 27200 that each include one or more transmitters 27220 and one or more receivers 27210 may be coupled to one or more antennas 27225. Radio units 27200 may communicate directly with hardware nodes 2730 via one or more appropriate network interfaces and may be used in combination with the virtual components to provide a virtual node with radio capabilities, such as a radio access node or a base station.

In some embodiments, some signalling can be effected with the use of control system 27230 which may alternatively be used for communication between the hardware nodes 2730 and radio units 27200.

Figure 28:
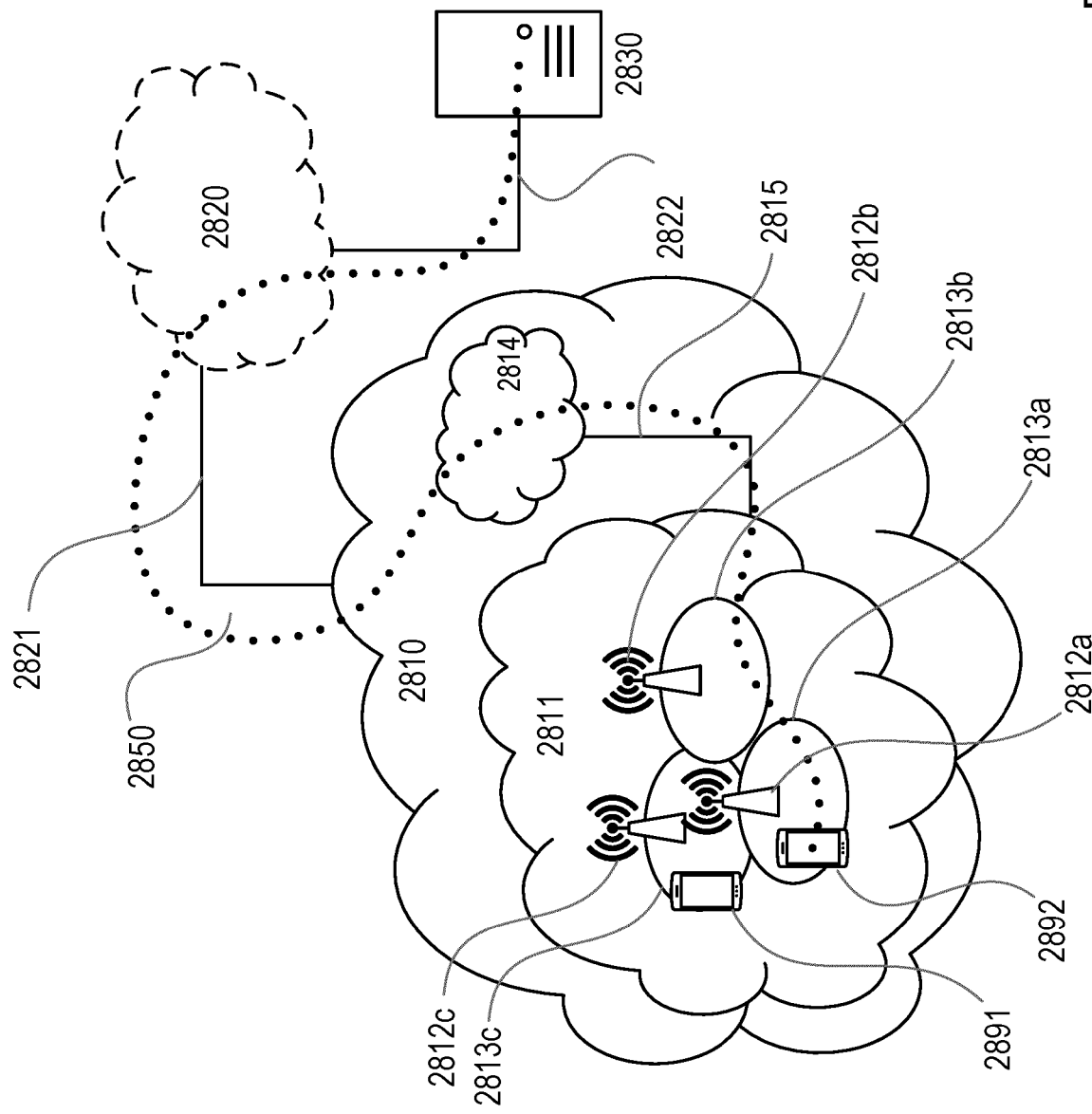
FIG. 28 illustrates a telecommunication network connected via an intermediate network to a host computer in accordance with some examples.

With reference to FIG. 28, in accordance with an embodiment, a communication system includes telecommunication network 2810, such as a 3GPP-type cellular network, which comprises access network 2811, such as a radio access network, and core network 2814. Access network 2811 comprises a plurality of base stations 2812*a*, 2812*b*, 2812*c*, such as NBs, eNBs, gNBs or other types of wireless access points, each defining a corresponding coverage area 2813*a*, 2813*b*, 2813*c*. Each base station 2812*a*, 2812*b*, 2812*c* is connectable to core network 2814 over a wired or wireless connection 2815. A first UE 2891 located in coverage area 2813*c* is configured to wirelessly connect to, or be paged by, the corresponding base station 2812*c*. A second UE 2892 in coverage area 2813*a* is wirelessly connectable to the corresponding base station 2812*a*. While a plurality of UEs 2891, 2892 are illustrated in this example, the disclosed embodiments are equally applicable to a situation where a sole UE is in the coverage area or where a sole UE is connecting to the corresponding base station 2812.

Telecommunication network 2810 is itself connected to host computer 2830, which may be embodied in the hardware and/or software of a standalone server, a cloud-implemented server, a distributed server or as processing resources in a server farm. Host computer 2830 may be under the ownership or control of a service provider, or may be operated by the service provider or on behalf of the service provider. Connections 2821 and 2822 between telecommunication network 2810 and host computer 2830 may extend directly from core network 2814 to host computer 2830 or may go via an optional intermediate network 2820. Intermediate network 2820 may be one of, or a combination of more than one of, a public, private or hosted network; intermediate network 2820, if any, may be a backbone network or the Internet; in particular, intermediate network 2820 may comprise two or more sub-networks (not shown).

The communication system of FIG. 28 as a whole enables connectivity between the connected UEs 2891, 2892 and host computer 2830. The connectivity may be described as an over-the-top (OTT) connection 2850. Host computer 2830 and the connected UEs 2891, 2892 are configured to communicate data and/or signaling via OTT connection 2850, using access network 2811, core network 2814, any intermediate network 2820 and possible further infrastructure (not shown) as intermediaries. OTT connection 2850 may be transparent in the sense that the participating communication devices through which OTT connection 2850 passes are unaware of routing of uplink and downlink communications. For example, base station 2812 may not or need not be informed about the past routing of an incoming downlink communication with data originating from host computer 2830 to be forwarded (e.g., handed over) to a connected UE 2891. Similarly, base station 2812 need not be aware of the future routing of an outgoing uplink communication originating from the UE 2891 towards the host computer 2830.

Example implementations, in accordance with an embodiment, of the UE, base station and host computer discussed in the preceding paragraphs will now be described with reference to FIG. 29. In communication system 2900, host computer 2910 comprises hardware 2915 including communication interface 2916 configured to set up and maintain a wired or wireless connection with an interface of a different communication device of communication system 2900. Host computer 2910 further comprises processing circuitry 2918, which may have storage and/or processing capabilities. In particular, processing circuitry 2918 may comprise one or more programmable processors, application-specific integrated circuits, field programmable gate arrays or combinations of these (not shown) adapted to execute instructions. Host computer 2910 further comprises software 2911, which is stored in or accessible by host computer 2910 and executable by processing circuitry 2918. Software 2911 includes host application 2912. Host application 2912 may be operable to provide a service to a remote user, such as UE 2930 connecting via OTT connection 2950 terminating at UE 2930 and host computer 2910. In providing the service to the remote user, host application 2912 may provide user data which is transmitted using OTT connection 2950.

Communication system 2900 further includes base station 2920 provided in a telecommunication system and comprising hardware 2925 enabling it to communicate with host computer 2910 and with UE 2930. Hardware 2925 may include communication interface 2926 for setting up and maintaining a wired or wireless connection with an interface of a different communication device of communication system 2900, as well as radio interface 2927 for setting up and maintaining at least wireless connection 2970 with UE 2930 located in a coverage area (not shown in FIG. 29) served by base station 2920. Communication interface 2926 may be configured to facilitate connection 2960 to host computer 2910. Connection 2960 may be direct or it may pass through a core network (not shown in FIG. 29) of the telecommunication system and/or through one or more intermediate networks outside the telecommunication system. In the embodiment shown, hardware 2925 of base station 2920 further includes processing circuitry 2928, which may comprise one or more programmable processors, application-specific integrated circuits, field programmable gate arrays or combinations of these (not shown) adapted to execute instructions. Base station 2920 further has software 2921 stored internally or accessible via an external connection.

Communication system 2900 further includes UE 2930 already referred to. Its hardware 2935 may include radio interface 2937 configured to set up and maintain wireless connection 2970 with a base station serving a coverage area in which UE 2930 is currently located. Hardware 2935 of UE 2930 further includes processing circuitry 2938, which may comprise one or more programmable processors, application-specific integrated circuits, field programmable gate arrays or combinations of these (not shown) adapted to execute instructions. UE 2930 further comprises software 2931, which is stored in or accessible by UE 2930 and executable by processing circuitry 2938. Software 2931 includes client application 2932. Client application 2932 may be operable to provide a service to a human or non-human user via UE 2930, with the support of host computer 2910. In host computer 2910, an executing host application 2912 may communicate with the executing client application 2932 via OTT connection 2950 terminating at UE 2930 and host computer 2910. In providing the service to the user, client application 2932 may receive request data from host application 2912 and provide user data in response to the request data. OTT connection 2950 may transfer both the request data and the user data. Client application 2932 may interact with the user to generate the user data that it provides.

Figure 29:
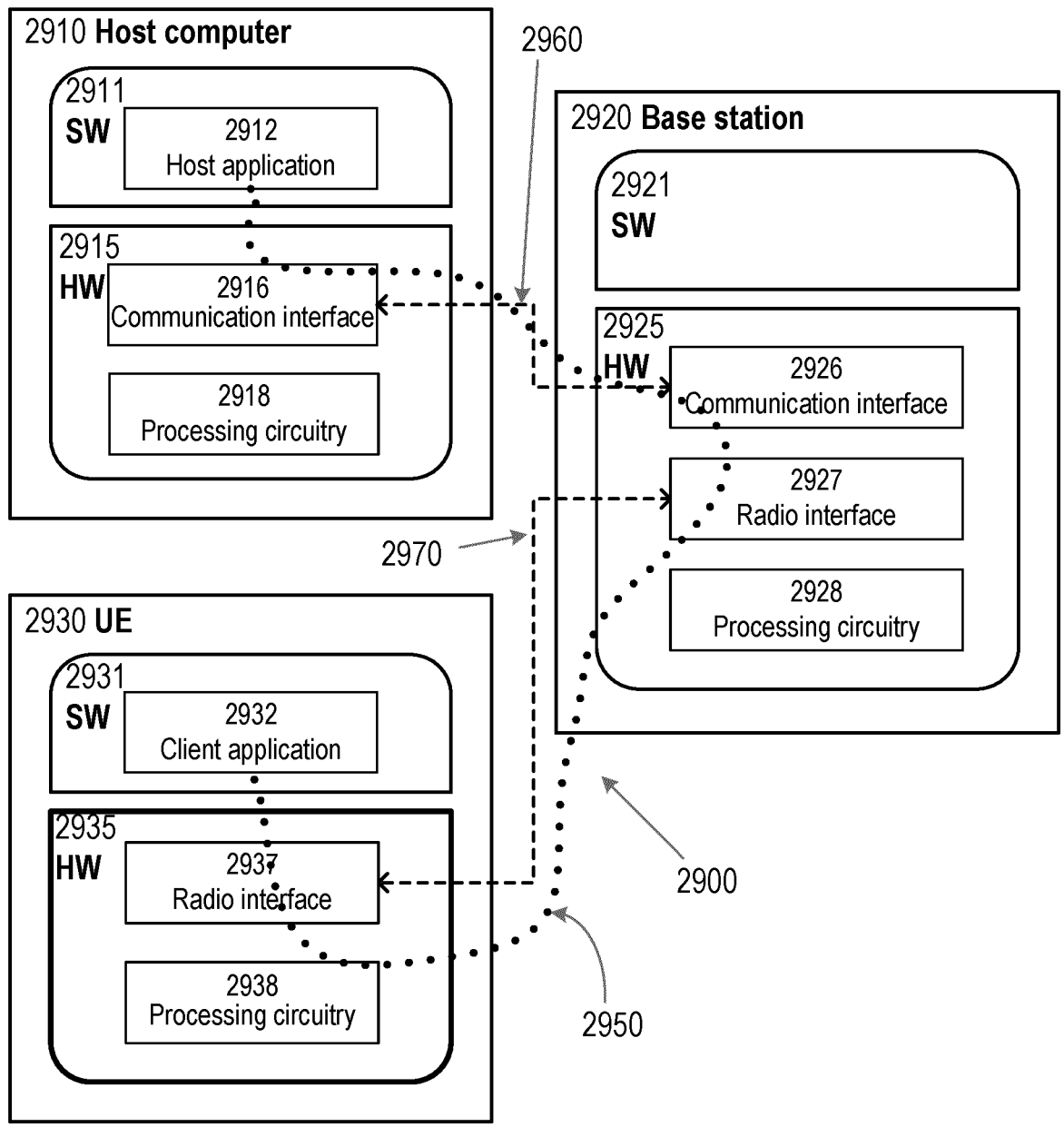
FIG. 29 illustrates a host computer communicating via a base station with a user equipment over a partially wireless connection in accordance with some examples.

It is noted that host computer 2910, base station 2920 and UE 2930 illustrated in FIG. 29 may be similar or identical to host computer 2830, one of base stations 2812a, 2812b, 2812c and one of UEs 2891, 2892 of FIG. 28, respectively. This is to say, the inner workings of these entities may be as shown in FIG. 29 and independently, the surrounding network topology may be that of FIG. 28.

In FIG. 29, OTT connection 2950 has been drawn abstractly to illustrate the communication between host computer 2910 and UE 2930 via base station 2920, without explicit reference to any intermediary devices and the precise routing of messages via these devices. Network infrastructure may determine the routing, which it may be configured to hide from UE 2930 or from the service provider operating host computer 2910, or both. While OTT connection 2950 is active, the network infrastructure may further take decisions by which it dynamically changes the routing (e.g., on the basis of load balancing consideration or reconfiguration of the network).

Wireless connection 2970 between UE 2930 and base station 2920 is in accordance with the teachings of the embodiments described throughout this disclosure. One or more of the various embodiments improve the performance of OTT services provided to UE 2930 using OTT connection 2950, in which wireless connection 2970 forms the last segment. More precisely, the teachings of these embodiments may reduce the RRC signalling burden, and thereby provide benefits such as reduced user waiting time, better responsiveness, extended battery lifetime, etc.

A measurement procedure may be provided for the purpose of monitoring data rate, latency and other factors on which the one or more embodiments improve. There may further be an optional network functionality for reconfiguring OTT connection 2950 between host computer 2910 and UE 2930, in response to variations in the measurement results. The measurement procedure and/or the network functionality for reconfiguring OTT connection 2950 may be implemented in software 2911 and hardware 2915 of host computer 2910 or in software 2931 and hardware 2935 of UE 2930, or both. In embodiments, sensors (not shown) may be deployed in or in association with communication devices through which OTT connection 2950 passes; the sensors may participate in the measurement procedure by supplying values of the monitored quantities exemplified above, or supplying values of other physical quantities from which software 2911, 2931 may compute or estimate the monitored quantities. The reconfiguring of OTT connection 2950 may include message format, retransmission settings, preferred routing etc.; the reconfiguring need not affect base station 2920, and it may be unknown or imperceptible to base station 2920. Such procedures and functionalities may be known and practiced in the art. In certain embodiments, measurements may involve proprietary UE signaling facilitating host computer 2910's measurements of throughput, propagation times, latency and the like. The measurements may be implemented in that software 2911 and 2931 causes messages to be transmitted, in particular empty or 'dummy' messages, using OTT connection 2950 while it monitors propagation times, errors etc.

Figure 30:
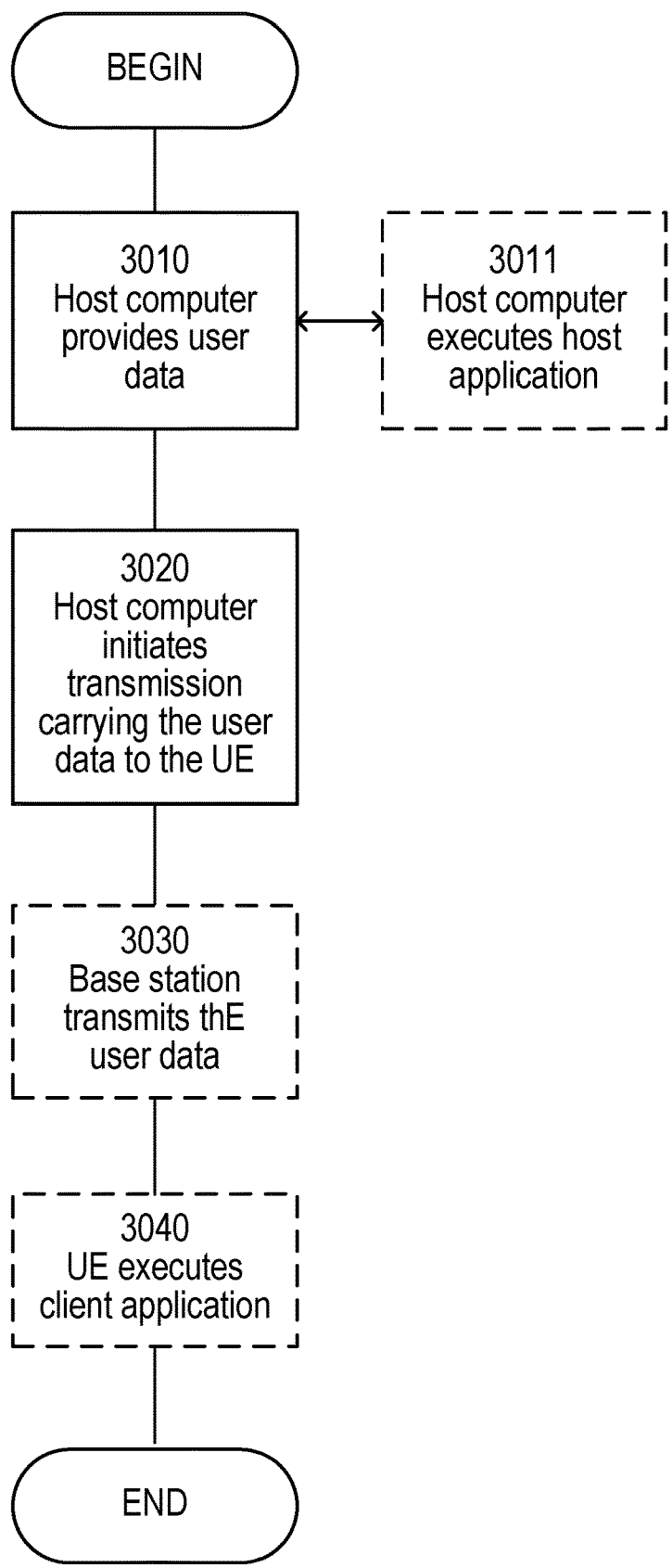
FIG. 30 illustrates methods implemented in a communication system including a host computer, a base station and a user equipment in accordance with some examples.

FIG. 30 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 30 will be included in this section. In step 3010, the host computer provides user data. In substep 3011 (which may be optional) of step 3010, the host computer provides the user data by executing a host application. In step 3020, the host computer initiates a transmission carrying the user data to the UE. In step 3030 (which may be optional), the base station transmits to the UE the user data which was carried in the transmission that the host computer initiated, in accordance with the teachings of the embodiments described throughout this disclosure. In step 3040 (which may also be optional), the UE executes a client application associated with the host application executed by the host computer.

Figure 31:
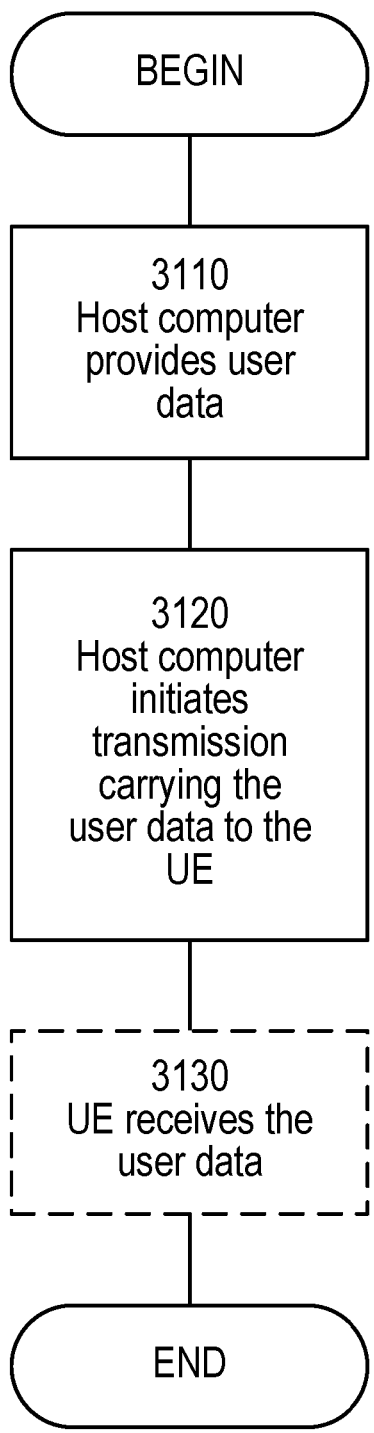
FIG. 31 illustrates methods implemented in a communication system including a host computer, a base station and a user equipment in accordance with some examples.

FIG. 31 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 31 will be included in this section. In step 3110 of the method, the host computer provides user data. In an optional substep (not shown) the host computer provides the user data by executing a host application. In step 3120, the host computer initiates a transmission carrying the user data to the UE. The transmission may pass via the base station, in accordance with the teachings of the embodiments described throughout this disclosure. In step 3130 (which may be optional), the UE receives the user data carried in the transmission.

Figure 32:
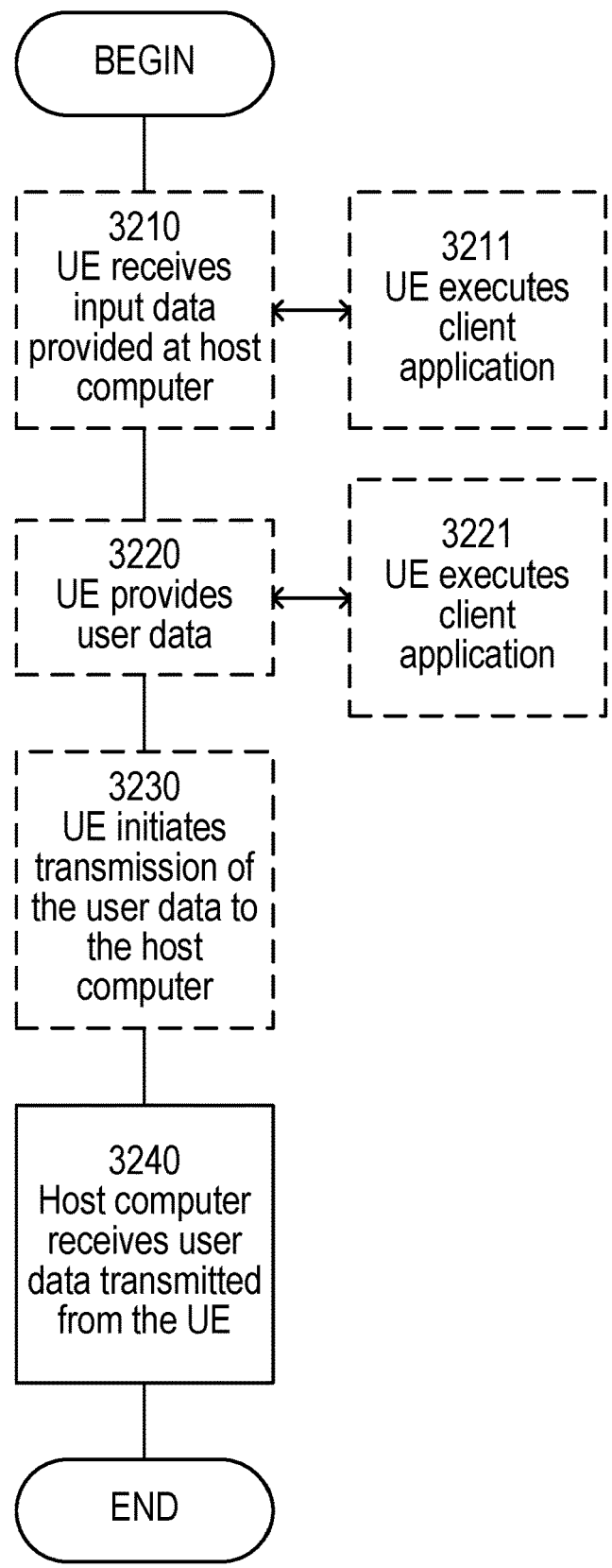
FIG. 32 illustrates methods implemented in a communication system including a host computer, a base station and a user equipment in accordance with some examples.

FIG. 32 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 32 will be included in this section. In step 3210 (which may be optional), the UE receives input data provided by the host computer. Additionally or alternatively, in step 3220, the UE provides user data. In substep 3221 (which may be optional) of step 3220, the UE provides the user data by executing a client application. In substep 3211 (which may be optional) of step 3210, the UE executes a client application which provides the user data in reaction to the received input data provided by the host computer. In providing the user data, the executed client application may further consider user input received from the user. Regardless of the specific manner in which the user data was provided, the UE initiates, in substep 3230 (which may be optional), transmission of the user data to the host computer. In step 3240 of the method, the host computer receives the user data transmitted from the UE, in accordance with the teachings of the embodiments described throughout this disclosure.

Figure 33:
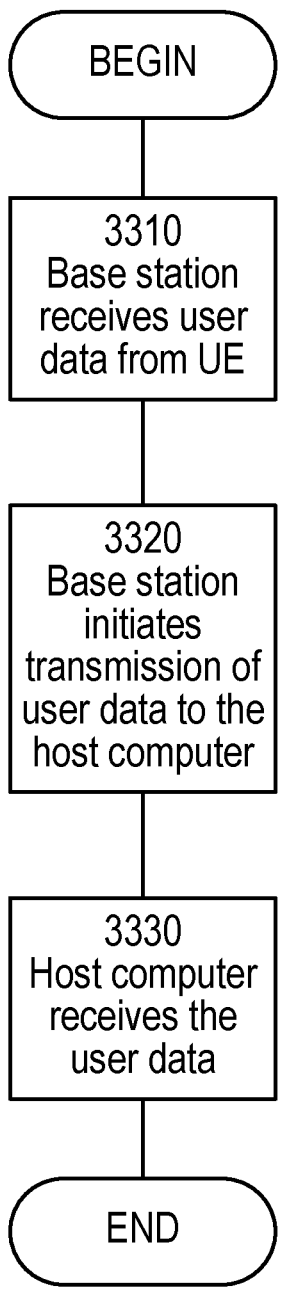
FIG. 33 illustrates methods implemented in a communication system including a host computer, a base station and a user equipment in accordance with some examples.

FIG. 33 is a flowchart illustrating a method implemented in a communication system, in accordance with one embodiment. The communication system includes a host computer, a base station and a UE which may be those described with reference to FIGS. 28 and 29. For simplicity of the present disclosure, only drawing references to FIG. 33 will be included in this section. In step 3310 (which may be optional), in accordance with the teachings of the embodiments described throughout this disclosure, the base station receives user data from the UE. In step 3320 (which may be optional), the base station initiates transmission of the received user data to the host computer. In step 3330 (which may be optional), the host computer receives the user data carried in the transmission initiated by the base station.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A computer implemented method for managing radio resources used by a User Equipment, UE, in a cellular communication network, the communication network comprising a plurality of radio resources, each radio resource defining a dimension of a multidimensional radio space over which the communication network extends, the method, performed by the UE, comprising:
    obtaining, from a management node of the communication network, a distributed resource management model for a region of the communication network in which the UE is located, the distributed resource management model comprising a radio coverage model including defining radio characteristics of radio zones in the region, a radio zone comprising a portion of the multidimensional radio space over which the communication network extends that is defined by a particular combination of radio field characteristics, and each cell of the communication network comprises a plurality of radio zones;
    performing a measurement of communication network radio resources;
    assigning a current radio location of the UE to a radio zone of the communication network on the basis of the measurement, assigning a current radio location of the UE to a radio zone of the communication network on the basis of the measurement comprising:
        classifying a vector of results of the measurement into a radio zone; and
        assigning a current radio location of the UE to the radio zone into which the vector is classified;
    updating a radio trajectory record of the UE's trajectory with the radio zone to which the current radio location of the UE is assigned;
    using the distributed resource management model and the updated trajectory record to identify a radio resource action for execution by the UE; and
    initiating execution of the identified radio resource action.

2. The method as claimed in claim 1, wherein the distributed resource management model for the region of the communication network further comprises:
    a radio action model including a mapping of radio trajectory segments to radio resource actions; and
    a distance function for use in assigning a radio location of a UE to a radio zone using the distributed resource management model.

3. The method as claimed in claim 1, wherein updating a radio trajectory record of the UE's trajectory with the radio zone to which the current radio location of the UE is assigned comprises:
appending to the trajectory a tuple of time stamp and radio zone identifier of the radio zone to which the current radio location of the UE is assigned.

4. The method as claimed in claim 1, wherein updating a radio trajectory record of the UE's trajectory with the radio zone to which the current radio location of the UE is assigned comprises:
appending to the radio trajectory record a tuple of time stamp, radio zone identifier of the radio zone to which the current radio location is assigned, and transition identifier for a transition from the previous radio zone of the radio trajectory record.

5. The method as claimed in claim 1, wherein the distributed resource management model for the region of the communication network further comprises: the radio trajectory record for recording a UE's trajectory through the multidimensional radio space of the communication network.

6. The method as claimed in claim 1, wherein using the distributed resource management model and the updated trajectory record to identify a radio resource action for execution by the UE comprises:
truncating the updated trajectory record over a sliding window;
comparing the truncated trajectory record to each of a set of radio trajectory segments included in a radio action model comprised in the distributed resource management model; and
if the truncated trajectory record matches any of the radio trajectory segments included in the radio action model, identifying for execution by the UE any radio resource action to which the matched radio trajectory segment is mapped in the radio action model.

7. The method as claimed in claim 6, further comprising:
classifying a rate of change of the radio resource environment of the UE on the basis of the updated trajectory record.

8. The method as claimed in claim 7, wherein classifying a rate of change of the radio resource environment of the UE on the basis of the updated trajectory record comprises:
calculating a distance traversed by the UE over the multidimensional radio space on the basis of the radio zones present in the UE's updated trajectory record over a sliding window;
dividing the calculated distance by a time during which the calculated distance was traversed by the UE to obtain a rate of change of the radio resource environment of the UE; and
classifying the obtained rate of change into one of a plurality of classifications.

9. The method as claimed in claim 7, wherein using the distributed resource management model and the updated trajectory record to identify a radio resource action for execution by the UE further comprises:
if the truncated trajectory record matches any of the radio trajectory segments included in the radio action model, identifying for execution by the UE any radio resource action to which the matched radio trajectory segment, and the classified rate of change of the radio resource environment of the UE, are mapped in the radio action model.

10. A computer implemented method for managing radio resources used by User Equipments, UEs, in a cellular communication network, the communication network comprising a plurality of radio resources, each radio resource defining a dimension of a multidimensional radio space over which the communication network extends, the method, performed by a management node of the communication network, comprising:
determining that a UE fulfils a location condition with respect to a region of the communication network;
providing to the UE a distributed resource management model for the region of the communication network, the distributed resource management model comprising a radio coverage model including defining radio characteristics of radio zones in the region, the distributed resource management model for the region of the communication network further comprises:
a radio action model including a mapping of radio trajectory segments to radio resource actions; and
a distance function for use in assigning a radio location of a UE to a radio zone using the distributed resource management model, a radio zone comprising a portion of the multidimensional radio space over which the communication network extends that is defined by a particular combination of radio field characteristics, and each cell of the communication network comprising a plurality of radio zones; and
the distributed resource management model being operable for use, by the UE, to identify a radio resource action for execution by the UE.

11. The method as claimed in claim 10, further comprising receiving reports of radio resource measurements performed by UEs located in the region of the communication network;
generating, on the basis of the received reports, a centralised resource management model; and
generating, from the centralised resource management model, the distributed resource management model for provision to the UE.

12. The method as claimed in claim 11, wherein the centralised radio coverage model comprises:
a centralized radio coverage model including defining radio characteristics of radio zones in the region; and
the radio trajectory record for recording trajectories of UEs through the multidimensional radio space of the communication network.

13. The method as claimed in claim 12, wherein generating, on the basis of the received reports, a centralised resource management model comprises generating the centralised radio coverage model by:
adding vectors of measurements contained in reports received from UEs in the region to a training data set;
applying a clustering algorithm to the training data set; and
for clusters identified by the clustering algorithm:
identifying a set of measurements that represent the radio field characteristics of the cluster; and
setting the identified set of measurements as the defining radio characteristics of a radio zone corresponding to the cluster.

14. The method as claimed in claim 13, wherein applying a clustering algorithm comprises using a distance function, and wherein the centralised resource management model further comprises the distance function used in applying the clustering algorithm.

15. The method as claimed in claim 11, wherein the centralised resource management model further comprises:
a centralised radio action model including a mapping of radio trajectory segments to radio resource actions.

16. The method as claimed in claim 15, wherein generating, on the basis of the received reports, a centralised resource management model comprises generating the centralised radio action model by:
- assembling a training data set comprising radio trajectories of UEs in the region and radio resource actions executed by UEs in the region and
- using a machine learning process to generate, based on the training data set, a mapping between trajectory segments and radio resource actions to be executed by a UE.

17. The method as claimed in claim 15, wherein the centralised radio action model includes a mapping of radio trajectory segments and associated rate of change of radio environment classifications to radio resource actions.

18. The method as claimed in claim 16, wherein generating the centralised radio action model further comprises, for UE trajectories in the assembled training data set:
- calculating a distance traversed by the UE over the multidimensional radio space on the basis of the radio zones present in the UE's trajectory over a sliding window;
- dividing the calculated distance by a time during which the calculated distance was traversed by the UE to obtain a rate of change of the radio resource environment of the UE;
- classifying the obtained rate of change into one of a plurality of classifications; and
- using the machine learning process to generate, based on the training data set and classifications, a mapping between trajectory segments and associated rate of change classifications, and radio resource actions to be executed by a UE.

19. A user equipment, UE, configured to manage radio resources used by the UE in a cellular communication network, the communication network comprising a plurality of radio resources, each radio resource defining a dimension of a multidimensional radio space over which the communication network extends, the UE comprising processing circuitry configured to:
- obtain, from a management node of the communication network, a distributed resource management model for a region of the communication network in which the UE is located, the distributed resource management model comprising a radio coverage model including defining radio characteristics of radio zones in the region, a radio zone comprising a portion of the multidimensional radio space over which the communication network extends that is defined by a particular combination of radio field characteristics, and each cell of the communication network comprising a plurality of radio zones;
- perform a measurement of communication network radio resources;
- assign a current radio location of the UE to a radio zone of the communication network on the basis of the measurement, assigning a current radio location of the UE to a radio zone of the communication network on the basis of the measurement comprising:
  - classifying a vector of results of the measurement into a radio zone; and
  - assigning a current radio location of the UE to the radio zone into which the vector is classified;
- update a radio trajectory record of the UE's trajectory with the radio zone to which the current radio location of the UE is assigned;
- use the distributed resource management model and the updated trajectory record to identify a radio resource action for execution by the UE; and
- initiate execution of the identified radio resource action.

20. A management node for managing radio resources used by User Equipments, UEs, in a cellular communication network, the communication network comprising a plurality of radio resources, each radio resource defining a dimension of a multidimensional radio space over which the communication network extends, the management node comprising processing circuitry configured to:
- determine that a UE fulfils a location condition with respect to a region of the communication network; and
- provide to the UE a distributed resource management model for the region of the communication network, the distributed resource management model comprising a radio coverage model including defining radio characteristics of radio zones in the region, the distributed resource management model for the region of the communication network further comprises:
  - a radio action model including a mapping of radio trajectory segments to radio resource actions; and
  - a distance function for use in assigning a radio location of a UE to a radio zone using the distributed resource management model, a radio zone comprising a portion of the multidimensional radio space over which the communication network extends that is defined by a particular combination of radio field characteristics, and each cell of the communication network comprising a plurality of radio zones; and
- the distributed resource management model being operable for use, by the UE, to identify a radio resource action for execution by the UE.

* * * * *